United States Patent
Kashiwagi et al.

(10) Patent No.: US 11,095,217 B2
(45) Date of Patent: Aug. 17, 2021

(54) RIPPLE INJECTION CIRCUIT AND ELECTRONIC DEVICE EQUIPPED WITH THIS CIRCUIT

(71) Applicant: Rohm Co., Ltd., Kyoto (JP)

(72) Inventors: Junichi Kashiwagi, Kyoto (JP); Atsushi Yamaguchi, Kyoto (JP); Yohei Moriyama, Kyoto (JP); Yuta Okawauchi, Kyoto (JP); Yusuke Nakakohara, Kyoto (JP); Ken Nakahara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/611,815

(22) PCT Filed: May 10, 2018

(86) PCT No.: PCT/JP2018/018155
§ 371 (c)(1),
(2) Date: Nov. 7, 2019

(87) PCT Pub. No.: WO2018/207880
PCT Pub. Date: Nov. 15, 2018

(65) Prior Publication Data
US 2020/0067407 A1 Feb. 27, 2020

(30) Foreign Application Priority Data

May 11, 2017 (JP) .............................. JP2017094845
May 24, 2017 (JP) .............................. JP2017102531
Jun. 30, 2017 (JP) .............................. JP2017128638

(51) Int. Cl.
*H02M 3/156* (2006.01)
*H02M 1/00* (2006.01)

(52) U.S. Cl.
CPC .... *H02M 3/156* (2013.01); *H02M 2001/0025* (2013.01)

(58) Field of Classification Search
CPC ............ H02M 3/155–1588; H02M 2001/0025
See application file for complete search history.

(56) References Cited

U.S. PATENT DOCUMENTS

2004/0136440 A1 7/2004 Miyata et al.
2005/0285641 A1 12/2005 Miyata et al.
(Continued)

FOREIGN PATENT DOCUMENTS

JP 03-252206 11/1991
JP 2003-298349 10/2003
(Continued)

OTHER PUBLICATIONS

Japan Patent Office, International Search Report for PCT/JP2018/018155 dated Jul. 31, 2018.

*Primary Examiner* — Peter M Novak
(74) *Attorney, Agent, or Firm* — Fish & Richardson P.C.

(57) ABSTRACT

A ripple injection circuit equipped with: a capacitor that passes a frequency component of an input voltage or a frequency component of an output voltage and that generates a first ripple voltage having a first ripple component; and an integration circuit that integrates a comparison result signal and that generates a second ripple voltage having a second ripple component. The first ripple component and the second ripple component are added to a feedback voltage.

9 Claims, 31 Drawing Sheets

(56) References Cited

U.S. PATENT DOCUMENTS

| | | | |
|---|---|---|---|
| 2006/0244499 A1 | 11/2006 | Miyata et al. | |
| 2016/0006354 A1* | 1/2016 | Yamaguchi | H02M 3/1563 |
| | | | 323/282 |
| 2016/0204702 A1* | 7/2016 | Padyana | H02M 1/15 |
| | | | 323/271 |
| 2016/0295657 A1 | 10/2016 | Suzuki et al. | |
| 2017/0085178 A1* | 3/2017 | Larosa | H02M 3/158 |

FOREIGN PATENT DOCUMENTS

| | | |
|---|---|---|
| JP | 2004-328280 | 11/2004 |
| JP | 2010-252627 | 11/2010 |
| JP | 2016-27783 | 2/2016 |
| JP | 2016-192292 | 11/2016 |

* cited by examiner

RIPPLE INJECTION CIRCUIT AND ELECTRONIC DEVICE EQUIPPED WITH THIS CIRCUIT

TECHNICAL FIELD

This invention relates to ripple injection circuits, switching control circuits, and oscillation circuits.

BACKGROUND ART

There are generally known switching power supply circuits that step down or up an input voltage supplied from a power supply by controlling the switching of a switching device and that thereby generate an output voltage. Among others, non-isolated switching power supply circuits using an inductor have been widely used because they can operate at high speed and can easily be reduced in size. Switching power supply circuits of various types are known, and among others, as a type that can operate at higher speed and can achieve reduced cost, for example, switching power supply circuits of a ripple control type like those disclosed in Patent Document 1 have been attracting attention.

LIST OF CITATIONS

Patent Literature

Patent Document 1: JP-A-2010-252627
Patent Document 2: JP-A-2016-192292
Patent Document 3: JP-A-2004-328289
Patent Document 1: JP-H3-252206
Patent Document 1: JP-A-2003-298349

SUMMARY OF THE INVENTION

Technical Problem

FIG. 16 is a diagram schematically showing a conventional switching power supply circuit 21 of a ripple control type. The switching power supply circuit 21 is a step-down switching power supply circuit, and includes a voltage generation circuit DW1, a feedback voltage generation circuit 1, a comparison circuit 2, a gate driver 3, a resistor Rr, and a capacitor Cr. To the switching power supply circuit 21, a DC power supply 4 and a load 5 are connected.

The voltage generation circuit DW1 includes an input terminal T1, a capacitor Cin, a switching device Q1, a diode D1, an inductor L1, a capacitor C2, and an output terminal T2. The voltage generation circuit DW1 has a function as a step-down converter; it smooths, with the capacitor Cin, an input voltage Vin supplied from the DC power supply 4; it then smooths, with the capacitor C2, the voltage generated from the voltage smoothed by the capacitor Cin by the inductor L1 as the switching device Q1 is turned on and off; and it then outputs the resulting voltage from the output terminal T2 as an output voltage Vout. Here, the node between the inductor L1 and the source terminal S of the switching device Q1 is referred to as a node N1, and the voltage at the node N1 of which the level changes as the switching device Q1 is turned on and off is referred to as a switching voltage Vn1. The anode of the diode D1 is grounded and the cathode of the diode D1 is connected to the node N1.

The resistor Rr and the capacitor Cr integrate the switching voltage Vn1 led from the node N1 to generate a ripple voltage VS1. Here, the node between the resistor Rr and the capacitor Cr is referred to as a node N2. The ripple voltage VS1 is generated, as the switching device Q1 is turned on and off, by integrating the switching voltage Vn1 of which the level changes between, for example, 0 V and 12 V, and thus the ripple voltage VS1 includes a ripple component that reflects the level change.

The feedback voltage generation circuit 1 includes voltage division resistors R1 and R2, and divides the output voltage Vout to generate a feedback voltage Vfb. Here, the node between the voltage division resistors R1 and R2 is referred to as a node N3. The node N3 and the node N2 are connected together. Thus, the feedback voltage Vfb at the node N3 equal to the sum of the voltage resulting from dividing the output voltage Vout with the voltage division resistors R1 and R2 and the ripple voltage VS1, and includes a ripple component of the ripple voltage VS1.

The comparison circuit 2 includes a comparator 2a, a reference voltage source 2b, a hysteresis circuit 2c, and a constant voltage source 2d. The inverting input terminal of the comparator 2a is connected to the node N3 and is fed with the feedback voltage Vfb from the feedback voltage generation circuit 1. The non-inverting input terminal of the comparator 2a is fed with, from the reference voltage source 2b, a reference voltage Vref1 that is determined by the hysteresis circuit 2c.

The comparator 2a compares the voltage $V_-$ (=the feedback voltage Vfb) led to the inverting input terminal with the voltage $V_+$ (=the reference voltage Vref1) fed to the non-inverting input terminal, and outputs a comparison result signal Vcom as a result of the comparison. When the voltage $V_-$ is higher than the voltage $V_+$, the comparator 2a outputs, as the result of the comparison, the comparison result signal Vcom at low level, for example at 0 V, with a delay corresponding to its operation time, and when the voltage $V_-$ is lower than the voltage $V_+$ the comparator 2a outputs, as the result of the comparison, the comparison result signal Vcom at high level, for example at 5 V, with a delay corresponding to its operation time.

The hysteresis circuit 2c includes resistors R3 and R4. One end of the resistor R3 is connected to the output terminal of the comparator 2a, and the other end of the resistor R3 is connected to the non-inverting input terminal of the comparator 2a. One end of the resistor R4 is connected to the other end of the resistor R3 and to the non-inverting input terminal of the comparator 2a, and the other end of the resistor R4 is connected to the reference voltage source 2b. The hysteresis circuit 2c has so-called hysteresis characteristics, generating, from the voltage fed from the reference voltage source 2b, the reference voltage Vref1 that is determined by the resistance ratio between the resistors R4 and R3 and then feeding it to the non-inverting input terminal of the comparator 2a.

A constant voltage output from the constant voltage source 2d is used as a drive voltage for the comparator 2a.

The gate driver 3 is fed with the comparison result signal Vcom from the comparison circuit 2, and feeds the gate terminal G of the switching device Q1 with a control signal VG1 of which the voltage level changes according to the voltage level of the comparison result signal Vcom. When the comparison result signal Vcom is at high level, the gate driver 3 feeds the control signal VG1 at high level, for example at 17 V, to the gate terminal G of the switching device Q1, and when the comparison result signal Vcom is at low level, the gate driver 3 feeds the control signal VG1 at low level, for example at 0 V, to the gate terminal G of the switching device Q1; the gate driver 3 thereby turns the switching device Q1 on and off. Thus, the level of the switching voltage Vn1 changes between, for example, 0 V and 12 V.

FIG. 17 is a diagram showing signal waveforms versus time at relevant points in the switching power supply circuit 21 shown in FIG. 16. FIG. 17(a) is a diagram showing the relationship between the signal waveform of the voltage $V_-$ and the voltage $V_+$. FIG. 17(b) is a diagram showing the signal waveform of the comparison result signal Vcom. FIG. 17(c) is a diagram showing the level change of the voltage Vn1. In FIG. 17(a) to 17(c), the vertical axis represents voltage level V and the horizontal axis represents time t, time points t10 to t17 being common to FIG. 17(a) to 17(c).

At time point t10, the voltage $V_-$, for example 3 V, is higher than the voltage $V_+$, for example 2 V, and thus the comparison result signal Vcom at low level is output from the comparison circuit 2. Since the comparison result signal Vcom is at low level, the switching device Q1, which is controlled by the gate driver 3, is off, so that the switching voltage Vn1 is at a level lower than the ground potential by the voltage drop across the diode D1. Here, in FIG. 17(c), for the sake of convenience, when the switching voltage Vn1 is lower than 0 V, it shows 0 V.

At time point t11, when the voltage $V_-$ becomes equal to or lower than the voltage $V_+$, the comparison result signal Vcom at high level is output from the comparison circuit 2 with a delay corresponding to the operation time of the comparison circuit 2, that is, at time point t12, and is fed to the gate driver 3. Here, the operation speed of the gate driver 3 is lower than that of the comparison circuit 2 and thus the time point at which the switching device Q1 is turned on is delayed until time point t13. Thus, the voltage $V_-$ based on the switching voltage Vn1 continues to decrease down to, for example, 1 V during the period A1 between time points t12 and t13, that is, after the comparison result signal Vcom turns to high level until the switching device Q1 turns on.

At time point t13, when the control signal VG1 at high level is fed from the gate driver 3 to the gate terminal G of the switching device Q1 with a delay corresponding to the operation time of the gate driver 3, the switching device Q1 turns on. Thus, the input voltage Vin is supplied from the DC power supply 4 via the switching device Q1 to the node N1 so that the switching voltage Vn1 increases, and thus also the output voltage Vout increases. As the output voltage Vout increases, the voltage $V_-$ also increases. The switching voltage Vn1 increases up to, for example, 12 V. Here, the potential of the voltage $V_-$ takes so much time to become higher than the voltage $V_+$ again as corresponding to how long it continued decreasing during the period A1.

At time point t14, when the voltage $V_-$ becomes higher than the voltage $V_+$, the comparison result signal Vcom at low level is output from the comparison circuit 2 with a delay corresponding to the operation time of the comparison circuit 2, that is, at time point t15, and is fed to the gate driver 3. Here, the operation speed of the gate driver 3 is lower than that of the comparison circuit 2, and thus the time point at which the switching device Q1 is turned off is delayed until time point t16. Thus, the potential of voltage $V_-$ based on the potential at the node N1 continues to increase up to, for example, 3 V during the period B1 between time points t15 to t16, that is, after the comparison result signal Vcom turns to low level until the switching device Q1 turns off. Here, the voltage $V_-$ contains the ripple component of the ripple voltage VS1, and it thus greatly increases.

At time point t16, when the control signal VG1 at low level is fed from the gate driver 3 to the gate terminal G of the switching device Q1 with a delay corresponding to the operation time of the gate driver 3, the switching device Q1 turns off. Thus, the supply of the input voltage Vin from the DC power supply 4 to the node N1 is stopped so that the switching voltage Vn1 decreases, and thus also the output voltage Vout decreases. As the output voltage Vout decreases, the voltage $V_-$ also decreases. Here, the potential of the voltage $V_-$ takes so much time to become equal to or lower than the voltage $V_+$ again as corresponding to how long it continued increasing during the period B1.

As described above, in the switching power supply circuit 21, even after the level of the comparison result signal Vcom changes, the voltage $V_-$ continues to increase or decrease for a predetermined period, and thus the voltage $V_-$ takes time to become equal to the voltage $V_+$ again; this inconveniently makes it impossible to stably supply the output voltage Vout to the load 5. In particular, the voltage $V_-$ contains the ripple component of the ripple voltage VS1 that is affected by the level change of the switching voltage Vn1, and this increases the variation of the voltage $V_-$; as a result, making more notable the problem described above occurring when the voltage $V_-$ increases or decreases.

FIG. 18 is a diagram schematically showing a configuration where a ripple control type similar to that in the switching power supply circuit 21 is applied to a step-up switching power supply circuit. That is, the switching power supply circuit 22 shown in FIG. 18 is a step-up switching power supply circuit where the voltage generation circuit DW1 in the switching power supply circuit 21 is replaced with a voltage generation circuit UP1.

The voltage generation circuit UP1 includes an input terminal T1, a capacitor Cin, a switching device Q1, a diode D1, an inductor L1, a capacitor C2, and an output terminal T2. In the voltage generation circuit UP1, first, the switching device Q1 is turned on, and a current commensurate with an input voltage Vin supplied from the DC power supply 4 and then fed to the input terminal T1 is passed through the inductor L1 so that magnetic energy is stored in the inductor L1; then, the switching device Q1 is turned off and the magnetic energy in the inductor L1 is discharged to generate a high voltage. The voltage so stepped up is smoothed by the capacitor Cin and is output from the output terminal T2 as the output voltage Vout. The diode D1 serves to stably feed, when the switching device Q1 is off, the energy generated in the inductor L1 to Use output terminal T2.

Here, start-up of the switching power supply circuits 21 and 22 will be described.

At start-up of the switching power supply circuits 21, the voltage $V_+$ is higher than the voltage $V_-$, and thus the switching device Q1 turns on. As a result, energy is supplied to the load 5 so that the voltage $V_-$ increases. As the voltage $V_-$ increases, the voltage $V_-$ becomes higher than the voltage $V_+$, and the level of the comparison result signal Vcom changes from high level to low level. Thus, the switching power supply circuit 21 operates without problem.

Likewise, at start-up of the switching power supply circuit 22, as with the switching power supply circuit 21, the voltage $V_+$ is higher than the voltage $V_-$, and thus the switching device Q1 turns on. However, in the switching power supply circuit 22, even if the switching device Q1 turns on, energy is simply stored in the inductor L1 and is not supplied to the load 5. Thus, the voltage $V_-$ does not increase. Accordingly, the level of the comparison result signal Vcom remains at high level and does not change to low level. As a result, the switching power supply circuit 22 does not operate.

In a switching power supply that converts an input voltage into an output voltage by constant voltage control, feedback control is generally performed such that the output voltage remains equal to a target voltage.

However, in the feedback control mentioned above, when the input voltage varies, it is only after the output voltage varies as a result of the variation of the input voltage that control for suppressing the variation of the output voltage takes effect; it is thus impossible to sufficiently suppress the variation of the output voltage. Thus, in the feedback control mentioned above, to sufficiently suppress the variation of the output voltage, it is necessary to sufficiently suppress the variation of the input voltage by increasing the capacity of the input capacitor.

Patent Document 2 discloses a DC power supply device that can improve response to variation of the input voltage. Although, in the DC power supply device proposed in Patent Document 2. feedforward control according to the variation of the input voltage is performed, no information on an output voltage command value is included in the feedforward control. Thus, a problem with the DC power supply device proposed in Patent Document 2 is that a desired output voltage cannot be obtained by feedforward control alone and an ideal duty command value cannot be obtained by feedforward control alone. That is, there is still room to improve response.

Conventionally, various oscillation circuits that can adjust the oscillation frequency as necessary have been proposed.

However, in cases where spectrum spreading of the oscillation frequency is performed, conventional oscillation circuits require digital-analog converters and operators, and this inconveniently result in a large circuit scale (for example, see Patent Document 3).

In conventional oscillation circuits that can adjust the oscillation frequency as necessary through replacement of discrete components (such as a resistor and a capacitor), the oscillation frequency is naturally fixed after the choice of discrete components, and thus it is impossible to perform spectrum spreading of the oscillation frequency (for example, see Patent Documents 4 and 5).

Against the background described above, an object of a first aspect of the present invention disclosed herein is to provide a ripple injection circuit that can operate a step-up switching power supply circuit normally and that can stabilize the output value of the step-up switching power supply circuit, and to provide a step-up switching power supply circuit and an electronic device incorporating such a ripple injection circuit.

Against the background described above, an object of a second aspect of the present invention disclosed herein is to provide a switching control circuit that can greatly improve response to variation of an input voltage in a switching power supply, and to provide a switching power supply, an AC adapter, and an electronic device incorporating such a switching control circuit.

In view of the above-mentioned problems encountered by the present inventors, an object of a third aspect of the present invention disclosed herein is to provide an oscillation circuit that can easily perform spectrum spreading, and to provide an electronic device incorporating such an oscillation circuit.

Means for Solving the Problem

First Invention

According to one aspect of a first invention disclosed herein, a ripple voltage injection circuit includes, a capacitor configured to pass a frequency component of an input voltage or a frequency component of an output voltage to generate a first ripple voltage including a first ripple component: and an integration circuit configured to integrate a comparison result signal to generate a second ripple voltage including a second ripple component. Here, the first and second ripple components are added to a feedback voltage. (Configuration 1-1)

In the ripple voltage injection circuit of Configuration 1-1 described above, preferably, the integration circuit includes a resistor to which the comparison result signal is fed and the capacitor. (Configuration 1-2)

According to another aspect of the first invention disclosed herein, a ripple voltage injection circuit includes: a first integration circuit configured to integrate a switching voltage generated by turning on and off a switching device to generate a first ripple voltage including a first ripple component; and a second integration circuit configured to integrate a comparison result signal to generate a second ripple voltage including a second ripple component. Here, the first and second components are added to a feedback voltage. The first integration circuit includes a first resistor to which the switching voltage is fed and a first capacitor, and the second integration circuit includes a second resistor to which the comparison result signal is fed and a second capacitor. The resistance values of the first and second resistors are set such that the value obtained by dividing the high level of the comparison result signal by the resistance value of the second resistor is higher than the value obtained by dividing the output voltage by the resistance value of the first resistor. (Configuration 1-3)

In the ripple voltage injection circuit of Configuration 1-3 described above, preferably, the first and second capacitors are composed of the same capacitor. (Configuration 1-4)

In the ripple voltage injection circuit of Configuration 1-3 or 1-4 described above, the feedback voltage is generated by a feedback voltage generation circuit including a first voltage division resistor to which the output voltage is applied and a second voltage division resistor connected in series between the first voltage division resistor and the ground voltage. The resistance value of the first resistor is preferably set such that the resistance value of the first resistor is higher than the resistance value of the second voltage division resistor and the resistance value of the first resistor is higher than the resistance value of the second resistor. (Configuration 1-5)

In the ripple voltage injection circuit of any one of Configurations 1-1 to 1-5 described above, the feedback voltage is generated by a feedback voltage generation circuit including a first voltage division resistor to which the output voltage is applied and a second voltage division resistor connected in series between the first voltage division resistor and the ground voltage. When the resistance value of the first voltage division resistor is represented by R and the minimum frequency of a frequency component included in the reference voltage is represented by f, a capacity C of the capacitor or of the first capacitor is preferably set to fulfill $R > (1/2 \pi f C)$. (Configuration 1-6)

According to another aspect of the first invention disclosed herein, a step-up switching power supply circuit includes: a voltage generation circuit configured to smooth, with a capacitor, the voltage generated in an inductor by turning on and off a switching device connected to one end of the inductor to generate the output voltage higher than the input voltage fed to the other end of the inductor; a feedback voltage generation circuit configured to divide the output voltage to generate the feedback voltage; a comparison circuit configured to compare the feedback voltage with a reference voltage and to output the result of the comparison as the comparison result signal; and the ripple voltage injection circuit according to any one of Configurations 1-1 to 1-6. Here, the switching device is turned on and off based on the comparison result signal. (Configuration 1-7)

In the step-up switching power supply circuit of Configuration 1-7 described above, preferably, a signal which varies with time and of which the minimum value is greater than zero is used as the reference voltage. (Configuration 1-8)

In the step-up switching power supply circuit of Configuration 1-7 or 1-8 described above, preferably, the output terminal of the comparison circuit is directly connected to the control terminal of the switching device. (Configuration 1-9)

In the step-up switching power supply circuit of Configuration 1-9 described above, when the input capacity of the switching device is represented by $C_{ISS}$, the switching frequency of the switching device is represented by $f_{SW}$, the maximum output current of the comparison circuit is represented by $I_{GMAX}$, and the high level of the comparison result signal is represented by $V_{GH}$, preferably, the input capacity $C_{ISS}$ of the switching device is set so as to fulfill $2C_{ISS}V_{GH}/I_{GMAX} < 1/f_{SW}$. (Configuration 1-10)

According to another aspect of the first invention disclosed herein, an electronic device includes: the step-up switching power supply circuit according to any one of Configurations 1-7 to 1-10 described above; a load circuit to which the output of the step-up switching power supply circuit is connected. (Configuration 1-11)

Second Invention

According to one aspect of a second invention disclosed herein, a switching control circuit configured to control the switching state of a switching device that converts an input voltage to yield an output includes: a determiner configured to determine the steady suite duty of the switching device by calculation involving the input voltage and a target voltage in a continuous current mode; and a control signal generator configured to generate a control signal for the switching device based on the duty determined by the determiner. (Configuration 2-1)

According to another aspect of the second invention disclosed herein, a switching control circuit configured to control the switching state of a switching device that converts an input voltage to yield an output includes: a determiner configured to determine the steady state duty of the switching device based on the input voltage, a target voltage, and the resistance of a load to which the output is connected in a discontinuous current mode and the result of monitoring by a current monitor that monitors an output current passing through the output, and a control signal generator configured to generate a control signal for the switching device based on the duty determined by the determiner. (Configuration 2-2)

According to another aspect of the second invention disclosed herein, a switching control circuit configured to control the switching state of a switching device that converts an input voltage to yield an output includes: a checker configured to check whether a circuit including the switching device is operating in a continuous current mode or in a discontinuous current mode; a determiner configured to determine the duty of the switching device; and a control signal generator configured to generate a control signal for the switching device based on the duty determined by the determiner. Here, when the checker judges that the circuit including the switching device is operating in the continuous current mode, the determiner determines the steady state duty by calculation involving the input voltage and a target voltage in the continuous current mode, and when the checker judges that the circuit including the switching device is operating in the discontinuous current mode, the determiner determines the steady state duty based on the input voltage, a target voltage, and the resistance of a load connected to the circuit including the switching device in the discontinuous current mode and the result of monitoring by a current monitor that monitors an output current of the circuit including the switching device. (Configuration 2-3)

In the switching control circuit of any one of Configurations 2-1 to 2-3 described above, preferably, the determiner receives the input voltage or a voltage commensurate with the input voltage and uses the input voltage or the voltage commensurate with the input voltage only for feedforward control. (Configuration 2-4)

In the switching control circuit of any one of Configurations 2-1 to 2-4 described above, preferably, the determiner determines the duty by, in addition to the calculation, the difference between the output voltage and the target voltage. (Configuration 2-5)

In the switching control circuit of Configuration 2-5 described above, preferably, the determiner calculates the duty by adding up a feedforward control output value obtained by the calculation and a feedback control output value corresponding to the difference between the output voltage and the target voltage. (Configuration 2-6)

According to another aspect of the second invention disclosed herein, a switching power supply configured to perform voltage conversion on an input voltage input via the input terminal by use of a switching device to yield an output via the output terminal includes: the switching control circuit according to any one of Configurations 2-1 to 2-6; the switching device configured to be controlled by the switching control circuit, and an input capacitor that is connected to the input terminal to smooth the input voltage. Here, the input capacitor is a film capacitor or a laminated ceramic capacitor. (Configuration 2-7)

According to another aspect of the second invention disclosed herein, a switching power supply configured to perform voltage conversion on an input voltage input via the input terminal by use of a switching device to yield an output via the output terminal includes: the switching control circuit according to any one of Configurations 2-1 to 2-6; and the switching device configured to be controlled by the switching control circuit. Here, the input terminal is provided with no input capacitor for smoothing the input voltage. (Configuration 2-8)

In the switching power supply of Configuration 2-7 or 2-8 described above, preferably, there is further provided a transformer that includes a primary winding to which the input terminal is connected and a secondary winding to which the output terminal is connected, and the switching device is connected between the other end of the primary winding and the ground voltage. (Configuration 2-9)

In the switching power supply of any one of Configurations 2-7 to 2-9 described above, preferably, there is further provided a rectifier configured to rectify an AC voltage to generate the input voltage and then feeds the input voltage to the input terminal. (Configuration 2-10)

According to another aspect of the second invention disclosed herein, an AC adapter includes: the switching power supply according to Configuration 2-10 described above; a plug; and a connector. (Configuration 2-11)

According to another aspect of the second invention disclosed herein, an electronic device includes: the switching power supply according to any one of Configurations 2-7 to 2-10; and a load circuit configured to operate by being fed with the output voltage output from the switching power supply. (Configuration 2-12)

Third Invention

According to one aspect of a third invention disclosed herein, an oscillation circuit includes: a transistor configured to control the conduction slate between its second and third terminals according to a signal fed to its first terminal; an oscillator configured to apply an oscillation signal to the first terminal to periodically change the ON-resistance value or the parasitic capacitance value of the transistor; and an output signal generator configured to generate an output signal at an oscillation frequency corresponding to the ON-resistance value or the parasitic capacitance value of the transistor. (Configuration 3-1)

In the oscillation circuit of Configuration 3-1 described above, preferably, the oscillator applies the oscillation voltage between the first and second terminals of the transistor to periodically change the ON-resistance value between the second and third terminals of the transistor. (Configuration 3-2)

In the oscillation circuit of Configuration 3-2 described above, preferably, there is further provided a resistor that is connected in series between the second terminal of the transistor and the output signal generator, and the output signal generator generates the output signal at an oscillation frequency corresponding to the composite resistance value calculated from the ON-resistance value of the transistor and the resistance value of the resistor. (Configuration 3-3)

In the oscillation circuit of Configuration 3-2 described above, preferably, there is further provided a resistor that is connected in parallel between the second and third terminals of the transistor, and the output signal generator generates the output signal at an oscillation frequency corresponding to the composite resistance value calculated from the ON-resistance value of the transistor and the resistance value of the resistor. (Configuration 3-4)

In the oscillation circuit of Configuration 3-2 described above, preferably, there are further provided a first resistor that is connected in series between the second terminal of the transistor and the output signal generator and a second resistor that is connected in parallel between the second and third terminals of the transistor. Here, the output signal generator preferably generates the output signal at an oscillation frequency corresponding to the composite resistance value calculated from the ON-resistance value of the transistor and resistance values of the first and second resistors respectively. (Configuration 3-5)

In the oscillation circuit of Configuration 3-2 described above, preferably, there are further provided a first resistor dial is connected in series between the second terminal of the transistor and the output signal generator and a second resistor that is connected in parallel with a series circuit comprising the transistor and the first resistor. Here, the output signal generator preferably generates the output signal at an oscillation frequency corresponding to the composite resistance value calculated from the ON-resistance value of the transistor and the resistance values of the first and second resistors respectively. (Configuration 3-6)

In the oscillation circuit of Configuration 3-1 described above, preferably, the oscillator applies the oscillation voltage between the second and third terminals of the transistor to periodically change the parasitic capacitance value between the first and third terminals of the transistor. (Configuration 3-7)

In the oscillation circuit of any one of Configurations 3-1 to 3-7 described above, preferably, when the capacitance value between the fourth and fifth terminals of a driving target transistor of which the conduction state between the fifth and sixth terminals is turned on and off by the output signal according to a signal fed to the fourth terminal is represented by Cgs, the resistance value of the fourth terminal is represented by Rg, and the minimum On-period is represented by Tonmin, then $3.5 \times Rg \times Cgs \leq Tonmin$ holds. (Configuration 3-8)

In the oscillation circuit of any one of Configurations 3-1 to 3-8 described above, preferably, the oscillator is a Wien-bridge oscillator. (Configuration 3-9)

In the oscillation circuit of any one of Configurations 3-1 to 3-7 described above, preferably, the oscillator is a blocking oscillator including an npn bipolar transistor, a first resistor, a second resistor, a third resistor, first and second coils magnetically coupled together, and a DC voltage source. Preferably, the positive terminal of the DC voltage source is connected to the first terminal of she third resistor; the negative terminal of the DC voltage source is connected to the ground terminal; the second terminal of the third resistor, the first terminal of the first coil, and the first terminal of the second coil are connected to the drain of the transistor; the collector of the npn bipolar transistor, the first terminal of the second resistor, and the second terminal of the first coil are connected to the gate of the transistor; the emitter of the npn bipolar transistor is connected to the ground terminal; the second terminal of the second resistor is connected to the source of the transistor; the second terminal of the second coil is connected to the first terminal of the first resistor; and the second terminal of the first resistor is connected to the base of the npn bipolar transistor. (Configuration 3-10)

According to another aspect of the third invention disclosed herein, an electronic device includes, the oscillation circuit according to any one of Configurations 3-1 to 3-10; and a load circuit configured to operate by being fed with the output signal output from the oscillation circuit. (Configuration 3-11)

Advantageous Effects of the Invention

According to the first invention disclosed herein, it is possible to operate a step-up switching power supply circuit normally and to stabilize the output voltage of the step-up switching power supply circuit.

According to the second invention disclosed herein, it is possible to greatly improve the response to variation of the input voltage in a switching power supply.

According to the third invention disclosed herein, it is possible to provide an oscillation circuit that can easily perform spectrum spreading.

DESCRIPTION OF EMBODIMENTS

First Invention

First Embodiment

Figure 1:
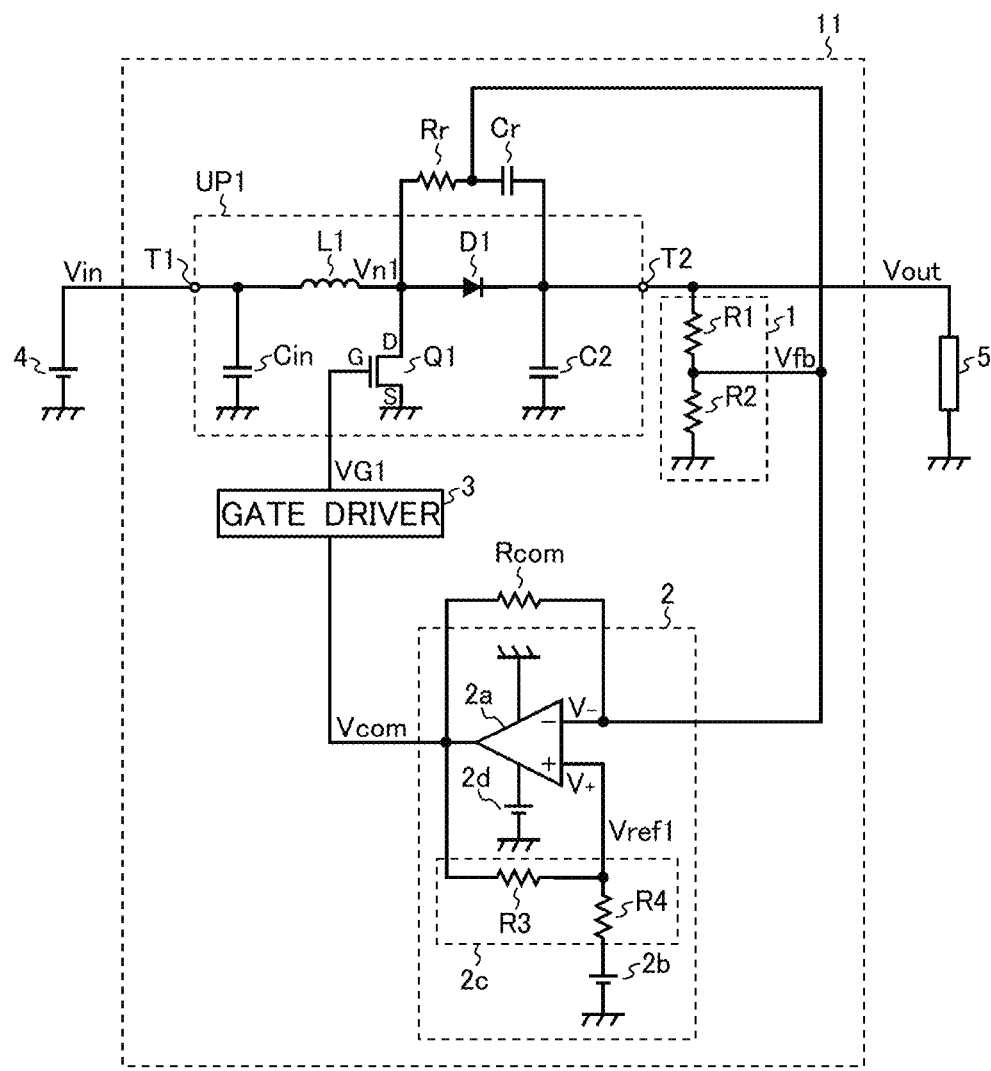
FIG. 1 is a diagram schematically showing a step-up switching power supply circuit according to a first embodiment.
Figure 18:
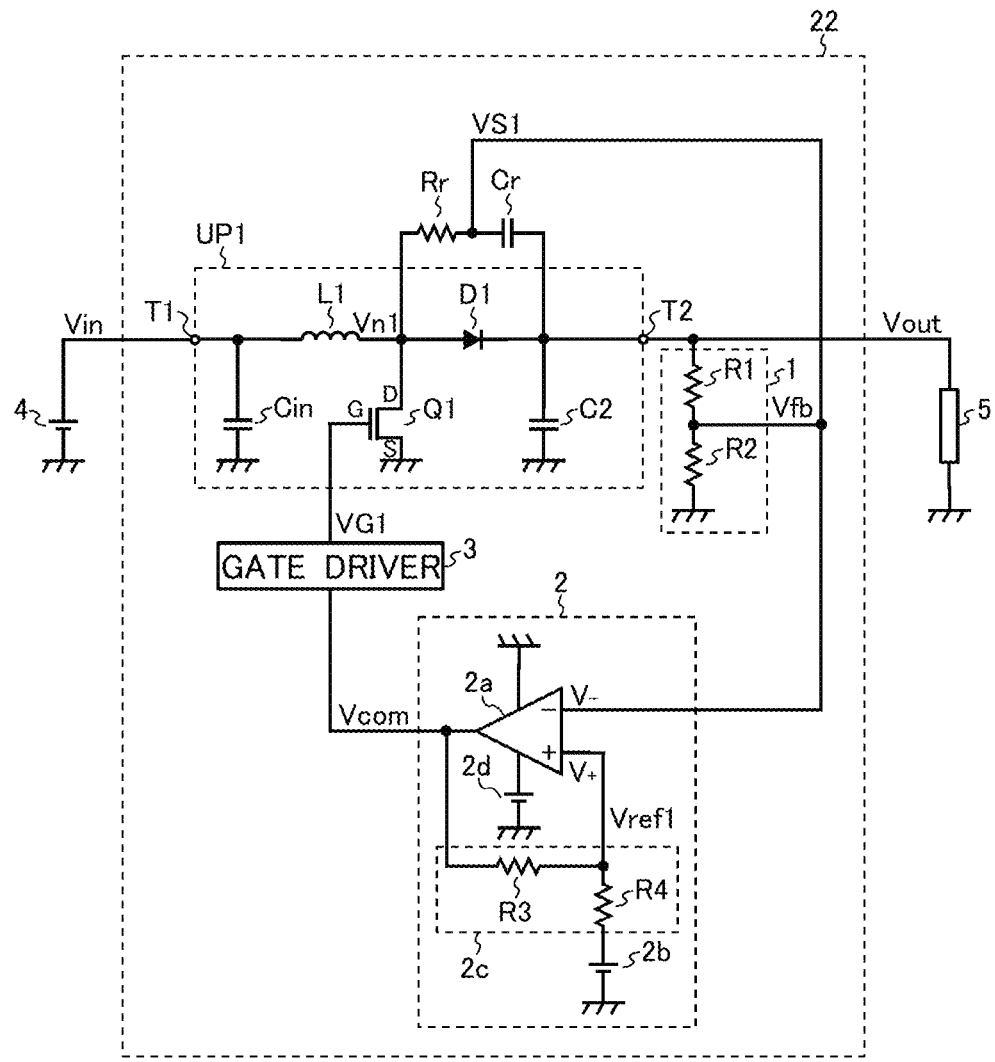
FIG. 18 is a diagram schematically showing a configuration where ripple control similar to that in the switching power supply circuit shown in FIG. 16 is applied to a step-up switching power supply circuit.

FIG. 1 is a diagram schematically showing a step-up switching power supply circuit 11 according to a first embodiment. The step-up switching power supply circuit 11, as compared with the switching power supply circuit 22 shown in FIG. 18, further includes a resistor Rcom. One end of the resistor Rcom is connected to the output terminal of the comparator 2a and the other end of the resistor Rcom is connected to the inverting input terminal of the comparator 2a.

The integration circuit formed by the resistor Rr and the capacitor Cr integrates the switching voltage Vn1 appearing at the node between the inductor L1 and the drain terminal of the switching device Q1 to generate a first ripple voltage including a first ripple component.

The integration circuit formed by the resistor Rcom and the capacitor Cr integrates the comparison result signal Vcom to generate a second ripple voltage including a second ripple component.

The node between the resistors Rr and Rcom and the capacitor Cr is connected to the node between voltage division resistors R1 and R2, and thus the first and second ripple components are added to the feedback voltage Vfb.

In the step-up switching power supply circuit 11, by adding the first ripple component to the feedback voltage Vfb to increase the variation of the potential per unit time, it is possible to reduce the influence of noise. Moreover, in the step-up switching power supply circuit 11, since the second ripple component is added to the feedback voltage Vfb, it is possible to suppress a drop in the potential of the feedback voltage Vfb after the comparison result signal Vcom turns to high level and also to suppress an increase in the potential of the feedback voltage Vfb after the comparison result signal Vcom turns to low level. It is thus possible to stabilize the output voltage Vout.

Furthermore, in the step-up switching power supply circuit 11, electric power can be fed from the output terminal of the comparator 2a to the inverting input terminal of the comparator 2a via the resistor Rcom, and thus, at start-up of the step-up switching power supply circuit 11, the voltage V_ can be increased.

When the comparison result signal Vcom is at high level (for example, with the same value as the constant voltage output from the constant voltage source 2d), the switching voltage Vn1 has approximately the same value as the ground voltage (0 V). On the other hand, when the comparison result signal Vcom is at low level (for example, with the same value as the ground value), the switching voltage Vn1 has approximately the same value as the output voltage Vout. Thus, the level change pattern of the first ripple component and the level change pattern of the second ripple component are opposite to each other.

Since the level change pattern of the first ripple component and the level change pattern of the second ripple component are opposite to each other, under a predetermined condition, when the comparison result signal Vcom is at high level, the voltage V_ monotonically increases, and when the comparison result signal Vcom is at low level, the voltage V_ monotonicaliy decreases. This—when the comparison result signal Vcom is at high level, the voltage V_ monotonicaliy increases, and when the comparison result signal Vcom is at low level, the voltage V_ monotonicaliy decreases—results in the comparison signal Vcom turning from high level to low level and then turning from low level to high level, so that the step-up switching power supply circuit 11 operates normally. Now, the predetermined condition mentioned above will be described.

When Kirchhoff's law and the principle of superposition are applied to the part of the discussion above where the first and second ripple components are added to the feedback voltage Vfb, the voltage V_ is the sum of the solutions Va, Vb, and Vc of the three equations below. Thai is, V_=Va+Vb+Vc holds. In the three equations below, R1 represents the resistance value of the voltage division resistor R1, R2 represents the resistance value of the voltage division resistor R2, Rr represents the resistance value of the resistor Rr, Rcom represents the resistance value of the resistor Rcom, and Cr represents the capacity of the capacitor Cr.

Expression 1
$$\left\{Cr\frac{d(Vout-Va(t))}{dt}+\frac{Vout-Va(t)}{R1}\right\}(Rcom // Rr // R2) = Va(t)$$
$$CrRr\left\{\frac{dVb(t)}{dt}+\frac{Vb(t)}{\tau}\right\} = Vn1(t)$$
$$CrRcom\left\{\frac{dVc(t)}{dt}+\frac{Vc(t)}{\tau}\right\} = Vcom(t)$$

Solving the three equations allows the voltage V_ in a steady state to be given by the formulae below. Vcc represents the high level of the comparison result signal Vcom.

When the comparison result signal Vcom is at high level.

Expression 2
$$V_- = \frac{\tau}{Cr}\left\{\frac{Vout}{R1}+\frac{Vcc}{Rcom}+A\left(\frac{Vout}{Rr}-\frac{Vcc}{Rcom}\right)e^{-\frac{t}{\tau}}\right\}$$

When the comparison result signal Vcom is at low level.

Expression 3
$$V_- = \frac{\tau}{Cr}\left\{\frac{Vout}{R1}+\frac{Vcc}{Rr}-B\left(\frac{Vout}{Rr}-\frac{Vcc}{Rcom}\right)e^{-\frac{t}{\tau}}\right\}$$

Here, when the On-duty of the switching device Q1 is represented by D and the switching period of the switching device Q1 is represented by T, then the variables τ, A, and B above are determined as follows.

Expression 4
$$\tau = \frac{CrR1(Rcom // Rr // R2)}{R1+(Rcom // Rr // R2)}$$
$$A = \frac{e^{\frac{T}{\tau}}-e^{\frac{DT}{\tau}}}{e^{\frac{T}{\tau}}-1}$$
$$B = \frac{e^{\frac{T}{\tau}}-e^{\frac{(1-D)T}{\tau}}}{e^{\frac{T}{\tau}}-1}$$

From the formulae representing the voltage V_ in the steady state, it will be understood that to the above-mentioned predetermined condition, the inequality below needs to be fulfilled. Thus, in the step-up switching power supply circuit 11, the resistance values of the resistors Rr and Rcom are set so as to fulfill the inequality below.

Expression 5
$$\frac{Vcc}{Rcom} > \frac{Vout}{Rr}$$

Second Embodiment

Figure 2:
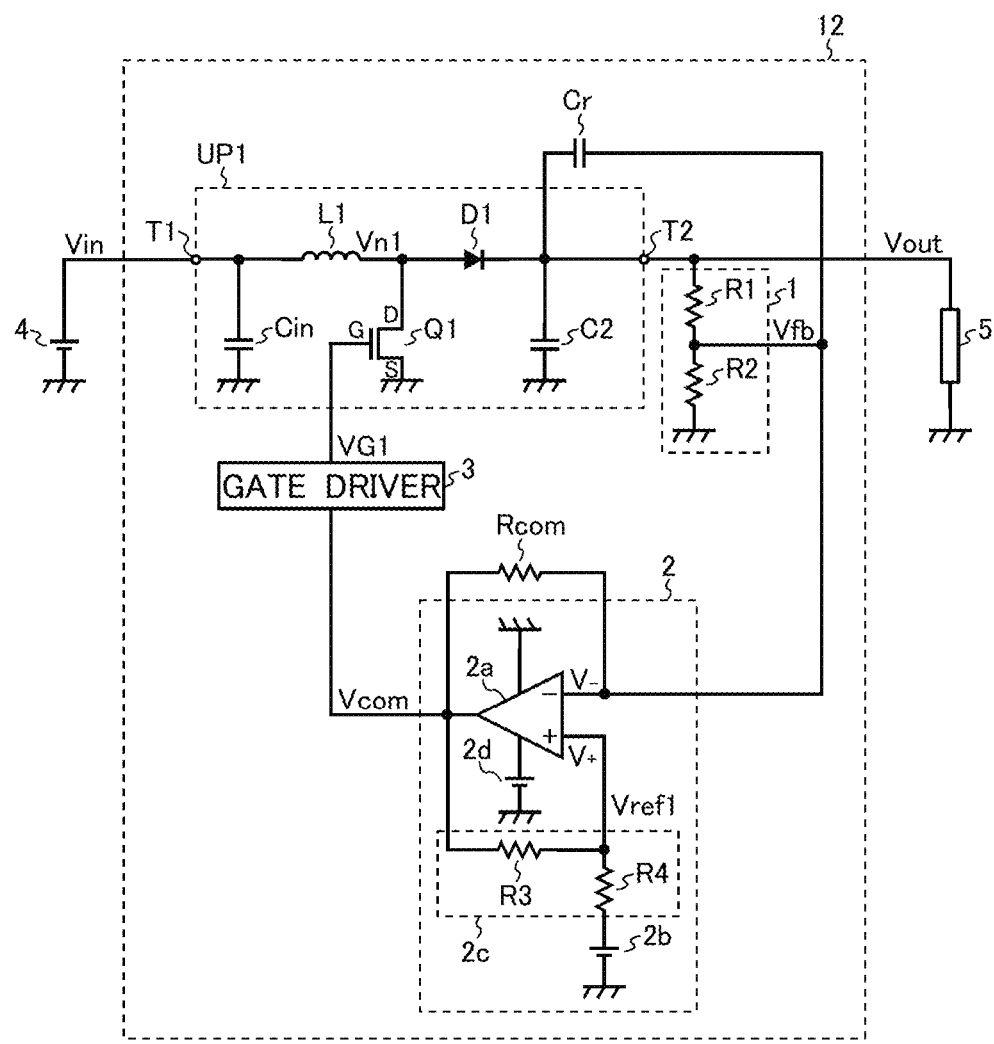
FIG. 2 is a diagram schematically showing a step-up switching power supply circuit according to a second embodiment.

FIG. 2 is a diagram schematically showing a step-up switching power supply circuit 12 according to a second embodiment. The step-up switching power supply circuit 12 results from omitting the resistor Rr from the step-up switching power supply circuit 11 shown in FIG. 1.

The step-up switching power supply circuit 12 shown in FIG. 2 equivalent to the step-up switching power supply circuit 11 shown in FIG. 1 if the resistance value of the resistor Rr is infinity, Thus, in the step-up switching power supply circuit 12 shown in FIG. 2, the condition under which, when the comparison result signal Vcom is at high level, the voltage V_ monotonically increases and, when the comparison result signal Vcom is at low level, the voltage V_ monotonicaliy decreases is as follows. The condition below holds irrespective of the resistance value of the resistor Rcom.

Expression 6
$$\frac{Vcc}{Rcom} > \frac{Vout}{\infty}$$
$$\frac{Vcc}{Rcom} > 0$$

In the step-up switching power supply circuit 12 shown in FIG. 2, the capacitor Cr passes the frequency component of the output voltage Vout to generate the first ripple voltage including the first ripple component.

Comparison Between First and Second Embodiments

In the step-up switching power supply circuit 11 shown in FIG. 1, by setting the resistance value of the resistor Rr such that the resistance value of the resistor Rr is higher than the resistance value of the voltage division resistor R2 and that the resistance value of the resistor Rr is higher than the resistance value of the resistor Rcom, it is possible to reduce the variation width of the voltage V_ as compared with in the step-up switching power supply circuit 12 shown in FIG. 2, and thereby to achieve faster operation than in the step-up switching power supply circuit 12 shown in FIG. 2.

Figure 3:
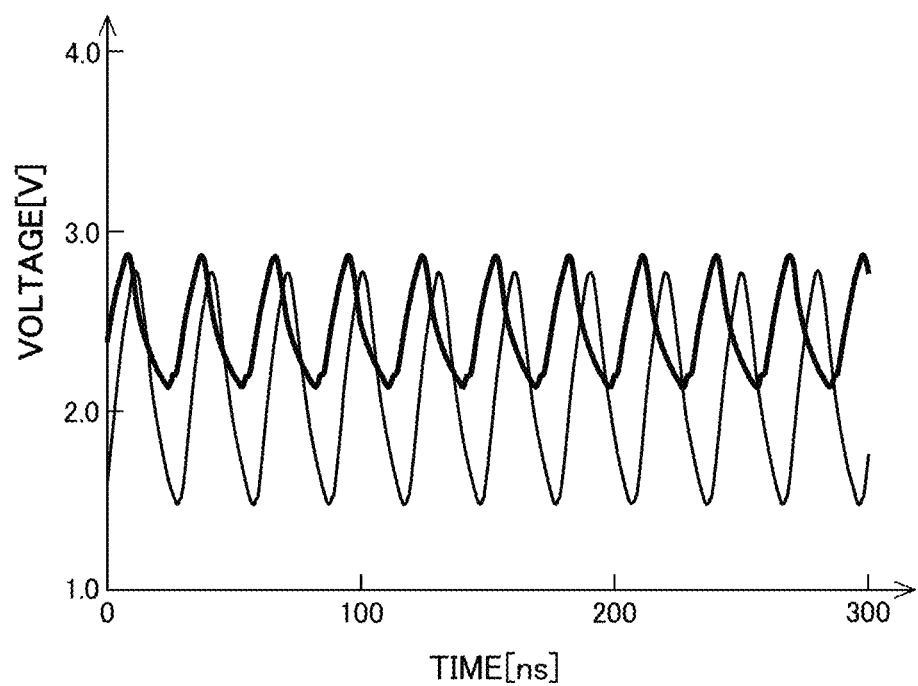
FIG. 3 is a time chart showing the voltage waveform at the inverting input terminal of a comparator.

FIG. 3 is a time chart showing the waveform of the voltage V_ fed to the inverting input terminal of the comparator 2a in the step-up switching power supply circuit 11 shown in FIG. 1.

FIG. 3 shows the result of a simulation performed with the resistance value of the resistor Rr set at 100 kΩ. The resistance value of the voltage division resistor R1 set at 9 kΩ, the resistance value of the voltage division resistor R2 set at 1 kΩ, the resistance value of the resistor Rcom set at 1 kΩ, and the output voltage Vout set at 20 V. That is, the condition that the resistance value of the resistor Rr is higher than the resistance value of the voltage division resistor R2 and in addition the resistance value of the resistor Rr is higher than the resistance value of the resistor Rcom is fulfilled.

A thick line in FIG. 3 indicates the voltage V_ in the step-up switching power supply circuit 11 shown in FIG. 1, and a thin line in FIG. 3 indicates the voltage V_ in the step-up switching power supply circuit 12 shown in FIG. 2. From the result of the simulation shown in FIG. 3, it will be understood that, in the step-up switching power supply circuit 11 shown in FIG. 1, the variation width of the voltage V_ is smaller and the variation period is shorter than in the step-up switching power supply circuit 12 shown in FIG. 2. That is, the step-up switching power supply circuit 11 shown in FIG. 1 operates faster than the step-up switching power supply circuit 12 shown in FIG. 2.

Now, the reason why, when the condition under which the resistance value of the resistor Rr is higher than the resistance value of the voltage division resistor R2 and in addition the resistance value of the resistor Rr is higher than the resistance value of the resistor Rcom is fulfilled, the variation width of the voltage V_ in the step-up switching power supply circuit 11 shown in FIG. 1 is smaller than in the step-up switching power supply circuit 12 shown in FIG. 2 will be explained.

The maximum value Vmax of and the minimum value Vmin of the voltage V_ in the step-up switching power supply circuit 11 shown in FIG. 1 can be expressed by the formulae below.

Expression 7

$$V\max = \frac{\tau}{Cr}\left(\frac{Vout}{R1} + \frac{Vcc}{Rcom}\right)$$

$$V\min = \frac{\tau}{Cr}\left(\frac{Vout}{R1} + \frac{Vcc}{Rr}\right)$$

Thus, the variation width ΔV of the voltage V_ in the step-up switching power supply circuit 11 shown in FIG. 1 can be expressed by the formula below.

Expression 8

$$\Delta V = \frac{R1 // Rr // R2}{Rcom + R1 // Rr // R2} Vcc - \frac{R1 // Rcom // R2}{Rr + R1 // Rcom // R2} Vout \quad (1)$$

In the step-up switching power supply circuit 12 shown in FIG. 2, resistance value of the resistor Rr is regarded as infinity, and thus the variation width ΔV of the voltage V_ in the step-up switching power supply circuit 12 shown in FIG. 2 can be expressed by the formula below.

Expression 9

$$\Delta V = \frac{R1 // R2}{Rcom + R1 // R2} Vcc \quad (2)$$

When the resistance value of the resistor Rr is higher than the resistance value of the voltage division resistor R2 and in addition the resistance value of the resistor Rr is higher than the resistance value of the resistor Rcom (for example, when the resistance value of the resistor Rr is higher than ten times the resistance value of the voltage division resistor R2 and in addition the resistance value of the resistor Rr is higher than ten times the resistance value of the resistor Rcom), the first term in the right side of formula (1) above is approximately equal to the right side of formula (2) above, and thus by providing the resistor Rr, it is possible to reduce the variation width ΔV of the voltage V_ by the second term in the right side of the formula (1).

Thus, in the step-up switching power supply circuit 11 shown in FIG. 1, the resistance value of the resistor Rr is preferably set such that the resistance value of the resistor Rr is higher than the resistance value of the voltage division resistor R2 and in addition that the resistance value of the resistor Rr is higher than the resistance value of the resistor Rcom.

Followability of Voltage V_

Next, the followability of the voltage V_ will be studied. In step-up switching power supply circuits, the output voltage Vout is always higher than the input voltage Vin. Thus, the voltage V_ generated based on the output voltage Vout is never equal to 0 V. In a case where the voltage V_+ is a varying signal and can be equal to 0 V, when the voltage V_+ is around 0 V, the followability of the voltage V_ is poor.

Figure 4:
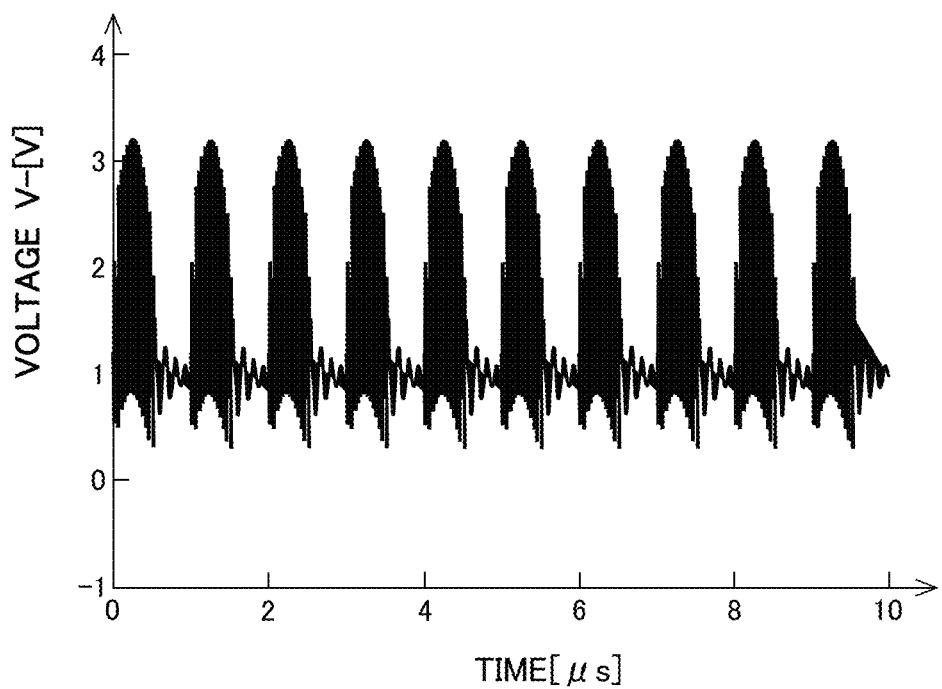
FIG. 4 is a time chart showing the voltage waveform at the inverting input terminal of the comparator.
Figure 5:
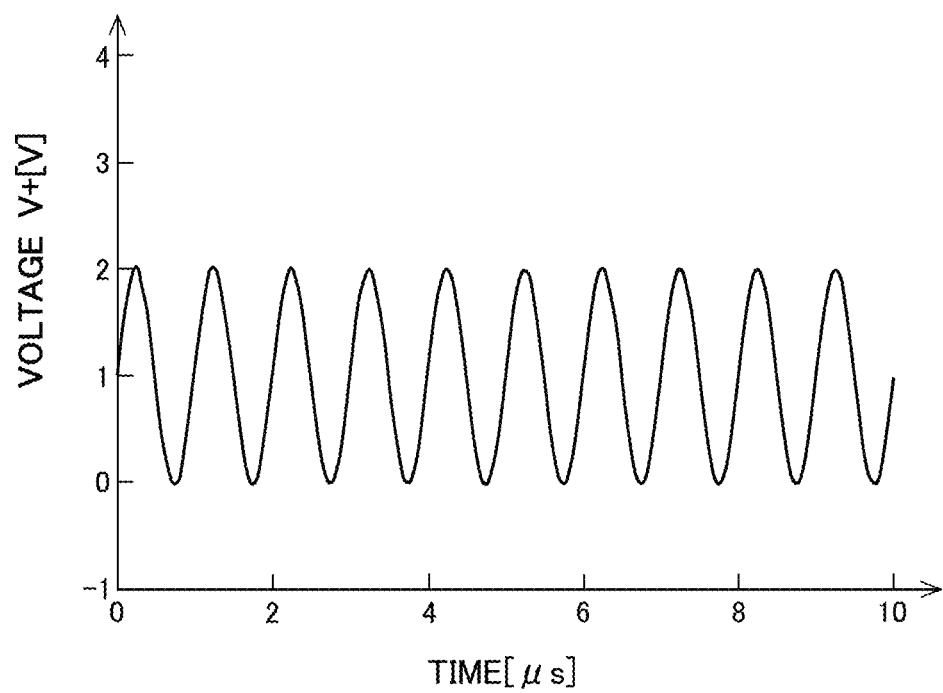
FIG. 5 is a time chart showing the voltage waveform at the non-inverting input terminal of the comparator.

FIG. 4 is a time chart showing the waveform of the voltage V_ fed to the inverting input terminal of the comparator 2a in the step-up switching power supply circuit 11 shown in FIG. 1. FIG. 5 is a time chart showing the waveform of the voltage V_+ fed to the non-inverting input terminal of the comparator 2a in the step-up switching power supply circuit 11 shown in FIG. 1. The horizontal axis represents time t common to FIGS. 4 and 5.

Figure 6:
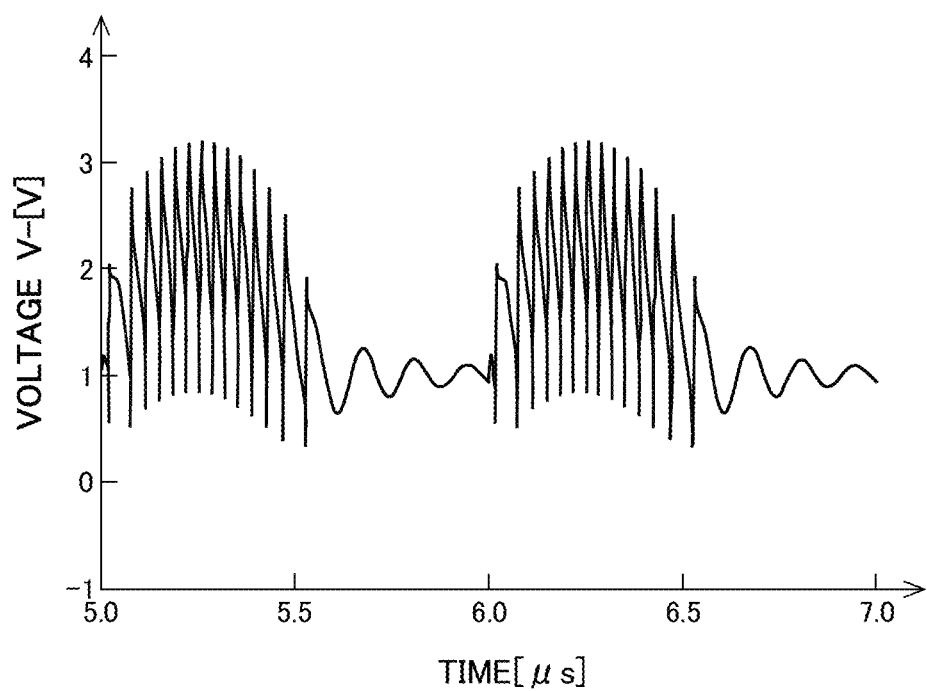
FIG. 6 is a time chart showing the voltage waveform at the inverting input terminal of the comparator.
Figure 7:
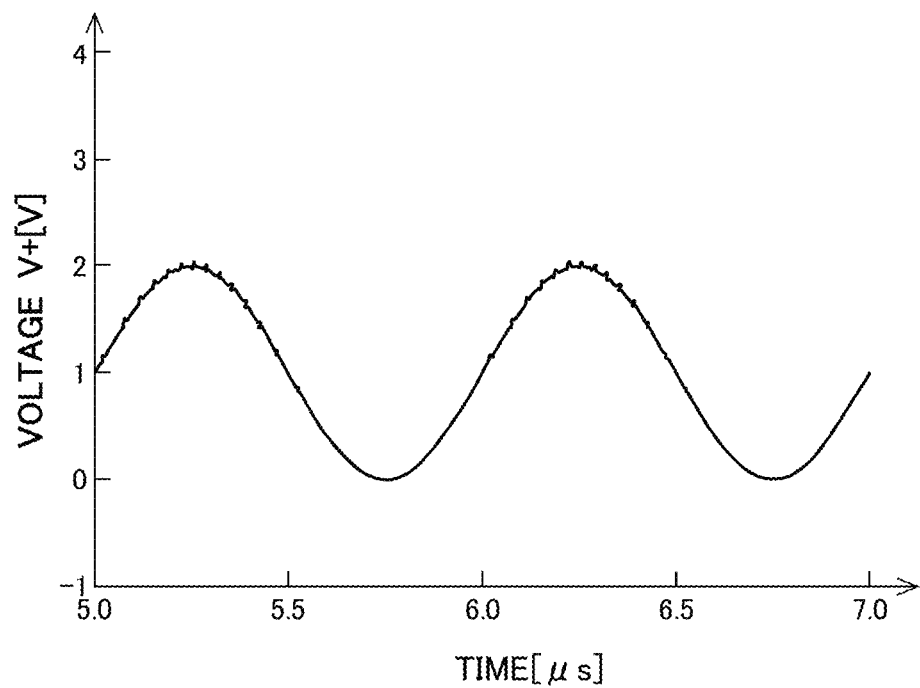
FIG. 7 is a time chart showing the voltage waveform at the non-inverting input terminal of the comparator.

FIGS. 4 and 5 show the results of a simulation performed with the capacity of the capacitor Cr set at 30 pF, the resistance value of the voltage division resistor R1 set at 2 kΩ, and the reference voltage Vref1 assumed to be a sine-wave signal with a frequency of 1 MHz, an offset of 1 V, and an amplitude of 1 V. FIG. 6 is a partly enlarged view of FIG. 4, and FIG. 7 is a partly enlarged view of FIG. 5.

As will be clear from FIGS. 4 to 7, when the voltage V_+ is around 0 V, the followability of the voltage V_ with respect to the voltage V_+ is poor.

Here, when the resistance value of the voltage division resistor R1 is represented by R and the minimum frequency of the frequency components included in the reference voltage Vref1 is represented by f, if the capacity C of the capacitor Cr fulfills R>(½ πfC), the DC component of the output voltage Vout is cut by the capacitor Cr, and thus the voltage V_ can take a negative value; this improves the followability of the voltage V_ with respect to the voltage V_+.

Figure 8:
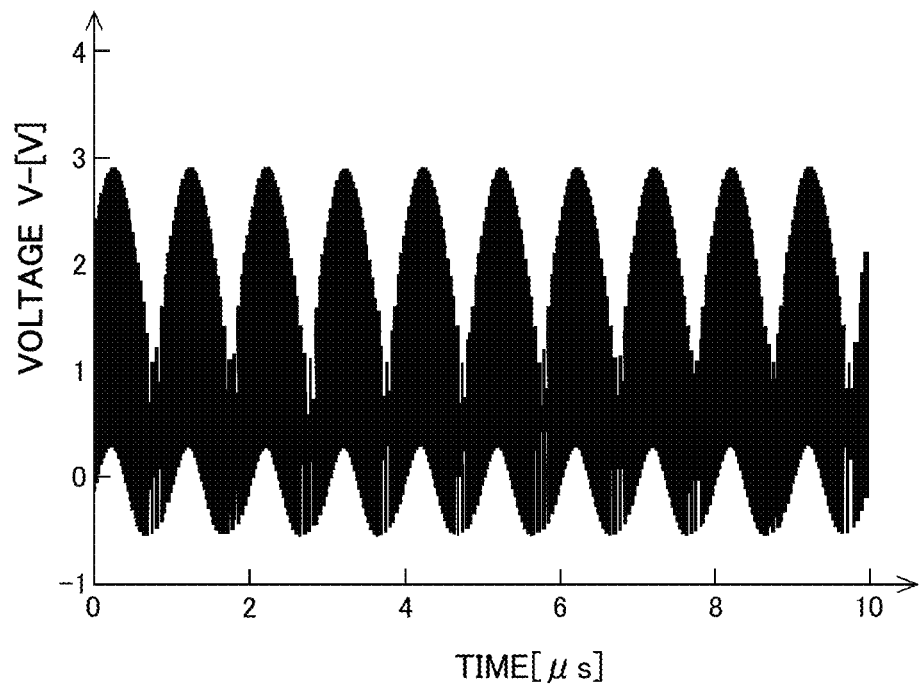
FIG. 8 is a time chart showing the voltage waveform at the inverting input terminal of the comparator.
Figure 9:
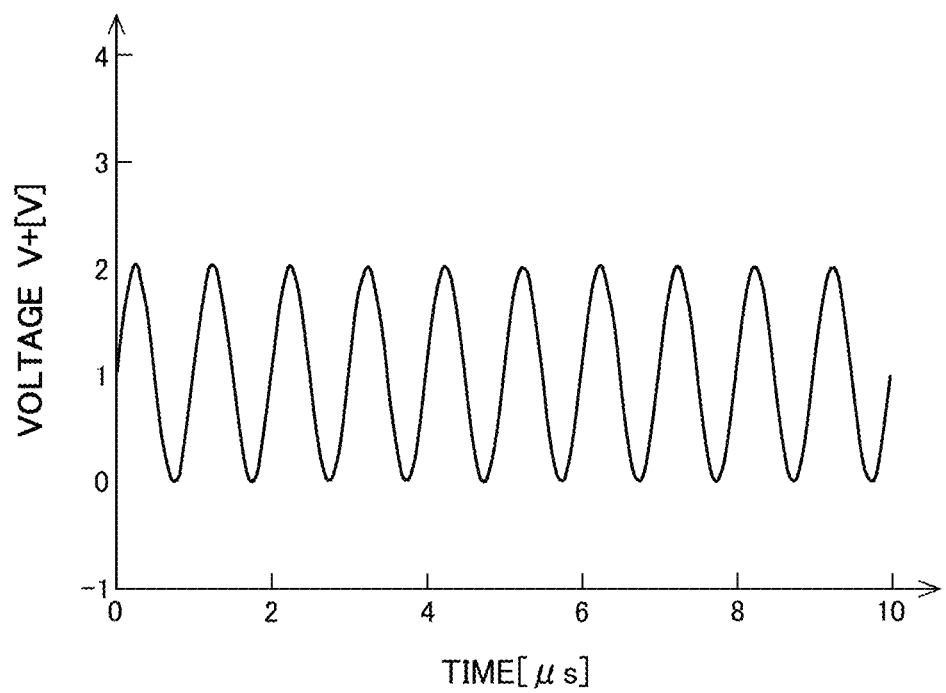
FIG. 9 is a time chart showing the voltage waveform at the non-inverting input terminal of the comparator.

FIG. 8 is a time chart showing the waveform of the voltage V_ fed to the inverting input terminal of the comparator 2a in the step-up switching power supply circuit 11 shown in FIG. 1. FIG. 9 is a time chart showing the waveform of the voltage V_+ fed to the non-inverting input terminal of the comparator 2a in the step-up switching power supply circuit 11 shown in FIG. 1. The horizontal axis represents time t common to FIGS. 8 and 9.

Figure 10:
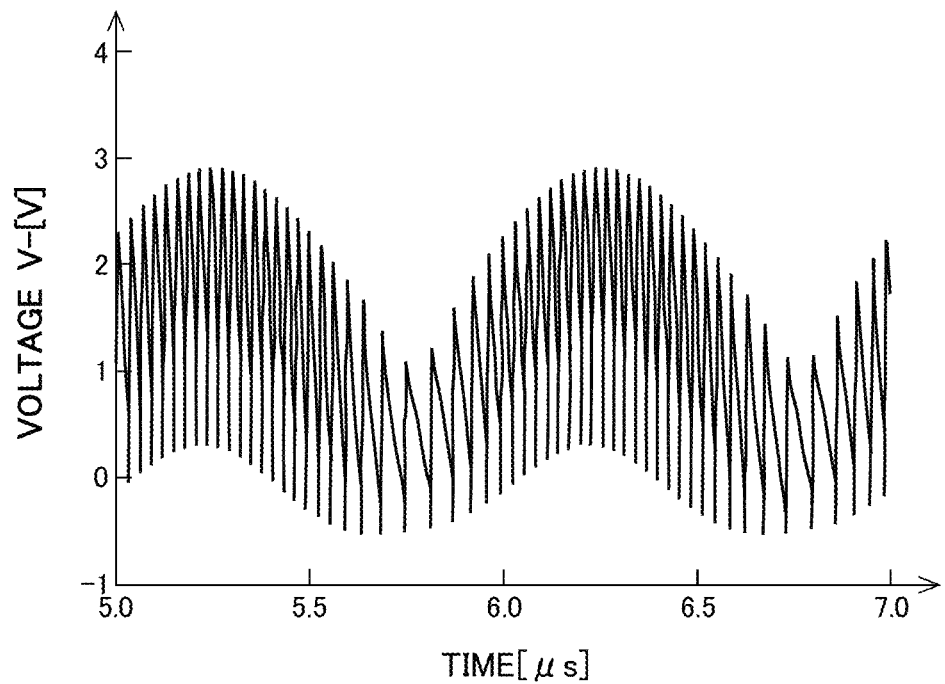
FIG. 10 is a time chart showing the voltage waveform at the inverting input terminal of the comparator.
Figure 11:
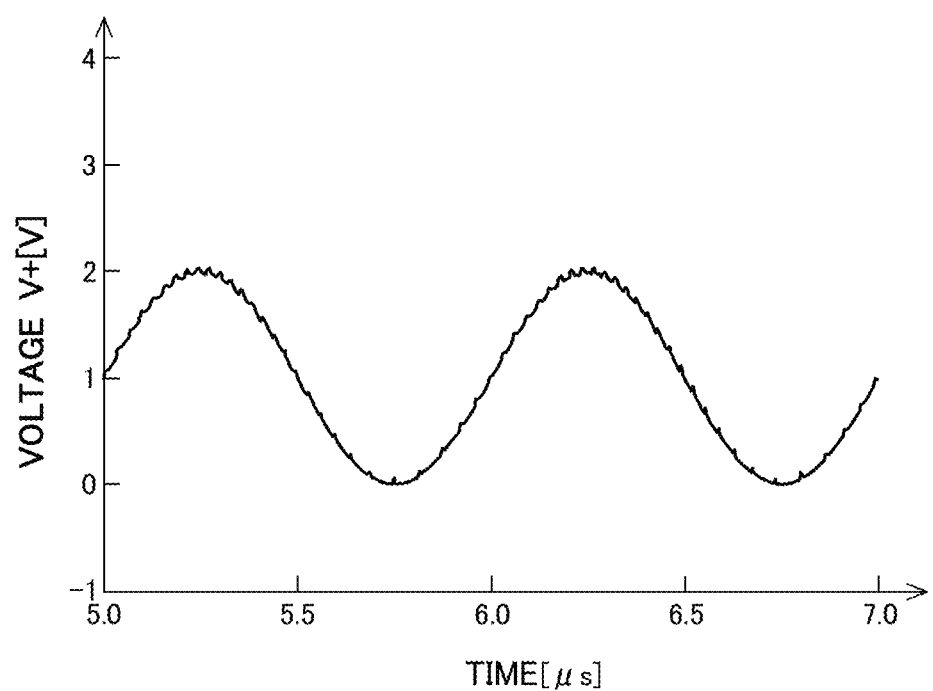
FIG. 11 is a time chart showing the voltage waveform at the non-inverting input terminal of the comparator.

FIGS. 8 and 9 show the results of a simulation performed with the capacity of the capacitor Cr set at 30 pF, the resistance value of the voltage division resistor R1 set at 10 kΩ, and the reference voltage Vref1 assumed to be a sine-wave signal with a frequency of 1 MHz, an offset of 1 V, and an amplitude of 1 V. That is, those are the results of a simulation where $R>(½ \pi fC)$ mentioned above is fulfilled. FIG. 10 is a partly enlarged view of FIG. 8, and FIG. 11 is a partly enlarged view of FIG. 9.

As will be clear from FIGS. 8 to 11, in a case where $R>(½ \pi fC)$ mentioned above is fulfilled, when the voltage V_+ is around 0 V, the followability of the voltage V_ with respect to the voltage V_+ is improved.

Although, in the study above, a simulation is performed by use of the step-up switching power supply circuit 11 shown in FIG. 1, similar results can be obtained with the step-up switching power supply circuit 12 shown in FIG. 2.

Thus, in the step up switching power supply circuit 11 shown in FIG. 1 and the step-up switching power supply circuit 12 shown in FIG. 2, when the resistance value of the voltage division resistor R1 is represented by R and the minimum frequency of the frequency components included in the reference voltage Vref1 is represented by f, the capacity C of the capacitor Cr is preferably set to fulfill $R>(½ \pi fC)$.

Instead of the capacity C of the capacitor Cr being set to fulfill $R>(½ \pi fC)$, or in addition to the capacity C of the capacitor Cr being set to fulfill $R>(½ \pi fC)$, a signal which varies with time and of which the minimum value is greater than zero may be used as the voltage V_+ (=the reference voltage Vref1) to improve the followability of the voltage V_ with respect to the voltage V_+.

Now, the reason why the followability of the voltage V_ with respect to the voltage V_+ can be improved by use of, as the voltage V_+ (=the reference voltage Vref1), a signal which varies with time and of which the minimum value is greater than zero will be explained. As will be clear from the formulae representing the voltage V_ in the steady state mentioned above, the voltage V_ in the steady state varies as an exponential function of Napier's constant. Thus, when the minimum value of the voltage V_+ is equal to 0 V, around the minimum value of the voltage V_, the voltage V_ and the voltage V_+ cross each other. Around the minimum value of the voltage V_, due to the nature of the exponential function of Napier's constant, the gradient (time variation rate) of the voltage V_ is small, and thus the voltage V_ and the voltage V_+ takes much time until they cross each other. By contrast, when the minimum value of the voltage V_+ is not equal to 0 V, except around the minimum value of the voltage V_, voltage V_ and the voltage V_+ cross each other, and thus the voltage V_ and the voltage V_+ take little time until they cross each other; this improves the followability of the voltage V_ with respect to the voltage V_+.

Application to Electronic Device

Figure 12:
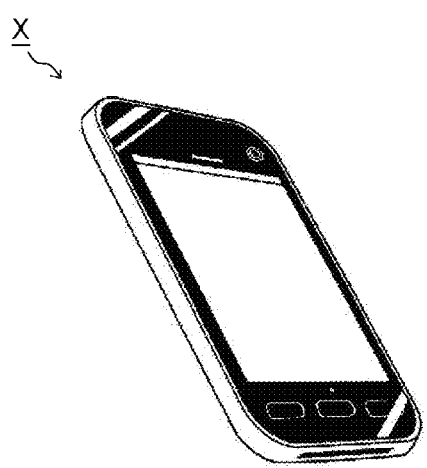
FIG. 12 is an exterior view showing an example of an electronic device incorporating a step-up switching power supply circuit.

FIG. 12 is an exterior view showing an example of an electronic device (mobile terminal (smartphone) X) incorporating at least one of the step-up switching power supply circuits 11 and 12 described above. Here, the mobile terminal X is only an example of an electronic device suitable for incorporation in it of a step-up switching power supply circuit; the step-up switching power supply circuits 11 and 12 described above can be also incorporated in a variety of electronic devices (specifically, electronic devices with large input and/or load variation) and can be used in such electronic devices as those shown in FIGS. 30 and 31, which will be described later.

Modified Examples

It should be understood that the first and second embodiments described above are in every aspect illustrative and not restrictive, and that the technical scope of the present invention is defined not by the description of those embodiments given above but by the scope of the appended claims and encompasses any modifications made in the sense and scope equivalent to those of the claims.

Figure 13:
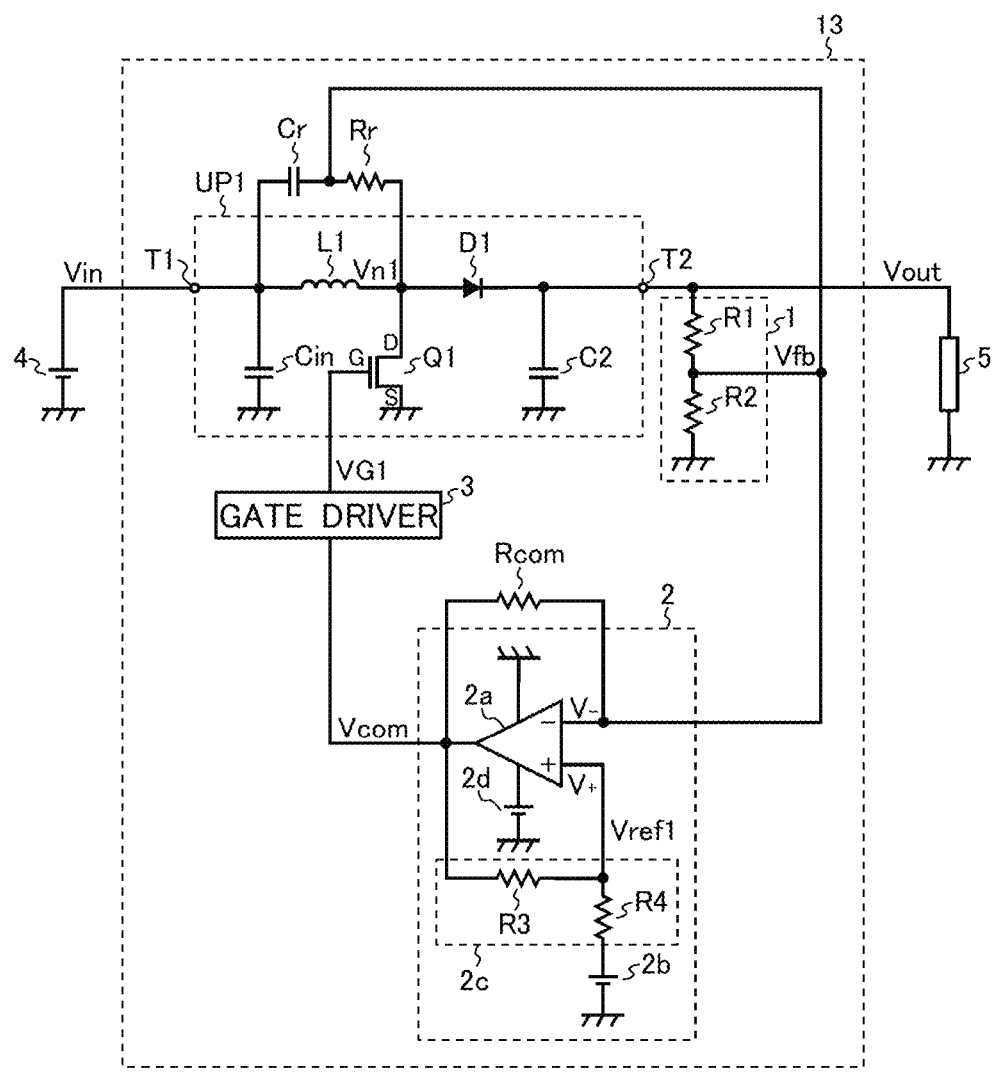
FIG. 13 is a diagram showing a modified example of a step-up switching power supply circuit.

For example, with respect to the step-up switching power supply circuit 11 shown in FIG. 1, the position of the integration circuit formed by the resistor Rr and the capacitor Cr may be changed to obtain a configuration in which, as in a step-up switching power supply circuit 13 shown in FIG. 13, one end of the capacitor Cr is connected not to the node between the diode D1 and the output terminal T2 but to the node between the inductor L1 and the input terminal T1. The step-up switching power supply circuit 13 shown in FIG. 13 provides an effect similar to that which the step-up switching power supply circuit 11 shown in FIG. 1 provides.

Figure 14:
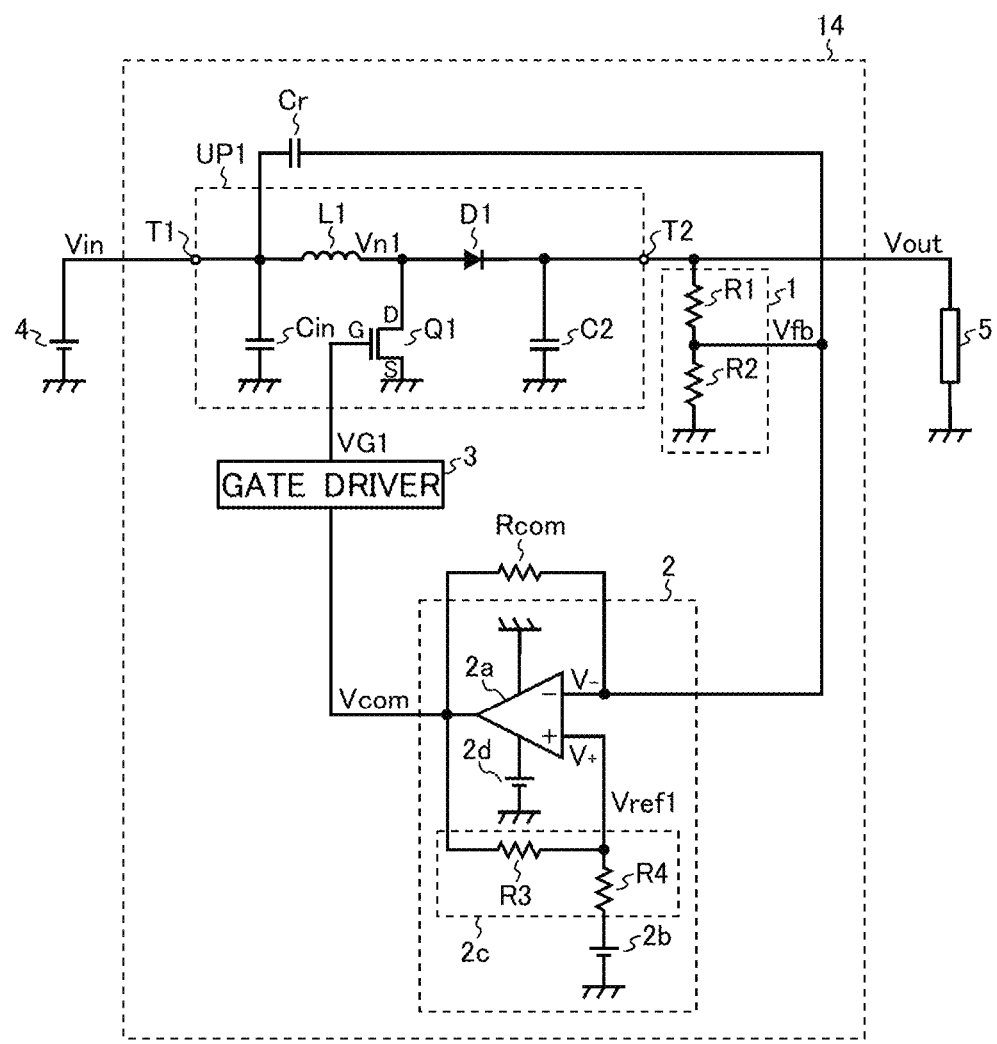
FIG. 14 is a diagram showing another modified example of a step-up switching power supply circuit.

For example, with respect to the step-up switching power supply circuit 12 shown in FIG. 2, the position of the capacitor Cr may be changed to obtain a configuration in which, as in a step-up switching power supply circuit 14 shown in FIG. 14, one end of the capacitor Cr is connected not to the node between the diode D1 and the output terminal T2 but to the node between the inductor L1 and the input terminal T1. In the step-up switching power supply circuit 14 shown in FIG. 14, the capacitor Cr passes the frequency component of the input voltage Vin to generate the first ripple voltage including the first ripple component. The step-up switching power supply circuit 14 shown in FIG. 14 provides an effect similar to that which the step-up switching power supply circuit 12 shown in FIG. 2 provides.

Figure 15:
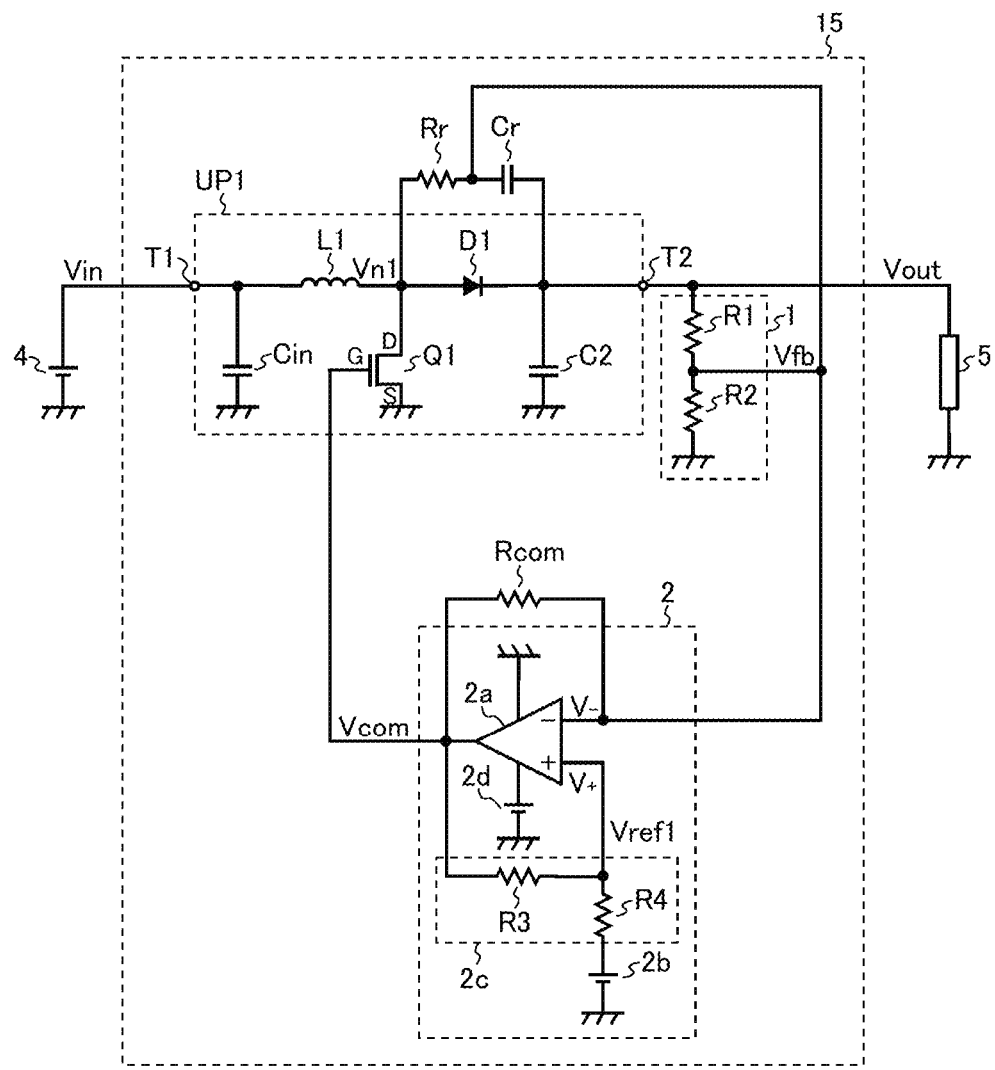
FIG. 15 is a diagram showing yet another modified example of a step-up switching power supply circuit.
Figure 16:
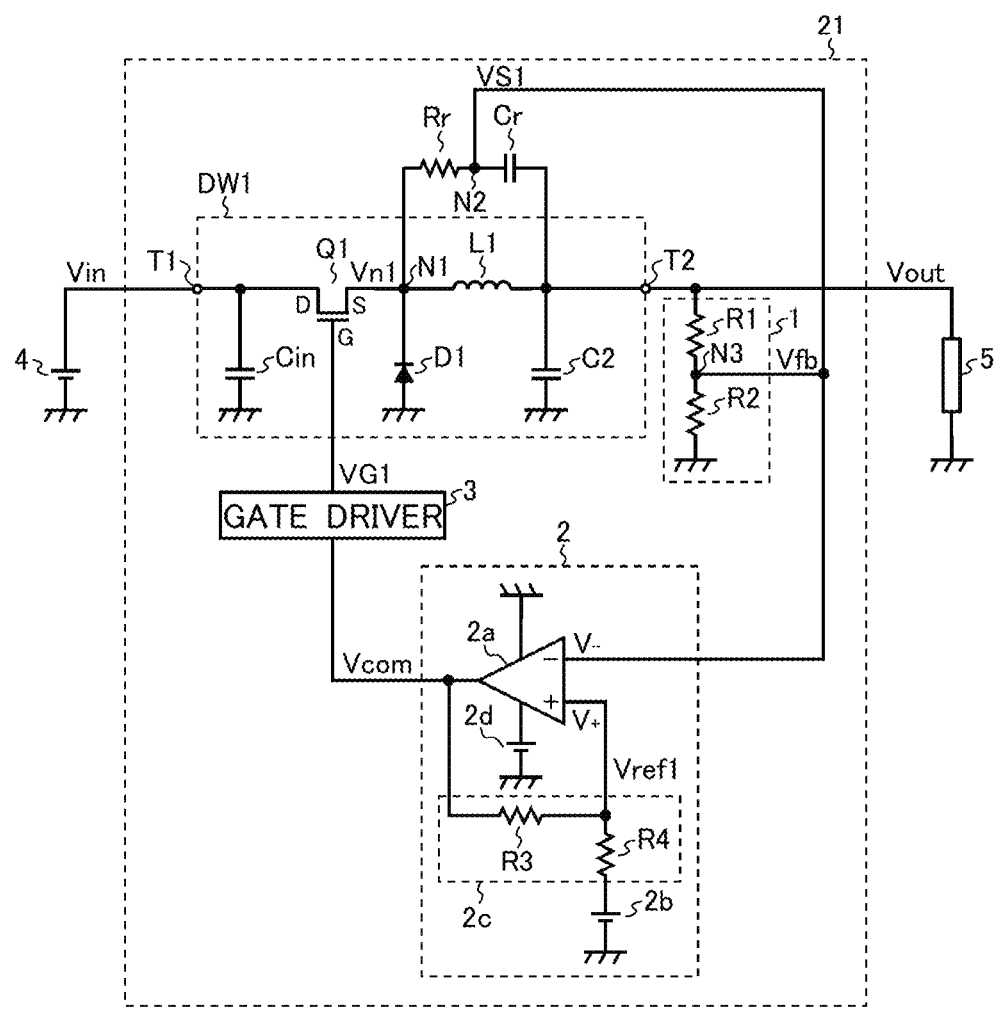
FIG. 16 is a diagram schematically showing a conventional switching power supply circuit of a ripple control type.
Figure 17:
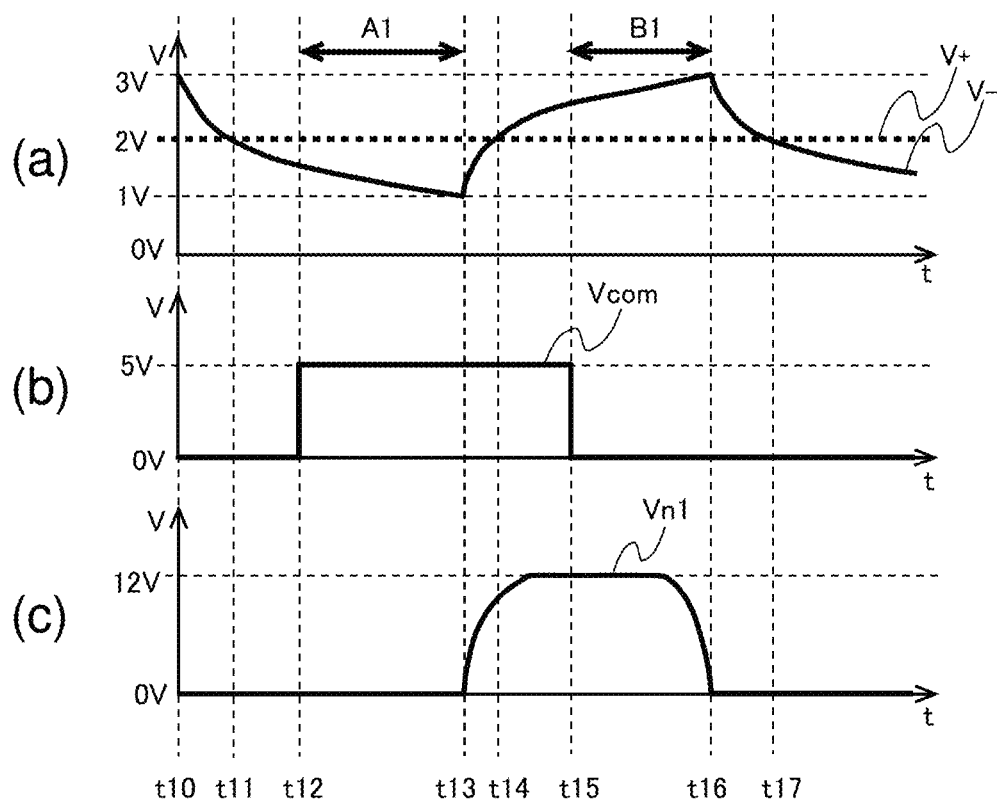
FIG. 17 is a time chart showing the voltage waveforms at relevant points in the switching power supply circuit shown in FIG. 16.

For example, if the switching device Q1 has a small input capacity and the comparison result signal Vcom can turn the switching device Q1 on and off directly, no gate driver 3 needs to be provided. For example, the gate driver 3 may be omitted from the step-up switching power supply circuit 11 shown in FIG. 1 to obtain a configuration in which, as in a step-up switching power supply circuit 15 shown in FIG. 15, the output terminal of the comparator 2a is directly connected to the gate terminal of the switching device Q1. While what has just been described is a modified example of the step-up switching power supply circuit 11 shown in FIG. 1, similar modifications are applicable also to the step-up switching power supply circuits 12 to 14. Now, specific conditions under which the comparison result signal Vcom can turn the switching device Q1 on and off directly will be described in a configuration in which the comparison result signal Vcom is directly fed to the gate terminal of the switching device Q1, when the input capacity of the switching device Q1 is represented by $C_{ISS}$, the maximum output current of the comparator 2a is represented by $I_{GMAX}$, and the high level of the comparison result signal Vcom is represented by $V_{GH}$, then the minimum times $t_R$ and $t_F$ required lot the potential at the gate of the switching device Q1 to rise and fall can be expressed by the formula below, where $Q_G$ represents the gate charge of the switching device Q1.

$$t_R = t_F = C_{ISS} V_{GH} / I_{GMAX} = Q_G / I_{GMAX}$$

For the switching device Q1 to turn on and off without problem, the potential at the gate of the switching device Q1 needs to complete a rise and a fall within the switching period of the switching device Q1. Thus, the inequality below needs to be fulfilled.

$$t_R + t_F = 2 C_{ISS} V_{GH} / I_{GMAX} = 2 Q_G / I_{GMAX} < 1/f_{SW}$$

Accordingly, the input capacity $C_{ISS}$ of the switching device Q1 can be set to fulfill the inequality above.

Although, in the step-up switching power supply circuits 11 to 15 described above, the capacitor used to generate the first ripple voltage including the first ripple component and the capacitor used to generate the second ripple voltage including the second ripple component are the same capacitor (capacitor Cr), they can instead be different capacitors. However, using the same capacitor helps suppress an increase in circuit area.

Although in the step-up switching power supply circuits 11 to 15 described above, the comparison circuit 2 includes a hysteresis circuit 2c, the comparison circuit 2 does not necessarily need to include a hysteresis circuit 2c. When the comparison circuit 2 does not include a hysteresis circuit 2c, the reference voltage source 2b can be connected to the non-inverting input terminal of the comparator 2a directly.

Although, in the step-up switching power supply circuits 11 to 15 described above, the voltage generation circuit UP1 includes a diode D1, the voltage generation circuit UP1 can include, instead of the diode D1, a synchronous rectification device.

The different modified examples described above can be implemented in any combination as necessary unless contradictory to each other.

Second Invention

Third Embodiment

Figure 19:
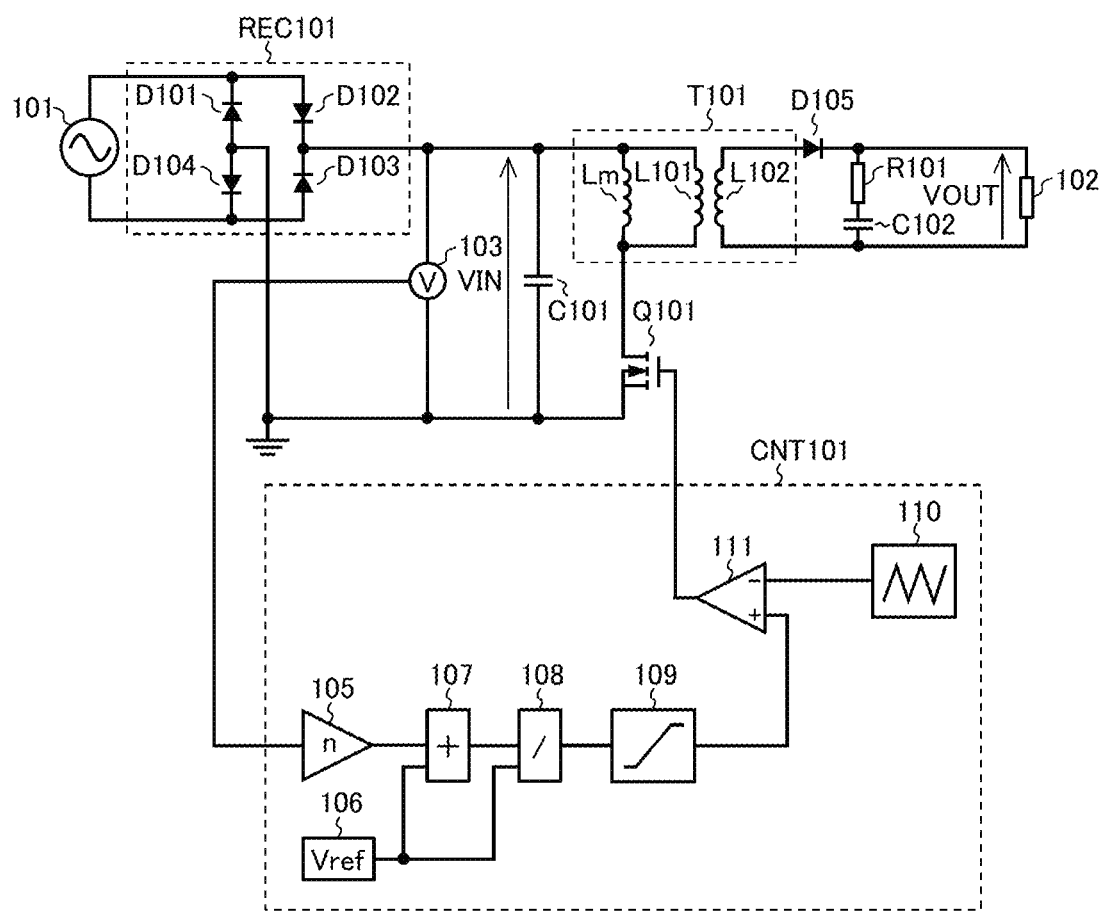
FIG. 19 is a diagram schematically showing a switching power supply according to a third embodiment.

FIG. 19 is a diagram schematically showing a switching power supply according to a third embodiment, and it can be used as a switching power supply in electronic devices like those shown in FIGS. 12, 30, and 31, of which the last two will be described later. The switching power supply according to this embodiment includes a rectifier REC101, an input capacitor C101, a transformer T101, a switching device Q101, a diode D105, an output capacitor C102, an input voltage monitor 103, and a switching control circuit CNT101.

In this embodiment, as the rectifier REC101, a diode bridge circuit formed by diodes D101 to D104 is used, and as the switching device Q101, an N-channel MOS (metal-oxide-semiconductor) field-effect transistor is used. In FIG. 19, an inductor Lm connected in parallel with a primary winding L101 of the transformer T101 is an excitation inductance generated in the transformer T101, and a resistor R101 connected in series with the output capacitor C102 is an ESR (equivalent series resistance) of the output capacitor C102.

The diode bridge circuit formed by the diodes D101 to D104 rectifies on a full-wave basis an alternating-current (AC) voltage output from an AC power source 101 to generate an input voltage VIN.

The input capacitor C101 smooths the input voltage VIN, which is a pulsating voltage. The smoothed input voltage VIN is chopped (sliced) by the switching (turning on and off) of the switching device Q101, and energy is transmitted from the primary side to the secondary side via the transformer T101. Then, on the secondary side, the current passing through a secondary winding L102 is converted by the output capacitor C102 into a DC voltage to generate an output voltage VOUT. The output voltage VOUT is fed to a load 102.

The input voltage monitor 103 monitors the input voltage VIN and feeds the input voltage VIN to the switching control circuit CNT101. The input voltage monitor 103 may instead monitor the input voltage VIN and then feed a division voltage of the input voltage VIN to the switching control circuit CNT101. In a case where the input voltage monitor 103 feeds a division voltage of the input voltage VIN to the switching control circuit CNT101, a voltage source 106, which will be described later, can output a division voltage of a target voltage Vref. In this case, the voltage division ratio of the target voltage Vref is set equal to the voltage division ratio of the input voltage VIN.

The switching control circuit CNT101 includes a determiner and a control signal generator. The determiner determines a duty according to a calculation formula which is a calculation formula of the steady state duty in a continuous current mode and which involves the input voltage VIN, the target voltage Vref and the winding ratio of the transformer. The control signal generator generates a control signal for the switching device Q101 based on the duty determined by the determiner.

In this embodiment as the determiner, an amplifier 105, a voltage source 106, an adder 107, a divider 108, and a limiter 109 are used, and as the control signal generator, a triangular wave generator 110, and a comparator 111 are used.

The amplifier 105 amplifies the input voltage VIN at a predetermined amplification factor (the ratio n of the number of turns of the secondary winding L102 to the number of turns of the primary winding L101). The voltage source 106 outputs the target voltage Vref. The adder 107 outputs the result of adding up the output of the amplifier 105 and the output of the voltage source 106. The divider 108 outputs the result of dividing the output of the voltage source 106 by the output of the adder 107. Thus, the output of the divider 108 is a calculation formula (Vref/(nVIN+Vref)) of the steady state duty of a flyback switching power supply in the continuous current mode.

The circuit topology of the switching power supply does not necessarily need to be a flyback type. For example, according to the calculation formula of the steady state duty in the continuous current mode shown in the table below, the circuit configuration of the determiner can be designed. The circuit topology of the switching power supply is not limited to the type in the table below; it may instead be, for example, a push-pull type or the like.

TABLE 1

| Topology | CCM |
|---|---|
| Buck | $\dfrac{Vref}{VIN}$ |
| Boost | $\dfrac{Vref - VIN}{Vref}$ |

TABLE 1-continued

| Topology | CCM |
|---|---|
| Buck-Boost | $\dfrac{Vref}{VIN + Vref}$ |
| Flyback | $\dfrac{Vref}{nVIN + Vref}$ |
| Forward | $\dfrac{Vref}{nVIN}$ |

When the input to the limiter 109 (in this embodiment, the output of the divider 108) is not higher than the limit value, the input to the limiter 109 is output as it is and when the input to the limiter 109 is higher than the limit value, the limiter 109 outputs the limit value.

The triangular wave generator 110 outputs a voltage signal with a triangular waveform. It may have a sawtooth waveform instead of a triangular waveform.

The comparator 111 compares the output of the limiter 109 with the output of the triangular wave generator 110 so that, if the output of the limiter 109 is higher than the output of the triangular wave generator 110, the comparator 111 outputs a high-level voltage signal to the control terminal of the switching device Q101 and, if the output of the limiter 109 is not higher than the output of the triangular wave generator 110, the comparator 111 outputs a low-level voltage signal to the control terminal of the switching device Q101. Accordingly, the switching device Q101 is subjected to feedforward control based on the duty determined by the determiner.

The determiner uses the input voltage VIN only for feedforward control.

In the feedforward control performed by the switching control circuit CNT101, unlike in feedback control, when the input voltage VIN varies, before the output voltage VOUT varies as a result of the variation of the input voltage VIN control for suppressing the variation of the output voltage VOUT takes effect. Thus, in the switching control circuit CNT101, even when the input voltage VIN varies, it is possible to sufficiently suppress the variation of the output voltage VOUT. The effect will now be confirmed through a simulation.

Figure 20:
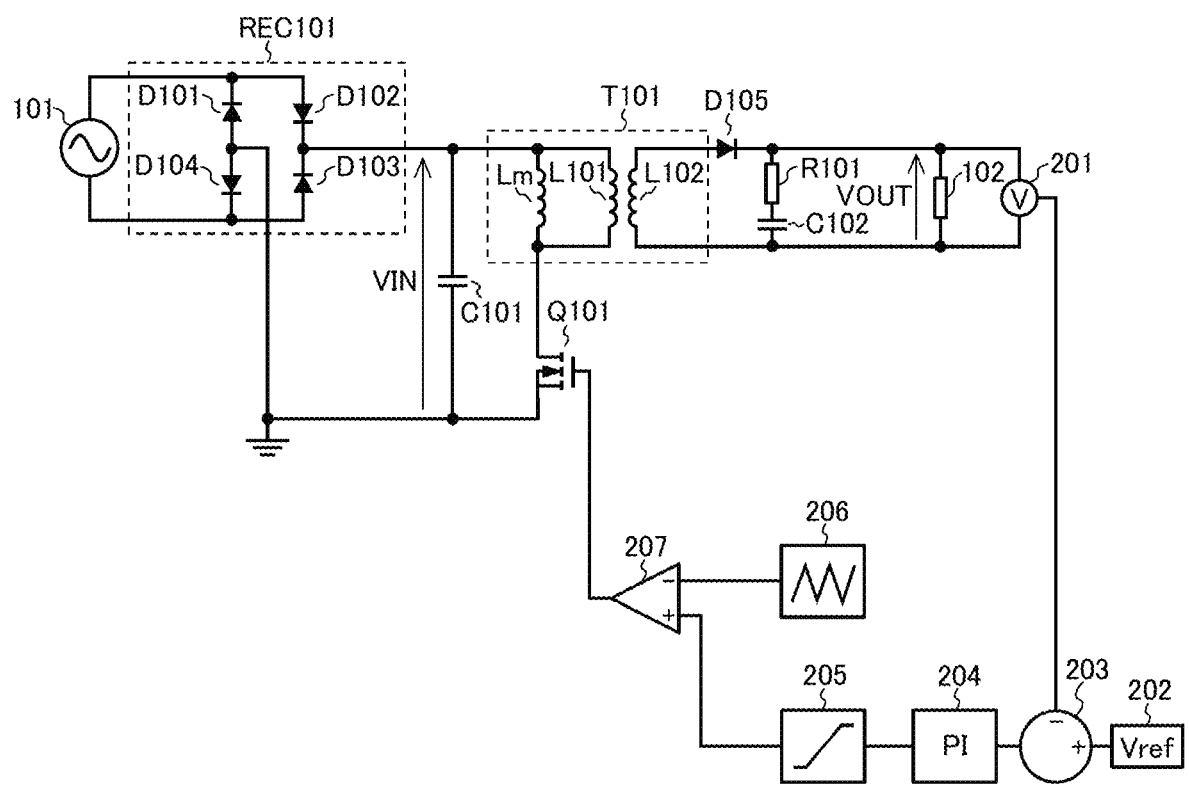
FIG. 20 is a diagram schematically showing a switching power supply according to Comparative Example.

FIG. 20 is a diagram schematically showing a switching power supply according to Comparative Example. The switching power supply according to Comparative Example is a common switching power supply that performs feedback control such that the output voltage VOUT remains equal to the target voltage Vref and results from, as compared with the switching power supply according to the embodiment, omitting the input voltage monitor 103 and the switching control circuit CNT101 and adding an output voltage monitor 201, a voltage source 202, an adder-subtractor 203, a PI (proportional and integral) controller 204, a limiter 205, a triangular wave generator 206, and a comparator 207.

Figure 21:
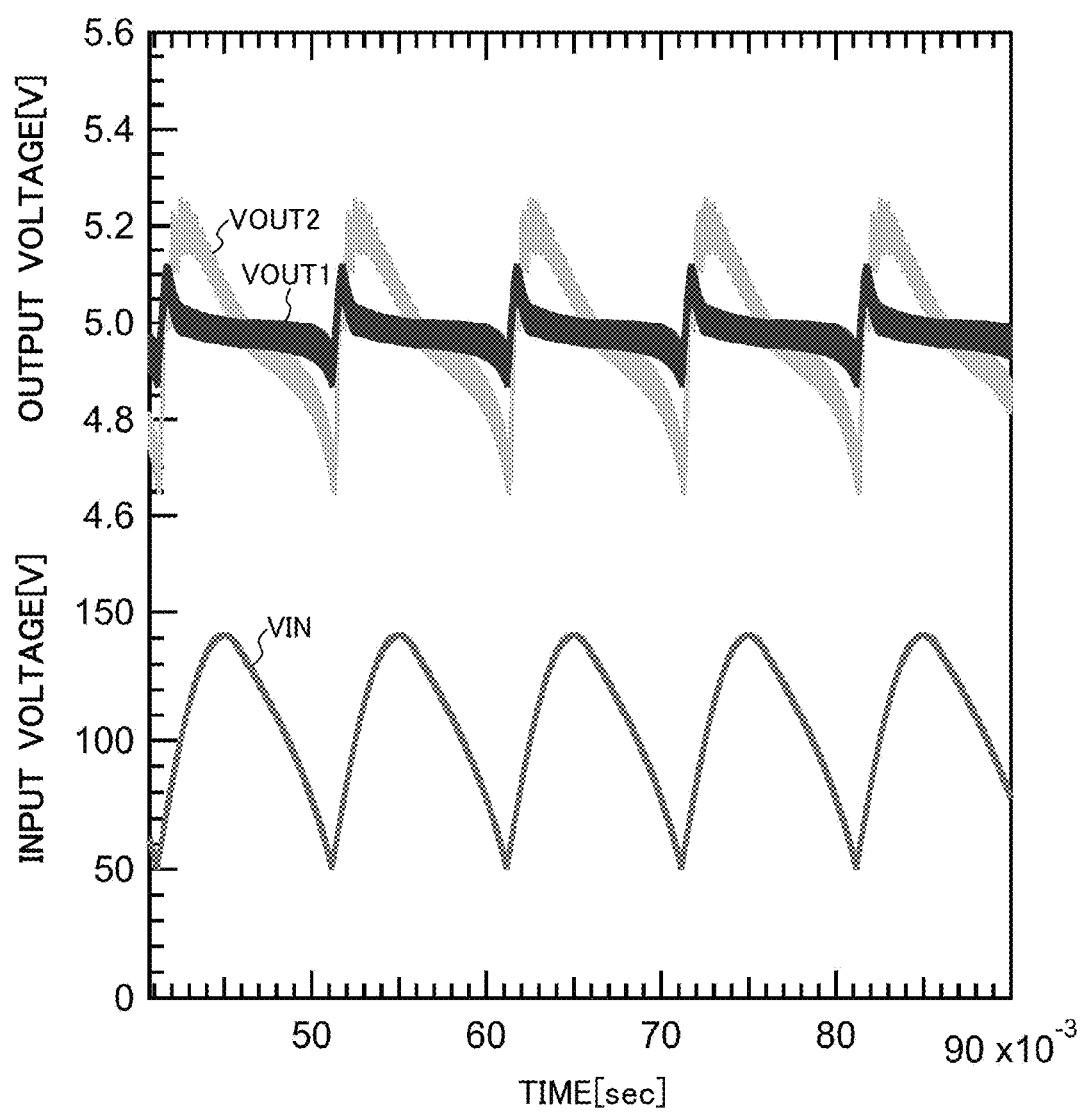
FIG. 21 is a time chart showing an input voltage waveform and output power waveforms.

The results of simulations with the switching power supply according to the embodiment shown in FIG. 19 and with the switching power supply according to Comparative Example shown in FIG. 20 are shown in FIG. 21. The simulation conditions are as follows: the AC voltage output from the AC power source 101 is an AC voltage at 50 Hz with an effective value of 100 V; the target voltage Vref is 5.0 V; the output current Io is 3.0 A: the switching frequency is 100 kHz; the capacitance of the input capacitor C101 is 10 μF; the capacitance of the output capacitor C102 is 100 μF; and the ratio n of the number of turns of the secondary winding L102 to the number of turns of the primary winding L101 is 0.5. In the above simulation conditions, the capacitance of the input capacitor C101 is intentionally set low so that the input voltage VIN varies greatly.

VIN in FIG. 21 represents the waveform of the input voltage VIN, VOUT1 in FIG. 21 represents the waveform of the output voltage VOUT fed to the load 102 from the switching power supply according to the embodiment shown in FIG. 19, and VOUT2 in FIG. 21 represents the waveform of the output voltage VOUT fed to the load 102 from the switching power supply according to Comparative Example shown in FIG. 20.

From the results of the simulations shown in FIG. 21, it will be understood that, even when the input voltage VIN varies greatly, the switching control circuit CNT101 sufficiently suppresses the variation of the output voltage VOUT.

Under the simulation conditions presented above, where the output current Io is 3.0 A, the load 102 is heavy, resulting in the switching power supply according to the embodiment shown in FIG. 19 operating in the continuous current mode (CCM). By contrast, under a light load 102, the switching power supply according to the embodiment shown in FIG. 19 operates in the discontinuous current mode (DCM), and thus cannot output an output voltage VOUT substantially equal to the target voltage Vref.

Figure 22:
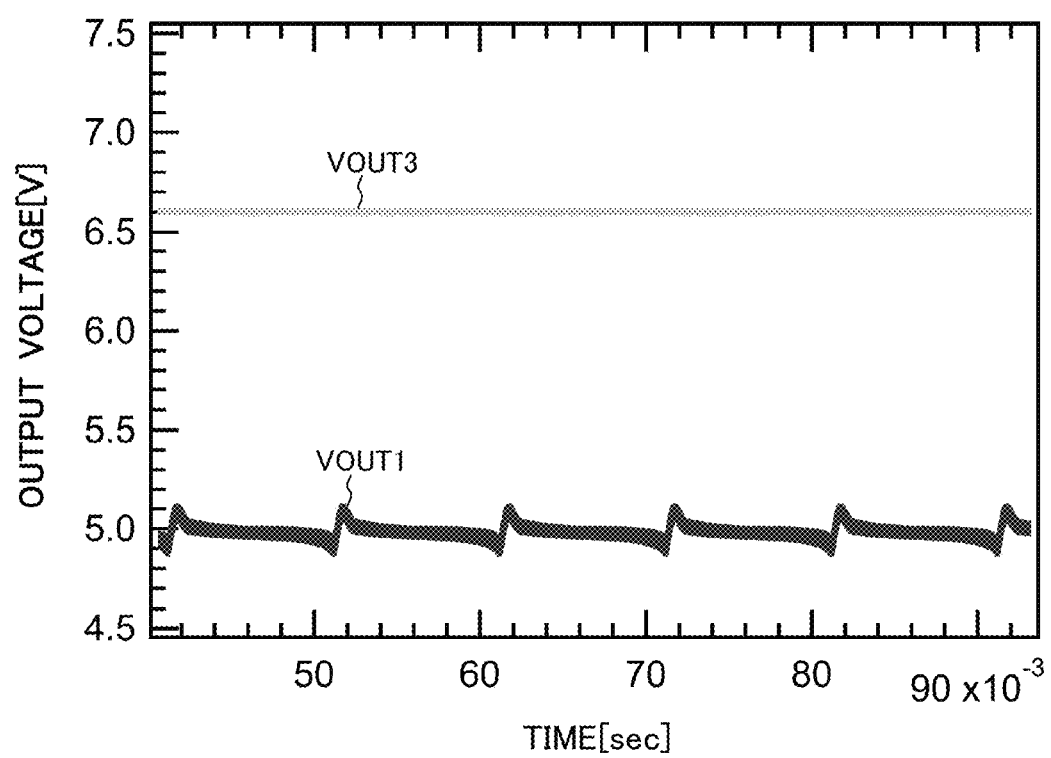
FIG. 22 is a time chart showing output power waveforms.

The results of simulations with the switching power supply according to the embodiment shown in FIG. 19 operating in the continuous current mode and with the switching power supply according to the embodiment shown in FIG. 19 operating in the discontinuous current mode are shown in FIG. 22. The simulation conditions are as follows: the AC voltage output from the AC power source 101 is an AC voltage at 50 Hz with an effective value of 100 V; the target voltage Vref is 5.0 V; the output current Io in the continuous current mode is 3.0 A; the output current Io in the discontinuous current mode is 50 mA; the switching frequency is 100 kHz; the capacitance of the input capacitor C101 is 10 μF; the capacitance of the output capacitor C102 is 100 μF; and the ratio n of the number of turns of the secondary winding L102 to the number of turns of the primary winding L101 is 0.5.

VOUT1 in FIG. 22 represents the waveform of the output voltage VOUT fed to the load 102 from the switching power supply according to the embodiment shown in FIG. 19 operating in the continuous current mode, and VOUT3 in FIG. 22 represents the waveform of the output voltage VOUT fed to the load 102 from the switching power supply according to the embodiment shown in FIG. 19 operating in the discontinuous current mode.

For example, with a configuration in which, in the discontinuous current mode, the determiner determines the duty according to the calculation formula of the steady state duty in the discontinuous current mode shown in the table below, even in the discontinuous current mode, it is possible to output an output voltage VOUT substantially equal to the target voltage Vref. However, the calculation formula of the steady state duty in the discontinuous current mode shown in the table below involves the resistance value Rout of the load 102. In a situation where the resistance value Rout of the load 102 varies, it is impossible or difficult lo grasp the resistance value Rout of the load 102 in advance.

TABLE 2

| Topology | CCM | DCM |
|---|---|---|
| Buck | $\dfrac{Vref}{VIN}$ | $Vref\sqrt{\dfrac{2L}{VIN(VIN - Vref)RoutTs}}$ |
| Boost | $\dfrac{Vref - VIN}{Vref}$ | $\dfrac{1}{VIN}\sqrt{\dfrac{2LVref(Vref - VIN)}{RoutTs}}$ |
| Buck-Boost | $\dfrac{Vref}{VIN + Vref}$ | $\dfrac{Vref}{VIN}\sqrt{\dfrac{2Lm}{RoutTs}}$ |
| Flyback | $\dfrac{Vref}{nVIN + Vref}$ | $\dfrac{Vref}{VIN}\sqrt{\dfrac{2Lm}{RoutTs}}$ |
| Forward | $\dfrac{Vref}{nVIN}$ | — |

In view of the problems of the switching power supply according to the embodiment shown in FIG. 19 described above, a fourth to an eighth embodiment, which will be described later, propose switching power supplies that can, even in the discontinuous current mode, output an output voltage VOUT substantially equal to the target voltage Vref without impairing the advantages of the switching power supply according to the embodiment shown in FIG. 19.

Fourth Embodiment

Figure 23:
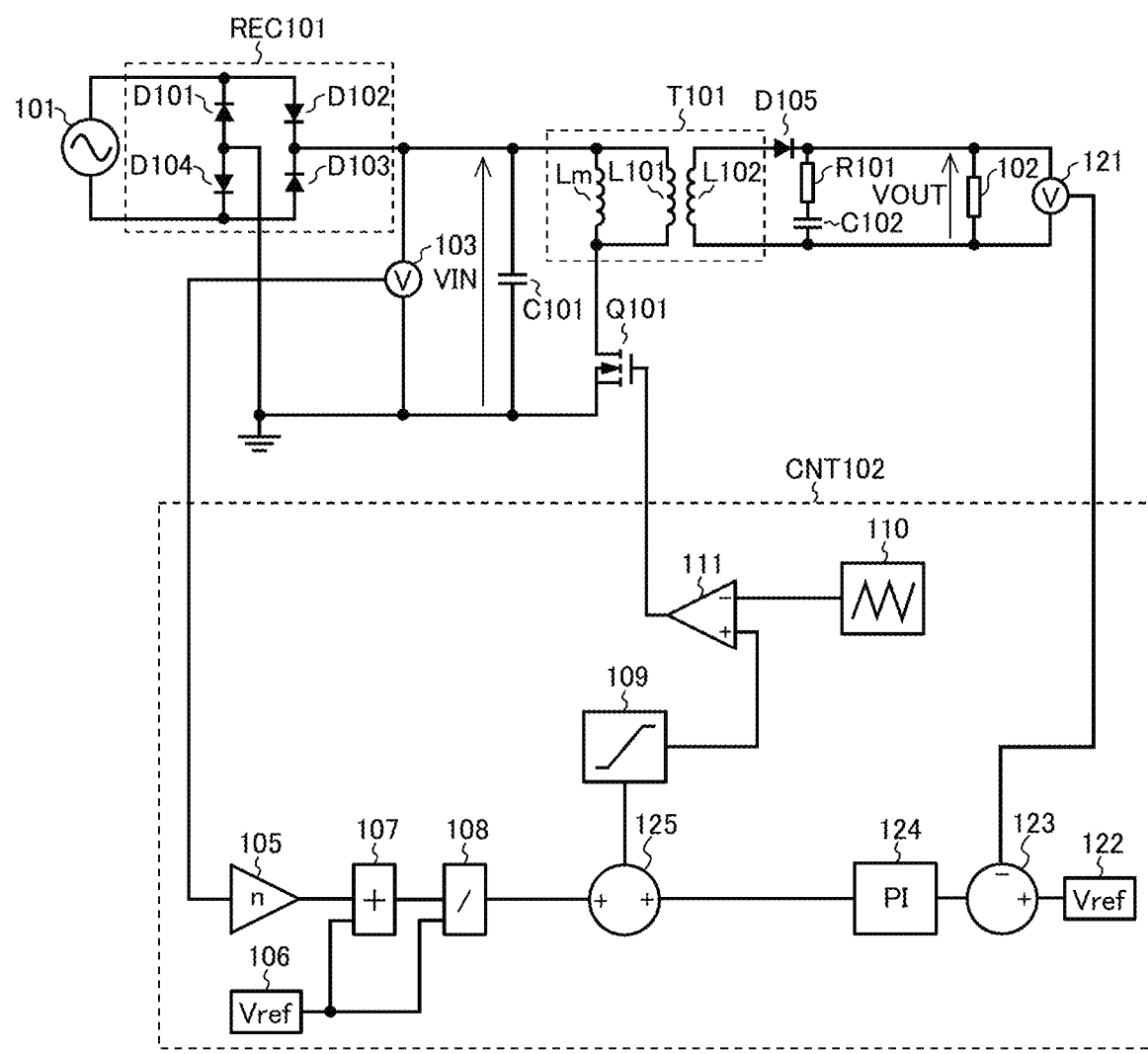
FIG. 23 is a diagram schematically showing a switching power supply according to a fourth embodiment.

FIG. 23 is a diagram schematically showing a switching power supply according to a fourth embodiment. The switching power supply according to this embodiment, as compared with the switching power supply according to the third embodiment, further includes an output voltage monitor 121 and includes, in place of the switching control circuit CNT101, a switching control circuit CNT102. The switching control circuit CNT102, as compared with the switching control circuit CNT101, further includes a voltage source 122, an adder-subtractor 123, a PI controller 124, and an adder 125. In the following description, for such components as find their counterparts in the third embodiment, no overlapping description will be repeated.

The output voltage monitor 121 monitors the output voltage VOUT and feeds the output voltage VOUT to the switching control circuit CNT102. The output voltage monitor 121 may instead monitor the output voltage VOUT and feed a division voltage of the output voltage VOUT to the switching control circuit CNT102. In a case where the output voltage monitor 121 feeds a division voltage of the output voltage VOUT to the switching control circuit CNT102, the voltage source 122 can output a division voltage of the target voltage Vref. In this case, the voltage division ratio of the target voltage Vref is set equal to the voltage division ratio of the output voltage VOUT.

The voltage source 122 outputs the target voltage Vref. The voltage sources 122 and 106 may be the same voltage source. The adder-subtractor 123 outputs the result of subtracting the output of the output voltage monitor 121 from the output of the voltage source 122. The PI controller 124 performs a PI operation to the output of the adder-subtractor 123 and outputs the result Instead of the PI controller 124, another controller such as a PID controller can be used. The adder 125 outputs the result of the adding up the output of the divider 108 (feedforward control output value) and the output of the PI controller 124 (feedback control output value). The limiter 109 is fed with the output of the adder 125. Thus, the switching device Q101 is subjected to feedforward control based on the feedforward control output value and is in addition subjected to feedback control based on the feedback control output value.

Figure 24:
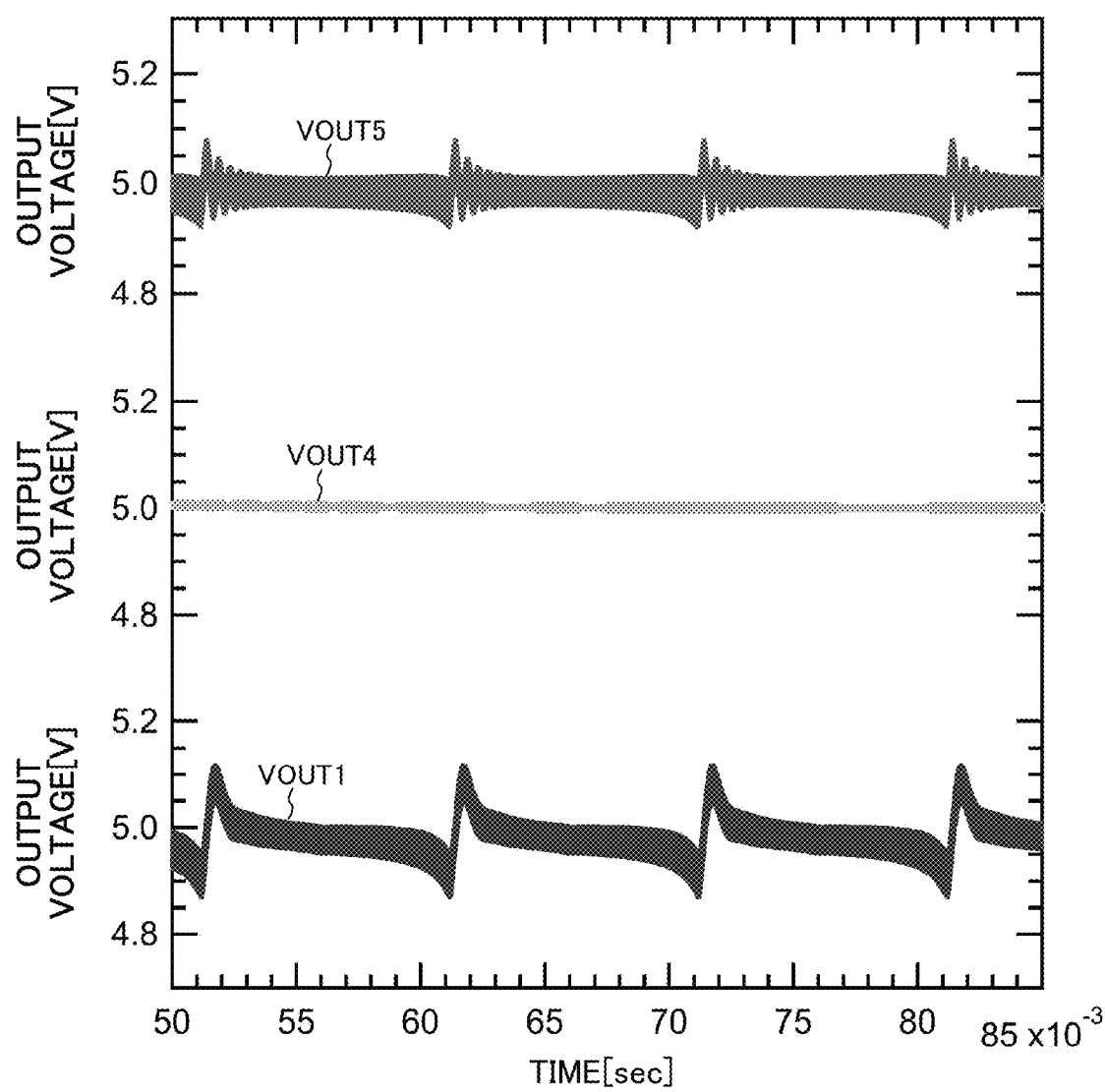
FIG. 24 is a time chart showing output power waveforms.

The results of simulations with the switching power supply according to the embodiment shown in FIG. 23 and with the switching power supply according to the third embodiment shown in FIG. 19 are shown in FIG. 24. The simulation conditions are as follows: the AC voltage output from the AC power source 101 is an AC voltage at 50 Hz with an effective value of 100 V; the target voltage Vref is 5.0 V; the output current Io in the continuous current mode is 3.0 A; the output current Io in the discontinuous current mode is 50 mA; the switching frequency is 100 kHz; the capacitance of the input capacitor C101 is 10 µF; the capacitance of the output capacitor C102 is 100 µF; and the ratio n of the number of turns of the secondary winding L102 to the number of turns of the primary winding L101 is 0.5. In the above simulation conditions, the capacitance of the input capacitor C101 is intentionally set low so that the input voltage VIN varies greatly.

VOUT1 in FIG. 24 represents the waveform of the output voltage VOUT fed to the load 102 from the switching power supply according to the third embodiment shown in FIG. 19 operating in the continuous current mode, VOUT4 in FIG. 24 represents the waveform of the output voltage VOUT led to the load 102 from the switching power supply according to the embodiment shown in FIG. 23 operating in the discontinuous current mode, and VOUT5 in FIG. 24 represents the waveform of the output voltage VOUT fed to the load 102 from the switching power supply according to the embodiment shown in FIG. 23 operating in the continuous current mode.

As will be understood from VOUT4 in FIG. 24, the switching power supply according to the embodiment shown in FIG. 23 can even in the discontinuous current mode, output an output voltage VOUT substantially equal to the target value Vref.

As will be understood from a comparison between VOUT5 and VOUT1 in FIG. 24, the switching power supply according to the embodiment shown in FIG. 23 can, as compared with the switching power supply according to the third embodiment shown in FIG. 19, reduce ripples in the output voltage VOUT in the continuous current mode.

Figure 25:
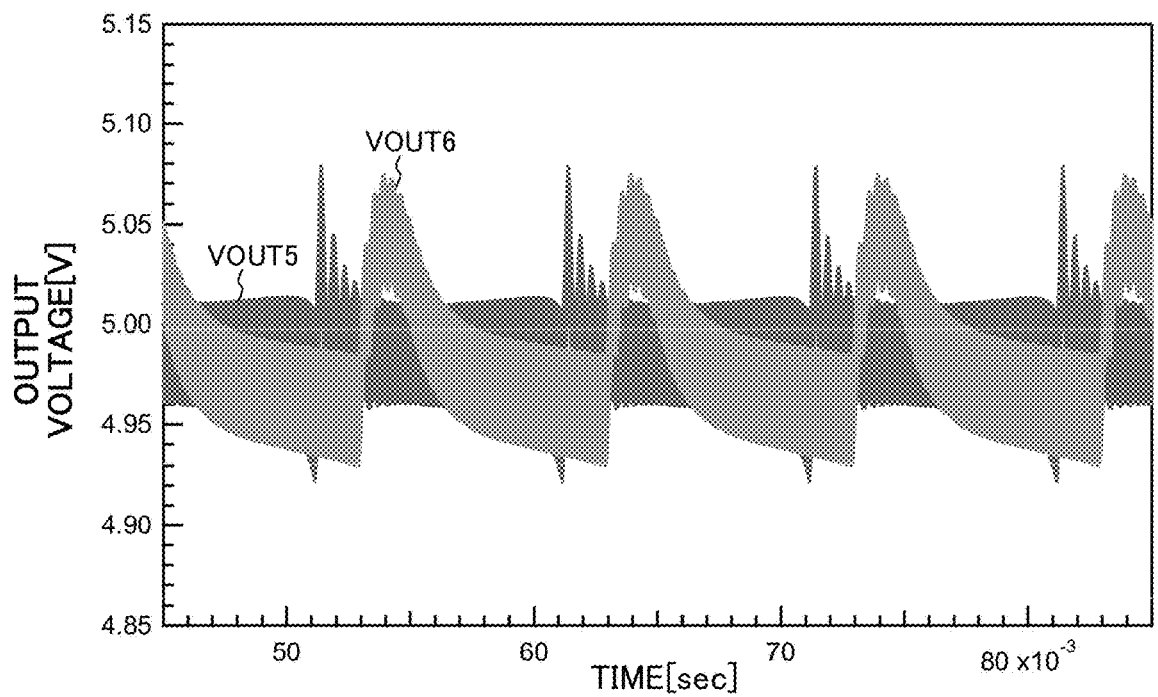
FIG. 25 is a time chart showing output power waveforms.

Now, the results of simulations with the switching power supply according to the embodiment shown in FIG. 23 and with the switching power supply according to Comparative Example shown in FIG. 20 are shown in FIG. 25. The simulation conditions are as follows: the AC voltage output from the AC power source 101 is an AC voltage at 50 Hz with an effective value of 100 V; the target voltage Vref is 5.0 V; the output current Io is 3.0 A; the switching frequency is 100 kHz; the capacitance of the input capacitor C101 in the switching power supply according to the embodiment shown in FIG. 23 is 10 µF; the capacitance of the output capacitor C101 in the switching power supply according to Comparative Example shown in FIG. 20 is 30 µF; the capacitance of the output capacitor C102 is 100 µF; and the ratio n of the number of turns of the secondary winding L102 to the number of turns of the primary winding L101 is 0.5.

VOUT5 in FIG. 25 represents the waveform of the output voltage VOUT fed to the load 102 from the switching power supply according to the embodiment shown in FIG. 23, and VOUT6 in FIG. 25 represents the waveform of the output voltage VOUT fed to the load 102 from the switching power supply according to Comparative Example shown in FIG. 20.

As will be understood from FIG. 25, in the switching power supply according to the embodiment shown in FIG. 23, as compared with the switching power supply according to Comparative Example shown in FIG. 20, even the capacitance of the input capacitor C101 is one third, it is possible to keep ripples in the output voltage VOUT substantially the same. Although the capacitance of the input capacitor C101 cannot be reduced so much as in the switching power supply according to the embodiment shown in FIG. 23, also in the switching power supply according to the third embodiment shown in FIG. 19, as compared with the switching power supply according to Comparative Example shown in FIG. 2D, even the capacitance of the input capacitor C101 is reduced, it is possible to keep ripples in the output voltage VOUT substantially the same (see FIG. 21).

Thus, when an electrolytic capacitor is used as the input capacitor C101, it is possible to reduce the size of the electrolytic capacitor in the switching power supply according to the embodiment shown in FIG. 23 and the switching power supply according to the third embodiment shown in FIG. 19 as compared with the switching power supply according to Comparative Example shown in FIG. 20. Even in a case where the specifications of the power source require an electrolytic capacitor as the input comparator C101 in the switching power supply according to Comparative Example shown in FIG. 20, in the switching power supply according to the embodiment shown in FIG. 23 and the switching power supply according to the third embodiment shown in FIG. 19, it is possible to use, as the input capacitor C101, a film capacitor or a laminated ceramic capacitor which has a lower capacitance than the electrolytic capacitor. The electrolytic capacitor intrinsically has a finite lifetime, in contrast, the film capacitor or the laminated ceramic capacitor intrinsically has an infinite lifetime. It is thus preferable, as long as the specifications of the power source are met, that a film capacitor or a layered ceramic capacitor be used as the input capacitor C101 in the switching power supply according to the embodiment shown in FIG. 23 and the switching power supply according to the thud embodiment shown in FIG. 19 to prolong the life of the switching power supply.

Fifth Embodiment

Figure 26:
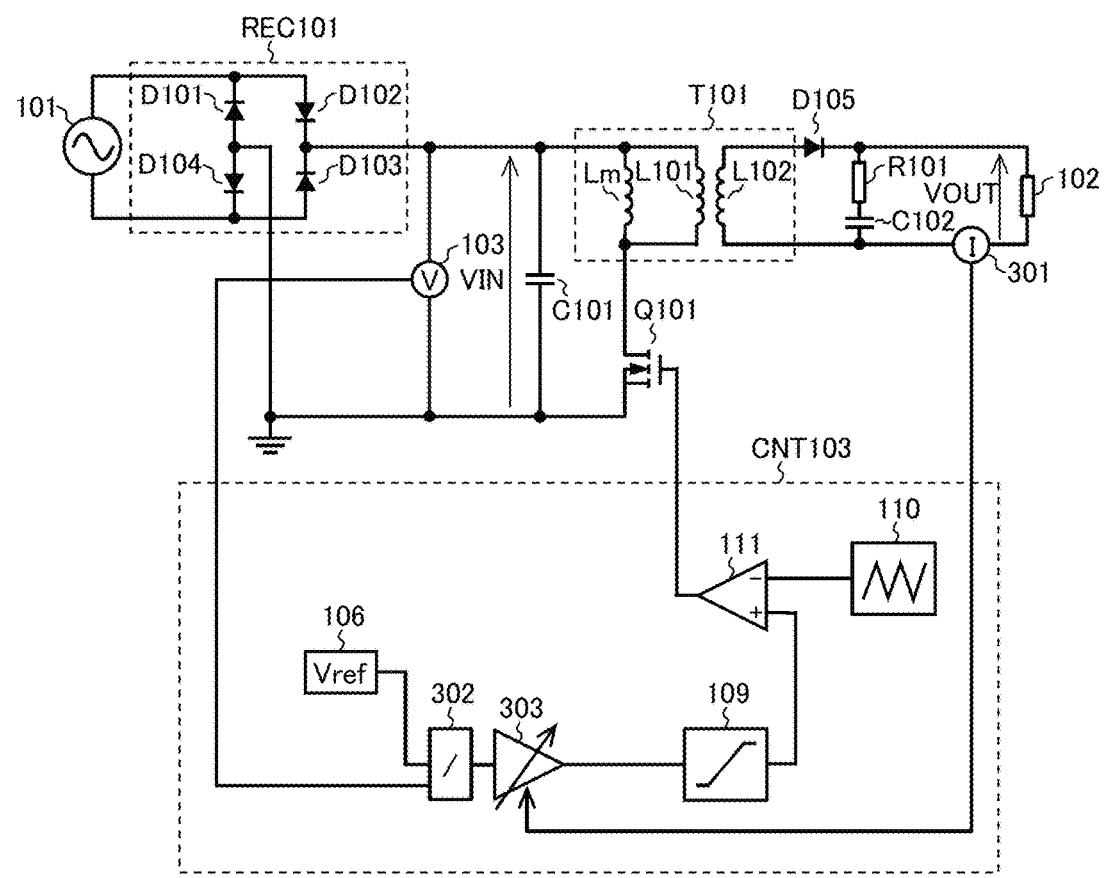
FIG. 26 is a diagram schematically showing a switching power supply according to a fifth embodiment.

FIG. 26 is a diagram schematically showing a switching power supply according to a fifth embodiment. The switching power supply according to this embodiment, as compared with the switching power supply according to the third embodiment, further includes a current monitor 301 and includes, in place of the switching control circuit CNT101, a switching control circuit CNT103. The switching control circuit CNT103 results from, as compared with the switching control circuit CNT101, omitting the amplifier 105, the adder 107, and the divider 108 and adding a divider 302 and a variable gain amplifier 303. In the following description, for such components as find their counterparts in the third embodiment, no overlapping description will be repeated.

The switching control circuit CNT103 includes a determiner and a control signal generator. The determiner determines a duty according to a calculation formula which is a calculation formula of the steady state duty in the discontinuous current mode and which involves the input voltage VIN, the target voltage Vref the excitation inductance Lm of the transformer T101, the resistance value of the load 102, and the sampling period of the switching control circuit CNT103. The control signal generator generates a control signal for the switching device Q101 based on the duty determined by the determiner.

In this embodiment, as the determiner, the voltage source 106, the divider 302, the variable gain amplifier 303, and the limiter 109 are used. The determiner uses the input voltage VIN only for feedforward control.

The current monitor 301 monitors the output current of the switching power supply and feeds the result of the monitoring to the switching control circuit CNT103, The divider 302 outputs the result of dividing the output of the voltage source 106 by the input voltage VIN. The variable gain amplifier 303 amplifies the output of the divider 302 at an amplification factor corresponding to the result of the monitoring by the current monitor 301. Thus, the output of the variable gam amplifier 303 has the value given by the calculation formula of the steady slate duty of a flyback switching power supply in the discontinuous current mode.

In the feedforward control performed by the switching control circuit CNT103, unlike in feedback control, when the input voltage VIN varies, before the output voltage VOUT varies as a result of the variation of the input voltage VIN control for suppressing the variation of the output voltage VOUT takes effect. Thus, in the switching control circuit CNT103, even when the input voltage VIN varies in the discontinuous current mode, it is possible to sufficiently suppress the variation of the output voltage VOUT.

Sixth Embodiment

Figure 27:
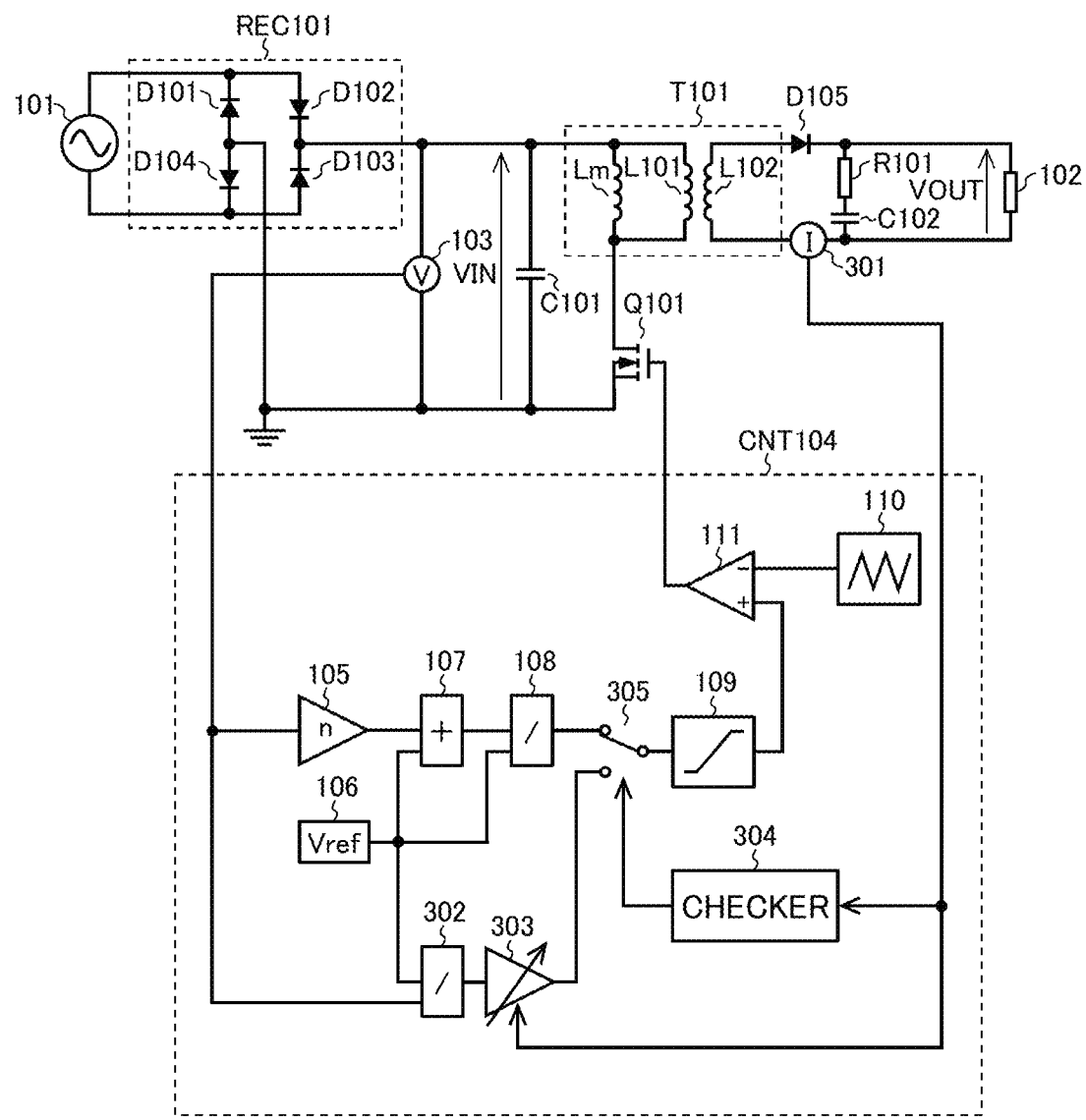
FIG. 27 is a diagram schematically showing a switching power supply according to a sixth embodiment.

FIG. 27 is a diagram schematically showing a switching power supply according to a sixth embodiment. The switching power supply according to this embodiment includes, in place of the switching control circuit CNT103 in the switching power supply according to the fifth embodiment, a switching control circuit CNT104. The switching control circuit CNT104, as compared with the switching control circuit CNT103, further includes an amplifier 105, an adder 107, a divider 108, a checker 304, and a switch 305. In this embodiment, the position of the current monitor 301 is so changed as to monitor the current passing through the secondary winding L102 of the transformer T101. The position of the current monitor 301 can be a position where the current monitor 301 monitors the current passing through the primary winding L101 of the transformer T101. In the following description, for such components as find their counterparts in the third and fifth embodiments, no overlapping description will be repeated.

The checker 304 checks whether the switching power supply according to this embodiment operates in the continuous current mode or in the discontinuous current mode. Although, in the configuration example shown in FIG. 27, the checker 304 makes the check based on the result of the monitoring by the current monitor 301, the checker 304 can make the check based on other information.

When the checker 304 judges that the switching power supply according to this embodiment is operating in the continuous current mode, the switch 305 chooses the output terminal of the divider 108 as the connection destination of the input terminal of the limiter 109. By contrast, when the checker 304 judges that the switching power supply according to the embodiment is operating in the discontinuous current mode, the switch 305 chooses the output terminal of the variable gain amplifier 303 as the connection destination of the input terminal of the limiter 109.

In the switching control circuit CNT104, both when the input voltage VIN varies in the continuous current mode and when the input voltage VIN varies in the discontinuous current mode, it is possible to sufficiently suppress the variation of the output voltage VOUT.

Seventh Embodiment

Figure 28:
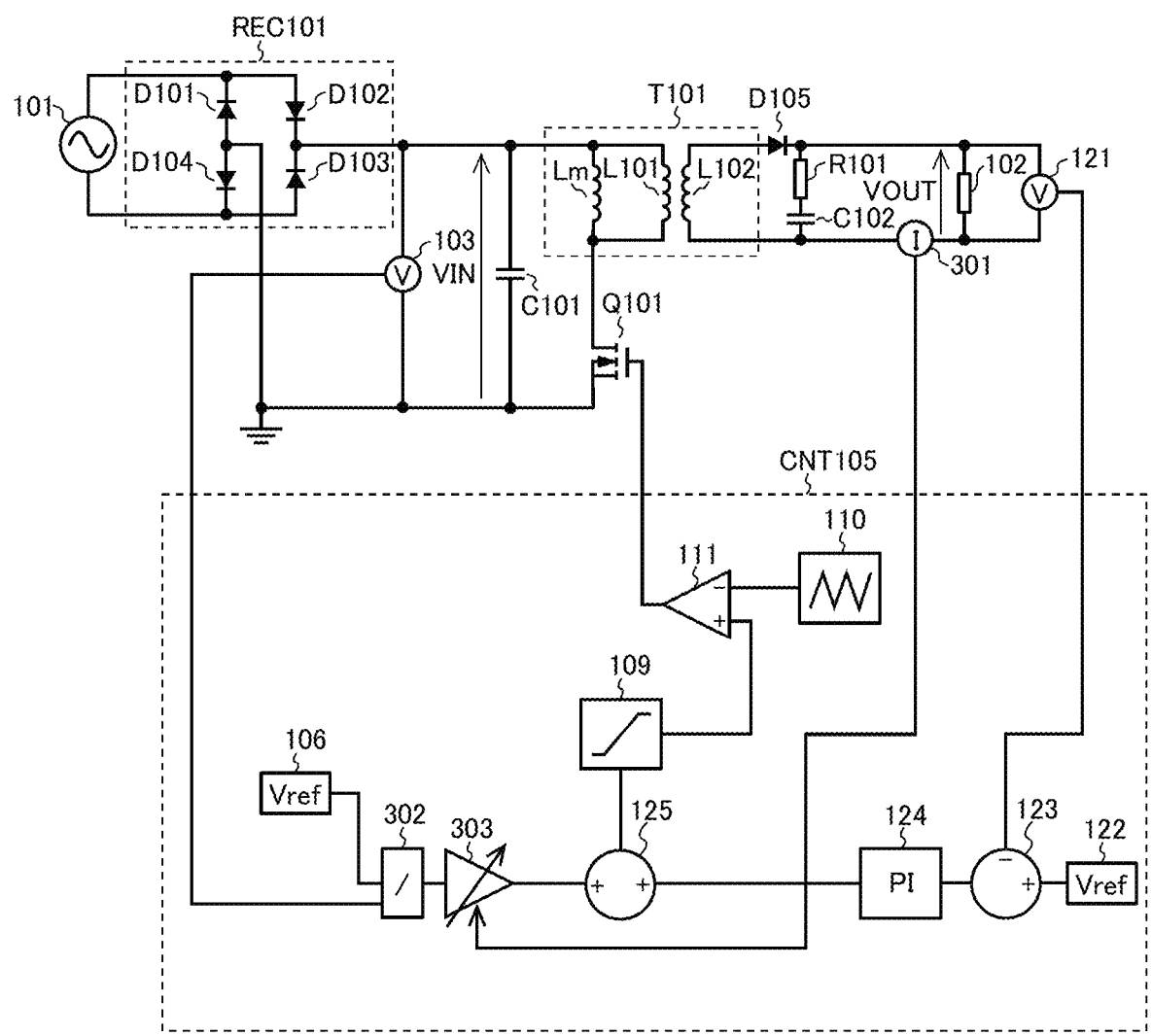
FIG. 28 is a diagram schematically showing a switching power supply according to a seventh embodiment.

FIG. 28 is a diagram schematically showing a switching power supply according to a seventh embodiment. The switching power supply according to this embodiment, as compared with the switching power supply according to the fifth embodiment, further includes an output voltage monitor 121 and includes, in place of the switching control circuit CNT103, a switching control circuit CNT105. The switching control circuit CNT105, as compared with the switching control circuit CNT103, further includes a voltage source 122, an adder-subtractor 123, a PI controller 124, and an adder 125. Instead of the PI controller 124, another controller such as a PID controller can be used.

The differences between this embodiment and the fifth embodiment are similar to the differences between the four embodiment and the third embodiment. Thus, no overlapping description will be repeated.

Eight Embodiment

Figure 29:
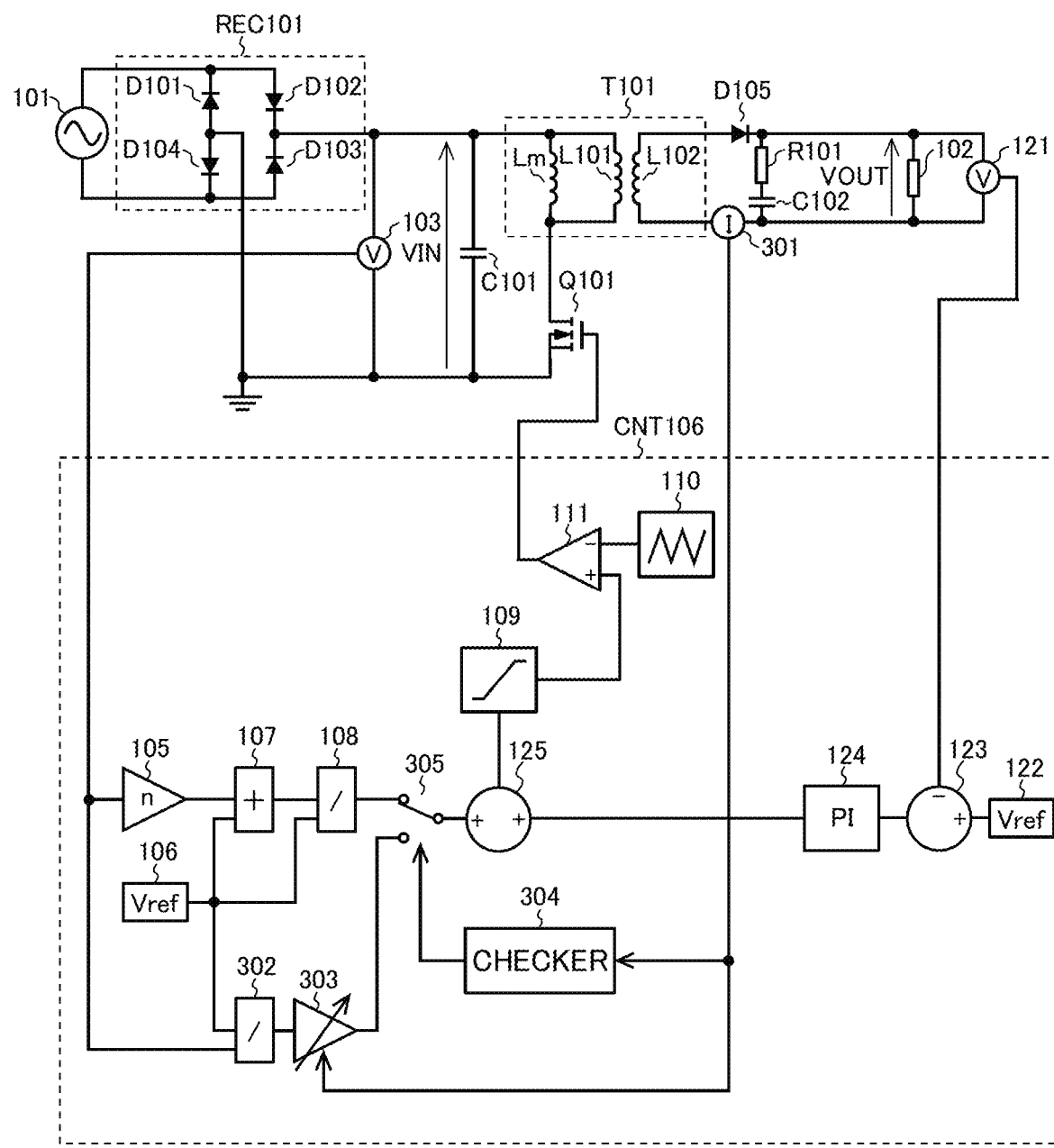
FIG. 29 is a diagram schematically showing a switching power supply according to an eighth embodiment.

FIG. 29 is a diagram schematically showing a switching power supply according to an eighth embodiment. The switching power supply according to this embodiment, as compared with the switching power supply according to the sixth embodiment, further includes an output voltage monitor 121 and includes, in place of the switching control circuit CNT104, a switching control circuit CNT106. The switching control circuit CNT106, as compared with the switching control circuit CNT104, further includes a voltage source 122, an adder-subtractor 123, a PI controller 124, and an adder 125. Instead of the PI controller 124, another controller such as a PID controller can be used.

The differences between this embodiment and the sixth embodiment are similar to the differences between the four embodiment and the third embodiment. Thus, no overlapping description will be repeated.

Application

A description will now be given of applications of the above-described switching power supply. The switching power supply can be suitably used as a power supply block in AC adapters and electronic devices.

Figure 30:
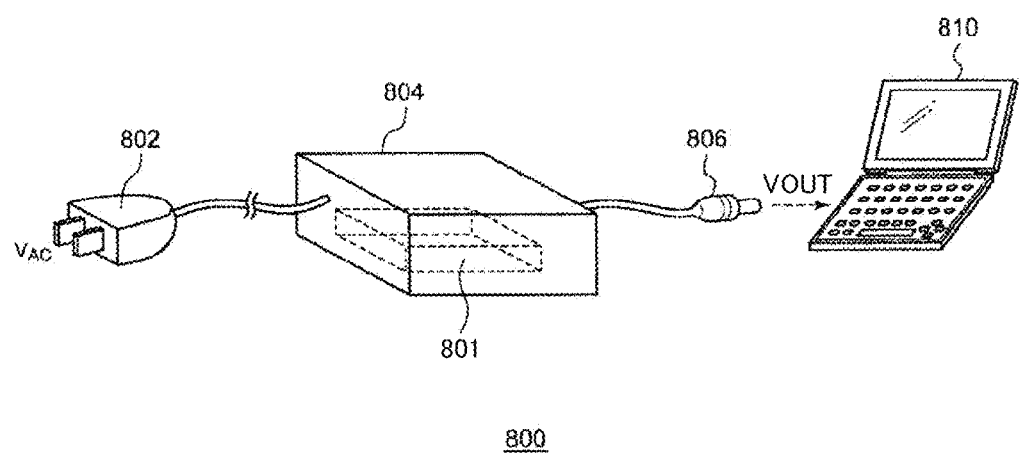
FIG. 30 is a diagram showing a configuration example of an AC adapter incorporating a switching power supply.

FIG. 30 is a diagram showing a configuration example of an AC adapter incorporating a switching power supply. The AC adapter 800 includes a plug 802, a housing 804, and a connector 806. The plug 802 is fed with a commercial AC voltage $V_{AC}$ from an unillustrated outlet. A switching power supply 801 is mounted inside the housing 804. The output voltage VOUT generated by the switching power supply 801 is fed to an electronic device 810 via the connector 806. Examples of the electronic device 810 include notebook computers, digital still cameras, digital video cameras, cellular phones, portable audio players, and the like.

Figure 31A:
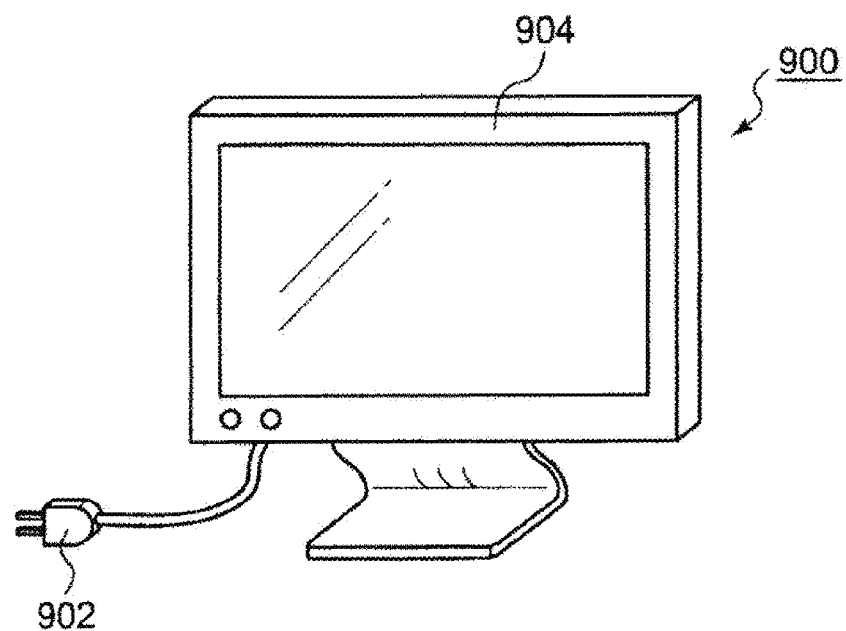
FIG. 31A is a front view showing a configuration example of an electronic device incorporating a switching power supply.
Figure 31B:
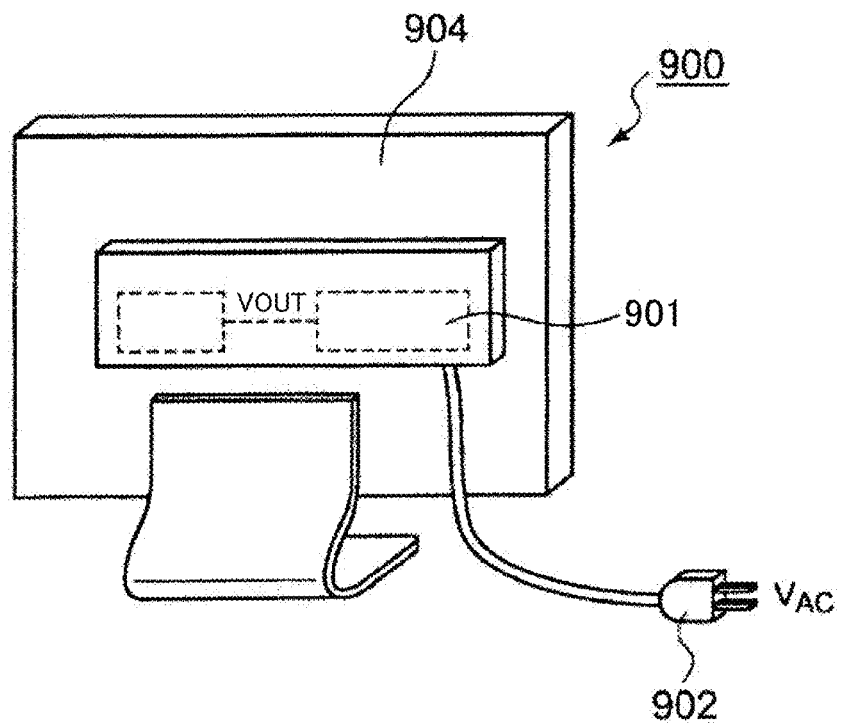
FIG. 31B is a rear view showing a configuration example of the electronic device incorporating the switching power supply.

FIGS. 31A and 31B are diagrams showing a configuration example of an electronic device incorporating a switching power supply. FIG. 31A is a front view of the electronic device 900 and FIG. 31B is a rear view of the electronic device 900. Although the electronic device 900 shown as an example in FIGS. 31A and 31B is a display device, there is no restriction on the kind of the electronic device 900; it may be any electronic device incorporating a power supply such as audio devices, refrigerators, washing machines, and vacuum cleaners. Here, it is preferable that an AC-DC converter which does not require a PFC circuit be applied.

A plug 902 is fed with a commercial AC voltage $V_{AC}$ from an unillustrated outlet. A switching power supply 901 is mounted inside a housing 904. The output voltage VOUT generated by the switching power supply 901 is fed to a load (such as a DSP (digital signal processor), microcontroller, power supply circuit, lighting device, battery, analog circuit, or digital circuit) incorporated in the housing 904.

Modified Examples

It should be understood that the third to eighth embodiments are in every aspect illustrative and not restrictive, and that the technical scope of the present invention is defined not by the description of the embodiments given above but by the appended claims and encompasses any modifications in the sense and scope equivalent to those of the claims.

For example, although the above-described third to eighth embodiments deal with configurations where the switching power supply includes an input capacitor C101, as long as the specifications of the power source are met a configuration is also possible where the switching power supply includes no input capacitor C101.

For another example, although the third to eighth embodiments deal with a configuration where the switching power supply includes a rectifier REC101, a configuration is also possible where the switching power supply includes no rectifier REC101, in which case a DC voltage fed from a DC voltage source may be used as the input voltage VIN.

For another example, although, in the fourth, seventh, and eighth embodiments, the output of the divider 108 or the variable gain amplifier 303 (that is, the feedforward control output value) is added to the output of the PI controller 124 (that is, the feedback control output value), instead, the output of the divider 108 or the variable gain amplifier 303 (that is, the feedforward control output value) may be multiplied by the output of the PI controller 124 (that is, the feedback control output value). It should be noted, however, that the former configuration yields an output voltage VOUT with smaller ripples.

Third Invention

Ninth Embodiment

Figure 32:
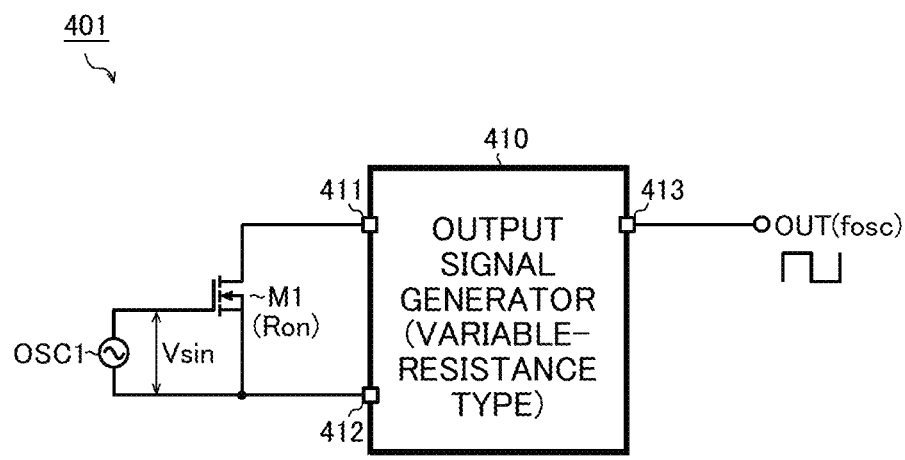
FIG. 32 is a diagram showing an oscillation circuit according to a ninth embodiment.

FIG. 32 is a diagram showing an oscillation circuit according to a ninth embodiment, and it can be used as an oscillation circuit in a semiconductor device used in electronic devices like those shown in FIGS. 12, 30, and 31. The oscillation circuit 401 according to this embodiment includes an output signal generator 410 of a variable-resistance type, an N-channel MOS (metal-oxide-semiconductor) field-effect transistor M1, and a sine-wave oscillator OSC1.

The drain of the transistor M1 is connected to a node 411 of the output signal generator 410. The source and the backgate of the transistor M1 are connected to a node 412 of the output signal generator 410.

The sine-wave oscillator OSC1 applies an oscillation voltage Vsin with a sinusoidal waveform between the gate and the source of the transistor M1 and periodically changes the ON-resistance value Ron between the drain and the source of the transistor M1. Specifically, the higher the oscillation voltage Vsin, the lower the ON-resistance value Ron of the transistor M1, and the lower the oscillation voltage Vsin, the higher the ON-resistance value Ron of the transistor M1.

The output signal generator 410 generates an output signal OUT with a rectangular waveform at the oscillation frequency fosc corresponding to the ON-resistance value Ron of the transistor M1 connected between the nodes 411 and 412, and outputs the output signal OUT from a node 413. For example, the higher the ON-resistance value Ron of the transistor M1, the lower the oscillation frequency fosc of the output signal OUT, and the lower the ON-resistance value Ron of the transistor M1, the higher the oscillation frequency fosc of the output signal OUT. The On-duty Don of the output signal OUT (the proportion of the ON period Ton in the switching period T, Don=Ton/T) can be a fixed value or a variable value.

As described above, in the oscillation circuit 401 according to this embodiment, simply by combining the output signal generator 410 of a variable-resistance type with the transistor M1 and the sine-wave oscillator OSC1, it is possible to perform spectrum spreading of the oscillation frequency fosc in a very simply manner without requiring digital-analog converters and operators.

Figure 33:
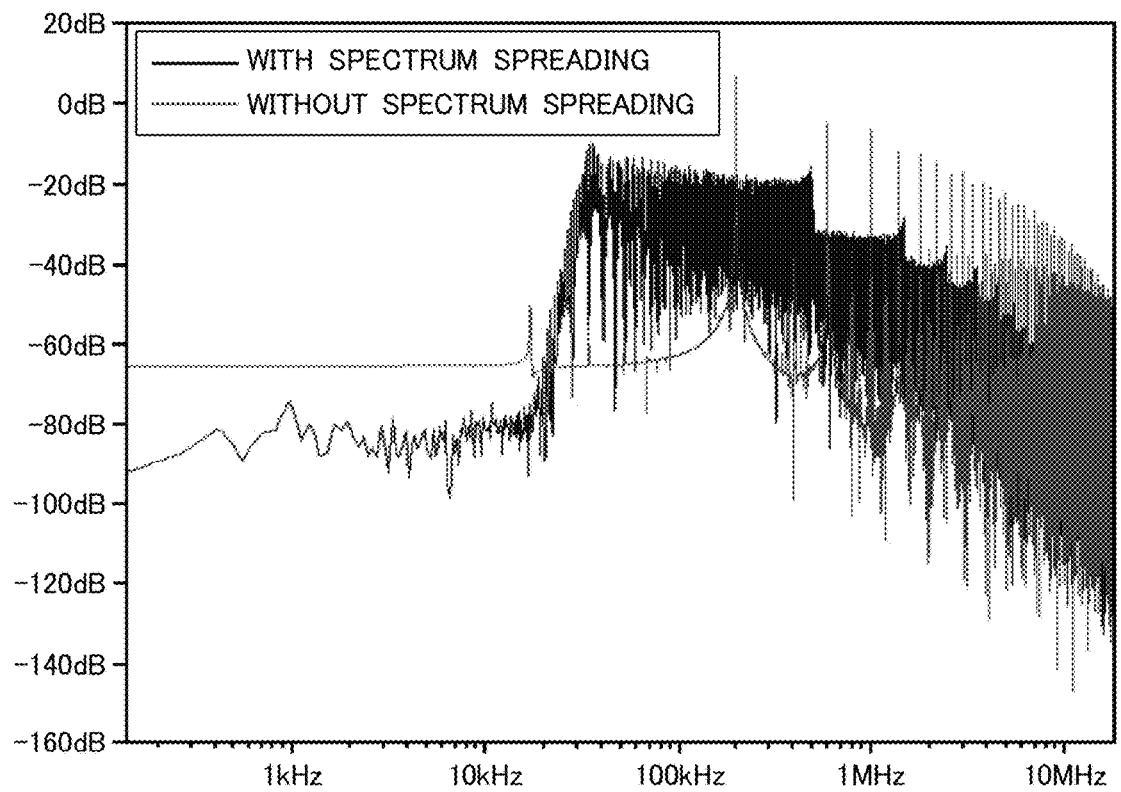
FIG. 33 is a diagram showing the results of an FFT analysis on an output signal.

FIG. 33 is a diagram showing the results of an FFT (fast fourier transform) analysis on the output signal OUT. The black line in FIG. 33 represents the frequency spectrum observed when spectrum spreading of the oscillation frequency fosc is performed, and the gray line in FIG. 33 represents the frequency spectrum observed when no spectrum spreading of the oscillation frequency fosc is performed (when the oscillation frequency fosc is fixed).

As will be understood from FIG. 33, performing spectrum spreading of the oscillation frequency fosc, compared with not performing spectrum spreading, helps reduce noise by several tens of decibel.

The oscillation frequency fsin of the sine-wave voltage Vsin can be set at a frequency lower than the frequency band stipulated as the target of regulation by the noise standard with which the oscillation circuit 401 is supposed to comply. With this setting, the frequency component of the sine-wave voltage Vsin is out of the target of regulation by the noise standard, and thus the presence of the sine-wave voltage Vsin does not interfere with complying with the noise standard.

Output Signal Generator (Variable-Resistance Type

Figure 34:
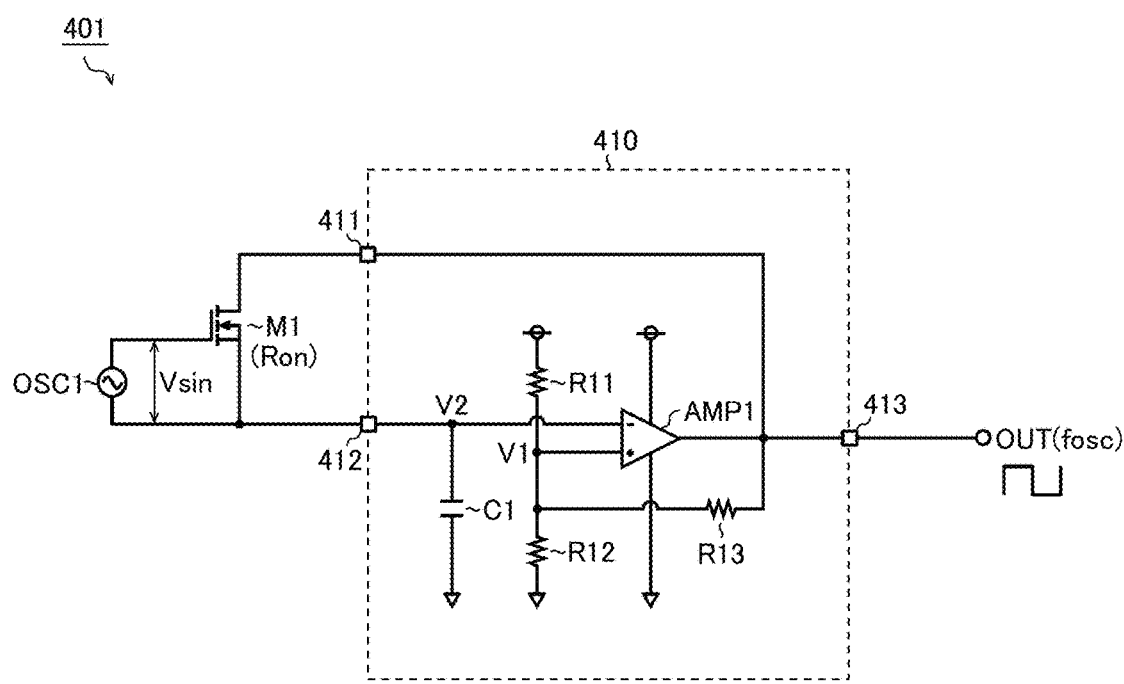
FIG. 34 is a diagram showing a configuration example of an output signal generator (of a variable-resistance type)

FIG. 34 is a diagram showing a configuration example of the output signal generator 410. The output signal generator 410 of this configuration example is an astable multivibrator including an operational amplifier AMP1, resistors R11 to R13, and a capacitor C1, and the ON-resistance Ron of the transistor M1 connected between the nodes 411 and 412 functions as one of the circuit elements.

The first terminal of the resistor R11 is connected to a power terminal. The second terminal of the resistor R11 and the first terminals of the resistors R12 and R13 are all connected to the non-inverting input terminal (+) of the operational amplifier AMP1. The second terminal of the resistor R12 is connected to a ground terminal. The second terminal of the resistor R13 and the output terminal of the operational amplifier AMP1 are both connected to both the nodes 411 and 413. The first terminal of the capacitor C1 and the inverting input terminal (−) of the operational amplifier AMP1 are both connected to the node 412. The second terminal of the capacitor C1 is connected to the ground terminal. The high-side power terminal of the operational amplifier AMP1 is connected to a power terminal. The low-side power terminal of the operational amplifier AMP1 is connected to the ground terminal.

A description will now be given of the operation of the output signal generator 410 on the assumption that the node voltages applied to the turn-inverting input terminal (+) and the inverting input terminal (−) of the operational amplifier AMP1 equal V1 and V2, respectively. When V1>V2, the output signal OUT is at high level; thus, the capacitor C1 is charged and the node voltage V2 increases. Then, on reversal to V1<V2, the output signal OUT falls from high level back to low level; now, the capacitor C1 is discharged and the node voltage V2, thus far increasing, decreases.

In this way, the capacitor C1 is repeatedly charged and discharged, and thus the output signal OUT oscillates at the oscillation frequency fosc corresponding to the ON-resistance value Ron of the transistor M1 and the capacitance value of the capacitor C1. The oscillation frequency fosc can be expressed by formula (3) below.

Expression 10

$$fosc = \frac{1}{2 \cdot C1 \cdot Ron} \quad (3)$$

As will be understood from formula (3) above, in the output signal generator 410 of this configuration example, changing the ON-resistance value Ron of the transistor M1 periodically by use of the oscillation voltage Vsin makes it possible to perform spectrum spreading of the oscillation frequency fosc.

Sine-Wave Oscillator (Wien-Bridge Oscillator)

Figure 35:
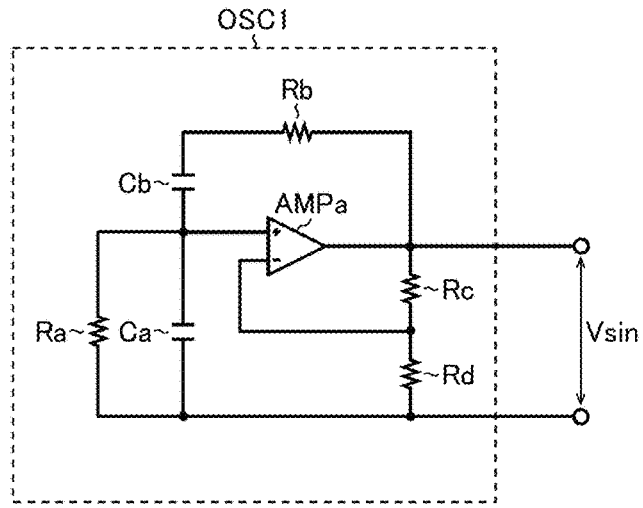
FIG. 35 is a diagram showing a configuration example of a sine-wave oscillator.

FIG. 35 is a diagram showing a configuration example of the sine-wave oscillator OSC1. The sine-wave oscillator OSC1 of this configuration example is a Wien-bridge oscillator including an operational amplifier AMPa, resistors Ra to Rd, and capacitors Ca to Cb.

The non-inverting input terminal (+) of the operational amplifier AMPa is connected to the first terminal of the resistor Ra and to the first terminals of the capacitors Ca and Cb. The second terminal of the capacitor Cb is connected to the first terminal of the resistor Rb. The second terminal of the resistor Rb and the first terminal of the resistor Rc are both connected to the output terminal of the operational amplifier AMPa (corresponding to a first output terminal of the oscillation voltage Vsin). The second terminal of the resistor Rc and the first terminal of the resistor Rd are both connected to the inverting input terminal (−) of the operational amplifier AMPa. The second terminals of the resistors Ra and Rd and of the capacitor Ca are all connected to a reference potential terminal (corresponding to a second output terminal of the oscillation voltage Vsin).

As described above, the sine-wave oscillator OSC1 of this configuration example includes a positive feedback loop leading from the output terminal of the operational amplifier AMPa via band pass filters (Ra, Rb, Ca, and Cb) track to the non-inverting input terminal (+) and a negative feedback loop leading from the output terminal of the operational amplifier AMPa via voltage dividers (Rc and Rd) back to the inverting input terminal (−). The oscillation conditions and the oscillation frequency fsin can be expressed by formulae (4a) and (4b) below, respectively.

Expression 11

$$1 + \frac{Rb}{Ra} + \frac{Ca}{Cb} = \frac{Rc + Rd}{Rd} \quad (4a)$$

$$f\sin = \frac{1}{2\pi\sqrt{Ca \cdot Cb \cdot Ra \cdot Rb}} = \frac{1}{2\pi \cdot C \cdot R} \quad (4b)$$

$$(Ca = Cb = C, Ra = Rb = R)$$

Tenth Embodiment

Figure 36:
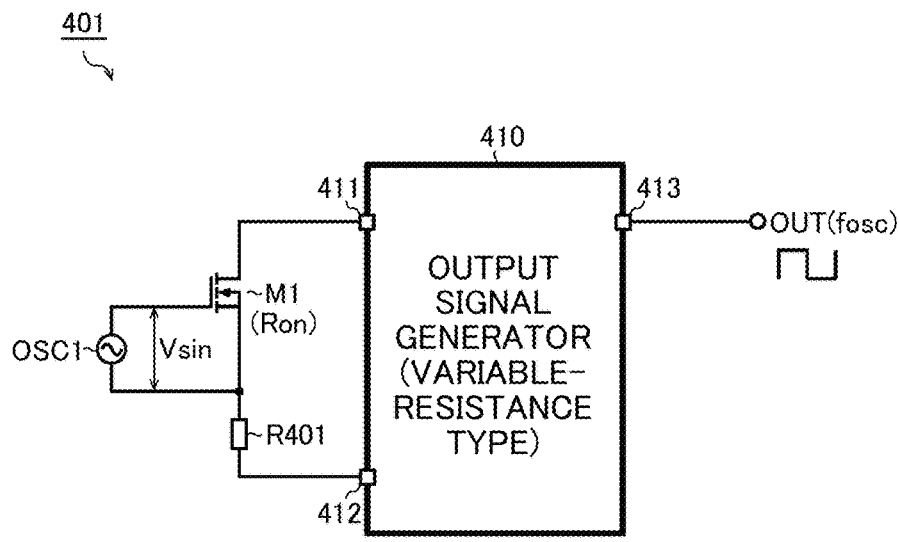
FIG. 36 is a diagram showing an oscillation circuit according to a tenth embodiment.

FIG. 36 is a diagram showing an oscillation circuit according to a tenth embodiment. The oscillation circuit 401 according to this embodiment, while being based on the ninth embodiment (FIG. 32) above, further includes a resistor R401 connected in series with the transistor M1. The output signal generator 419 generates the output signal OUT at the oscillation frequency fosc corresponding to the composite resistance value (Ron+R401) calculated from the ON-resistance value Ron of the transistor M1 and the resistance value of the resistor R401.

In the oscillation circuit 401 according to this embodiment, as compared with the ninth embodiment (FIG. 32) above, the center value of the oscillation frequency fosc is easier to set. The resistor R401 does not necessarily to be connected between the source of the transistor M1 and the node 412; instead, it may be connected between the drain of the transistor M1 and the node 411.

Eleventh Embodiment

Figure 37:
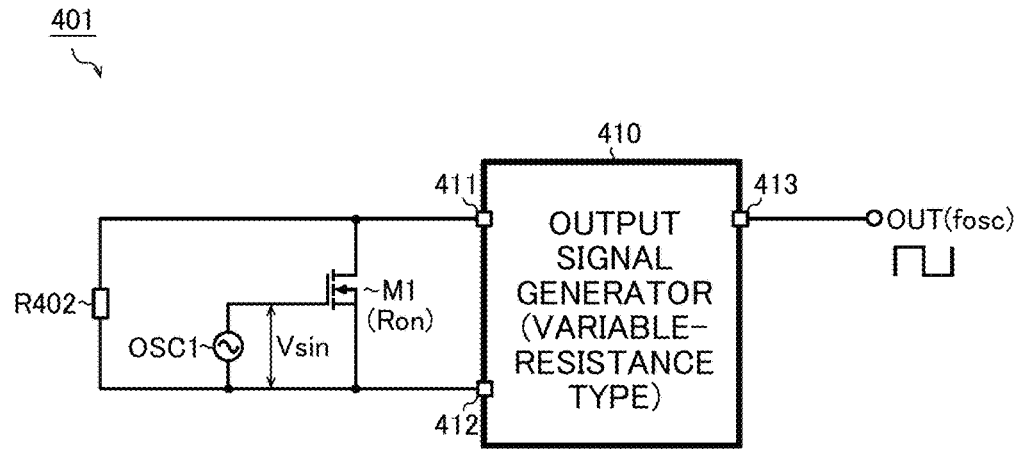
FIG. 37 is a diagram showing an oscillation circuit according to an eleventh embodiment.

FIG. 37 is a diagram showing an oscillation circuit according to an eleventh embodiment. The oscillation circuit 401 according to this embodiment, while being based on the ninth embodiment (FIG. 32) above, further includes a resistor R402 connected in parallel with the transistor M1. The output signal generator 410 generates the output signal OUT at the oscillation frequency fosc corresponding to the composite resistance value (R402×Ron/(R402+Ron)) calculated from the ON-resistance value Ron of the transistor M1 and the resistance value of the resistor R402.

In the oscillation circuit 401 according to this embodiment, as in the tenth embodiment (FIG. 36) above, as compared with the ninth embodiment (FIG. 32) above, the center value of the oscillation frequency fosc is easier to set as necessary.

Twelfth Embodiment

Figure 38:
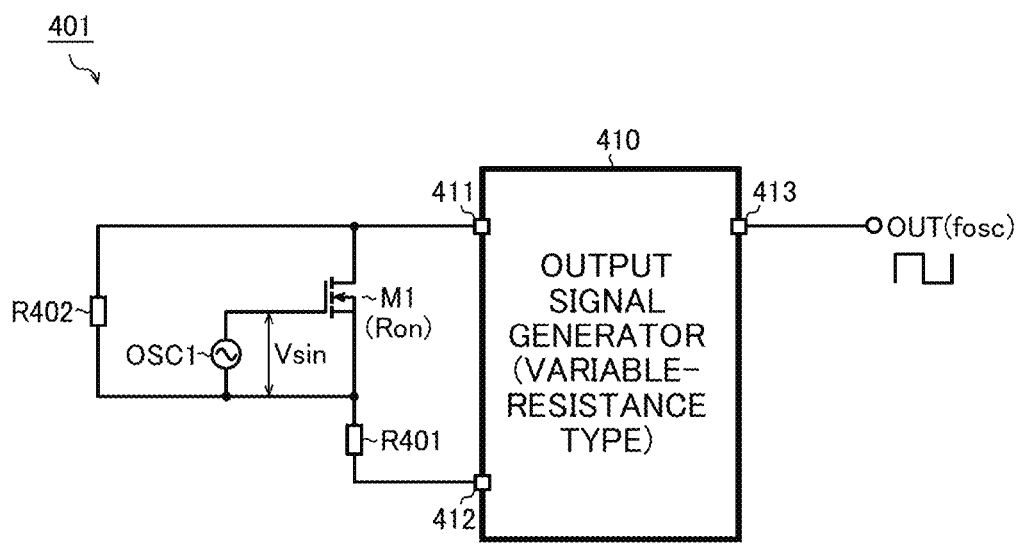
FIG. 38 is a diagram showing an oscillation circuit according to a twelfth embodiment.

FIG. 38 is a diagram showing an oscillation circuit according to a twelfth embodiment. The oscillation circuit 401 according to this embodiment, while being based on the ninth embodiment (FIG. 32) above, further includes a resistor R401 connected in series with the transistor M1 and a resistor R402 connected in parallel with the transistor M1. The output signal generator 410 generates the output signal OUT at the oscillation frequency fosc corresponding to the composite resistance value (R402×Ron/(R402+Ron)+R401) calculated from the ON-resistance value Ron of the transistor M1 and the resistance values of the resistors R401 and R402.

In the oscillation circuit 401 according to this embodiment as in the tenth and eleventh embodiments (FIGS. 36 and 37) above, as compared with the ninth embodiment (FIG. 32) above, the center value of the oscillation frequency fosc is easier to set as necessary.

Thirteenth Embodiment

Figure 39:
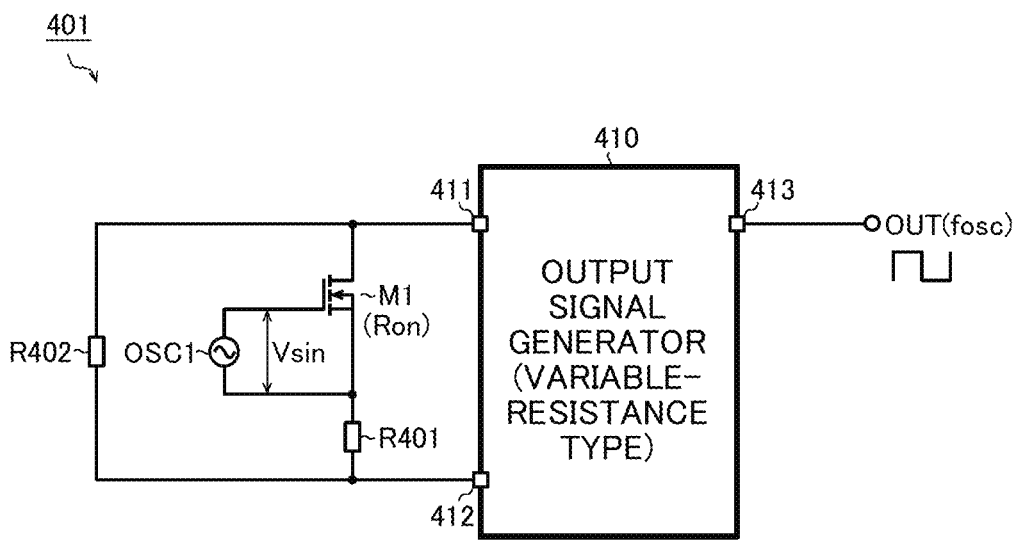
FIG. 39 is a diagram showing an oscillation circuit according to a thirteenth embodiment.

FIG. 39 is a diagram showing an oscillation circuit according to a thirteenth embodiment. The oscillation circuit 401 according to this embodiment, while being based on the ninth embodiment (FIG. 32) above, further includes a resistor R401 connected in series with the transistor M1 and a resistor R402 connected in parallel with the transistor M1 and the resistor R401. The output signal generator 410 generates the output signal OUT at the oscillation frequency fosc corresponding to the composite resistance value (R402×(R401+Ron)/(R401+R402+Ron)) calculated from the ON-resistance value Ron of the transistor M1 and the resistance values of the resistors R401 and R402.

In the oscillation circuit 401 according to this embodiment, as in the tenth to twelfth embodiments (FIGS. 36, 37, and 38) above, as compared with the ninth embodiment (FIG. 32) above, the center value of the oscillation frequency fosc is easier to set as necessary.

Fourteenth Embodiment

Figure 40:
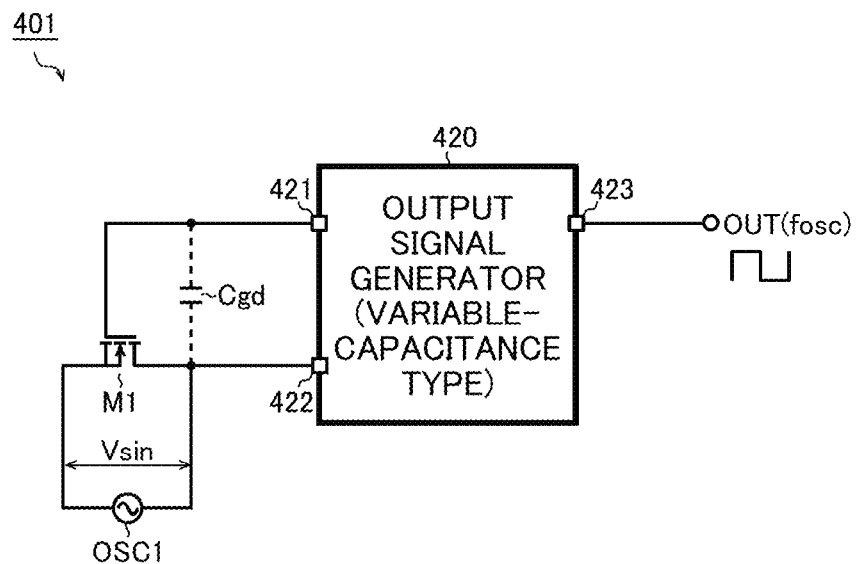
FIG. 40 is a diagram showing an oscillation circuit according to a fourteenth embodiment.

FIG. 40 is a diagram showing an oscillation circuit according to a fourteenth embodiment. In the oscillation circuit 401 according to this embodiment, instead of the output signal generator 410 of the variable-resistance type in the ninth embodiment (FIG. 32) above, an output signal generator 420 of a variable-capacitance type is used, and the interconnection between the transistor M1 and the sine-wave oscillator OSC1 is modified accordingly.

In the oscillation circuit 401 according to this embodiment, the gate and the drain of the transistor M1 are connected to nodes 421 and 422, respectively, of the output signal generator 420.

The sine-wave oscillator OSC1 applies the oscillation voltage Vsin with a sinusoidal waveform between the drain and the source of the transistor M1 and periodically changes the parasitic capacitance value Cgd between the gate and the drain of the transistor M1. Specifically, the higher the oscillation voltage Vsin, the tower the parasitic capacitance value Cgd of the transistor M1, and the lower the oscillation voltage Vsin, the higher the parasitic capacitance value Cgd of the transistor M1.

The output signal generator 410 generates an output signal OUT with a rectangular waveform at the oscillation frequency fosc corresponding to the parasitic capacitance value Cgd of the transistor M1 connected between the nodes 421 and 422, and outputs the output signal OUT from a node 423. For example, the higher the parasitic capacitance value Cgd of the transistor M1, the lower the oscillation frequency fosc of the output signal OUT, and the lower the parasitic capacitance value Cgd of the transistor M1, the higher the oscillation frequency fosc of the output signal OUT. The On-duty Don of the output signal OUT can be a fixed value or a variable value. In this respect, a similar description applies here as with the ninth embodiment (FIG. 32) above.

As described above, in the oscillation circuit 401 according to this embodiment, simply by combining the output signal generator 420 of the variable-capacitance type with the transistor M1 and the sine-wave oscillator OSC1, it is possible to perform spectrum spreading of the oscillation frequency fosc in a very simply manner without requiring digital-analog converters and operators.

The oscillation frequency fsin of the sine-wave voltage Vsin can be set at a frequency lower than the frequency band stipulated as the target of regulation by the noise standard with which the oscillation circuit 401 is supposed to comply. With this setting, the frequency component of the sine-wave voltage Vsin is out of the target of regulation by the noise standard, and thus the presence of the sine-wave voltage Vsin does not interfere with complying with the noise standard. In this respect, a similar description applies here as with the ninth embodiment (FIG. 32) above.

Output Signal Generator (Variable-Capacitance Type)

Figure 41:
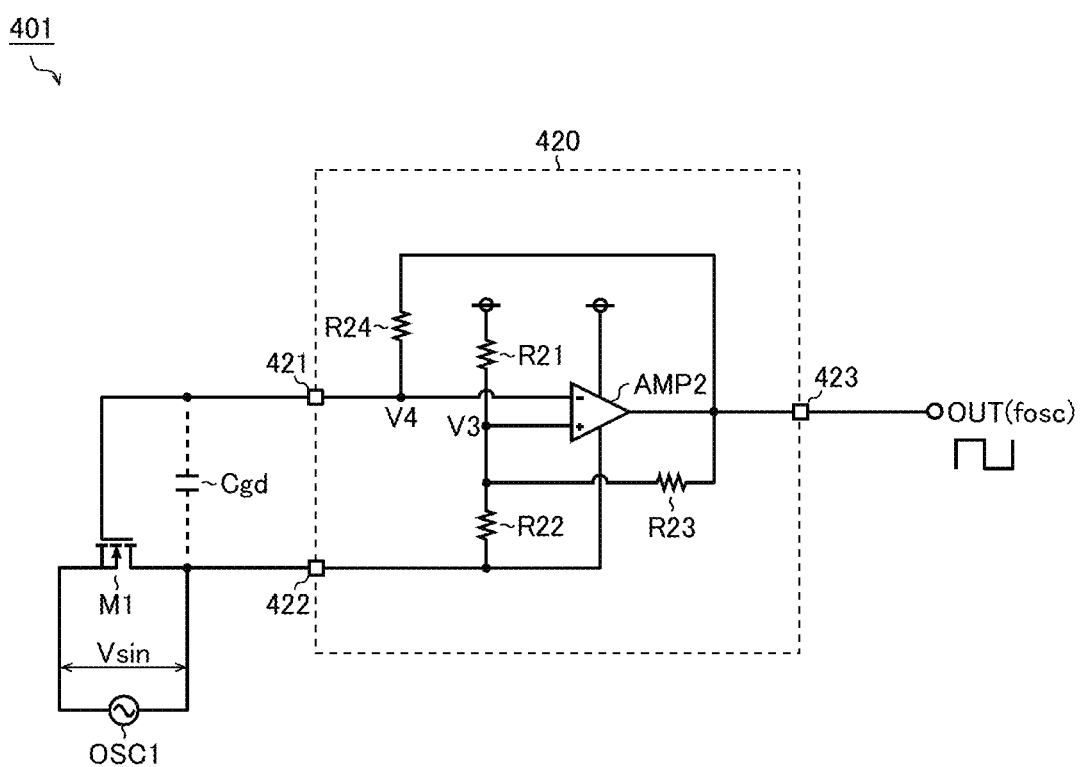
FIG. 41 is a diagram showing a configuration example of an output signal generator (of a variable-capacitance type)

FIG. 41 is a diagram showing a configuration example of the output signal generator 42b. The output signal generator 420 of this configuration example is an astable multivibrator including an operational amplifier AMP2 and resistors R21 to R24, and the parasitic capacitance Cgd of the transistor M1 connected between the nodes 421 and 422 functions as one of the circuit elements.

The first terminal of the resistor R21 is connected to a power terminal. The second terminal of the resistor R21 and the first terminals of the resistors R22 and R23 are all connected to the non-inverting input terminal (+) of the operational amplifier AMP2. The second terminal of the resistor R22 is connected to the node 422. The first terminal of the resistor R24 and the inverting input terminal (−) of the operational amplifier AMP2 are both connected to the node 421. The second terminals of the resistors R23 and R24 and the output terminal of the operational amplifier AMP2 are all connected to the node 423. The high-side power terminal of the operational amplifier AMP2 is connected to a power terminal. The low-side power terminal of the operational amplifier AMP2 is connected to the node 422.

A description will now be given of the operation of the output signal generator 420 on the assumption that the node voltages applied to the non-inverting input terminal (+) and the inverting input terminal (−) of the operational amplifier AMP2 equal V3 and V4, respectively. When V3>V4, the output signal OUT is at high level; thus, the parasitic capacitor Cgd is charged and the node voltage V4 increases. Then, on reversal to V3<V4, the output signal OUT fells from high level back to low level; now, the parasitic capacitor Cgd is discharged and the node voltage V4, thus far increasing, decreases.

In this way, the parasitic capacitor Cgd is repeatedly charged and discharged, and thus the output signal OUT oscillates at the oscillation frequency fosc corresponding to the resistance value of the resistor R24 and the parasitic capacitance value Cgd of the transistor M1. The oscillation frequency fosc can be expressed by formula (5) below.

Expression 12

$$fosc = \frac{1}{2 \cdot Cgd \cdot R24} \quad (5)$$

As will be understood from formula (5) above in the output signal generator 420 of this configuration example, changing the parasitic capacitance value Cgd of the transistor M1 periodically by use of the oscillation voltage Vsin makes it possible to perform spectrum spreading of the oscillation frequency fosc.

Output Ripple Suppression

Figure 42:
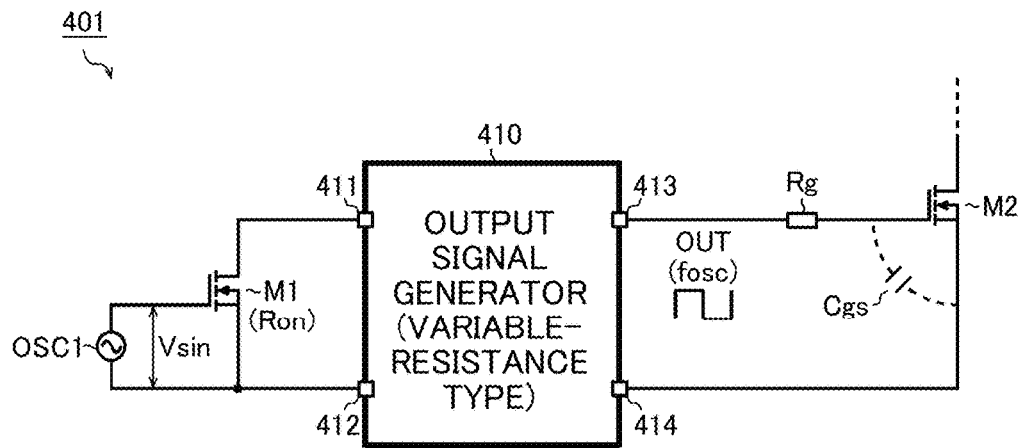
FIG. 42 is a diagram illustrating a condition for suppressing ripples in an output signal.

Now, with reference to FIGS. 42 to 44, suppression of ripples in the output signal OUT will be described. FIG. 42 is a diagram illustrating a condition for suppressing ripples in the output signal $OUT_x$ showing a configuration based on the ninth embodiment (FIG. 32) above where an N-channel MOS field-effect transistor M2 (corresponding to the driving target transistor turned on and off by the output signal OUT) is connected between the nodes 413 and 414 of the output signal generator 410.

Figure 43:
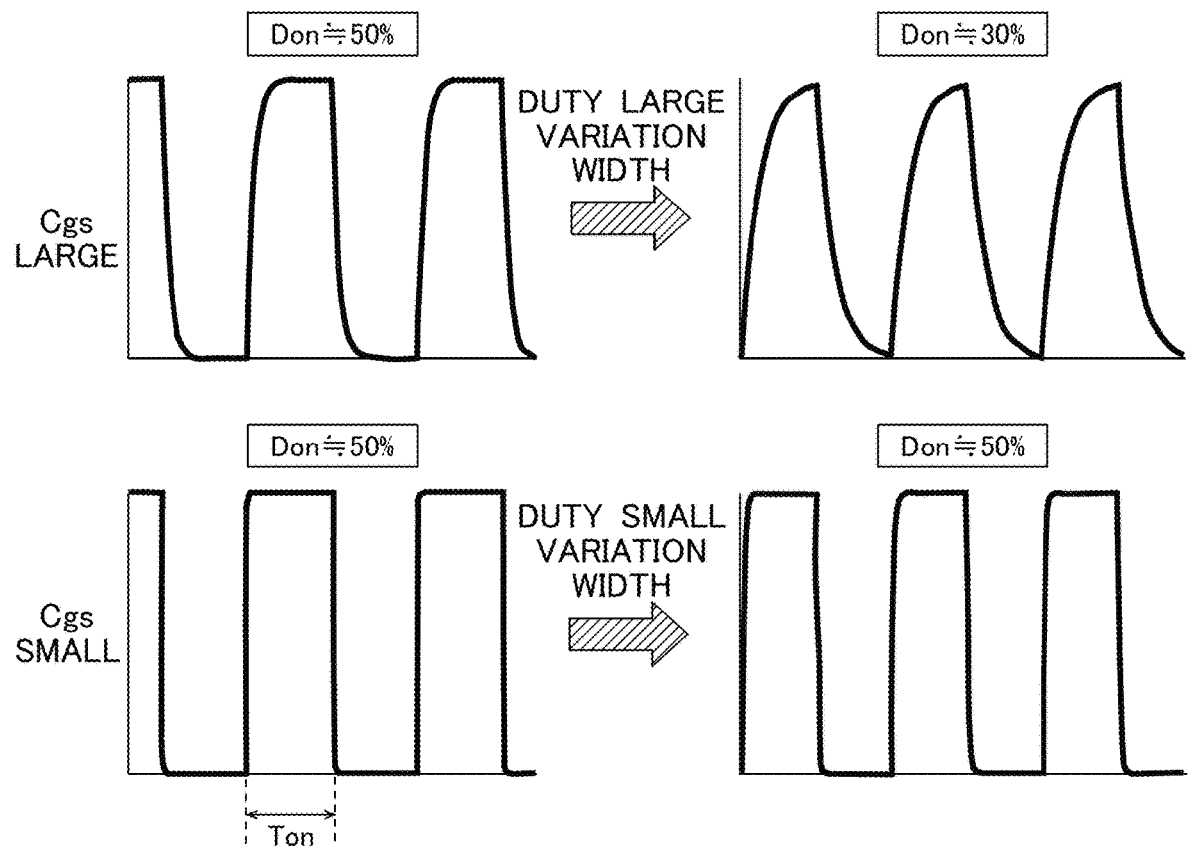
FIG. 43 is a diagram showing a correlation between a gate-source capacitance value and a duty variation width.

FIG. 43 is an output waveform diagram showing the correlation between the gate-source capacitance value Cgs of the transistor M2 and the duty variation width of the output signal OUT. The upper part of FIG. 43 shows the behavior observed when Cgs is relatively high, and the lower part of FIG. 43 shows the behavior observed when Cgs is relatively low.

As shown in FIG. 43, when the gate-source capacitance value Cgs (or the gate resistance value Rg) of the transistor M2 is high, the On-period Ton in a high-frequency region is shorten, and thus the On-duty Don is low. This indicates that, in spectrum spreading of the output signal OUT, the variation width of the On-duty Don is large and the output signal OUT is likely to vary (ripples in the output signal OUT are large).

With a view to suppressing ripples in the output signal OUT, the rise time and the fall time of the output signal OUT are regulated. FIG. 44 is a diagram showing the rising and falling conditions of the output signal OUT.

Figure 44:
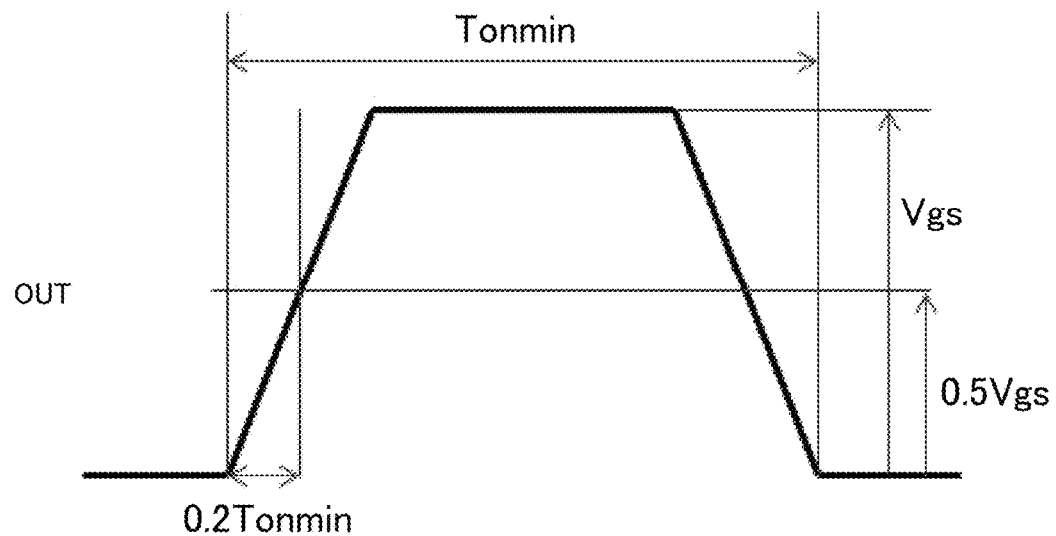
FIG. 44 is a diagram showing rising and falling conditions of an output signal.

When the gate-source capacitance value of the transistor M2 is represented by Cgs, the gate resistance value is represented by Rg, and the minimum On-period is represented by Tonmin, for example, assuming that, as shown in FIG. 44, establishing the rising and falling conditions of the output signal OUT such that the output signal OUT reaches 50% of the driving voltage Vgs (0.5 Vgs) within the period corresponding to 20% of the minimum On-period Tonmin (0.2 Tonmin) results in formula (6) below holding.

Expression 13

$$0.5 \leq 1 - \exp\left\{-\frac{1}{Rg \cdot Cgs}(0.2 Tonmin)\right\} \quad (6)$$

Rearranging formula (6) gives formula (7) below.

Expression 14

$$3.5 \cdot Rg \cdot Cgs \leq Ton\,min \quad (7)$$

Accordingly, fulfilling formula (7) above helps reduce the variation width of the On-duty Don, and thus it is possible to suppress ripples in the output signal OUT.

Fifteenth Embodiment

Figure 45:
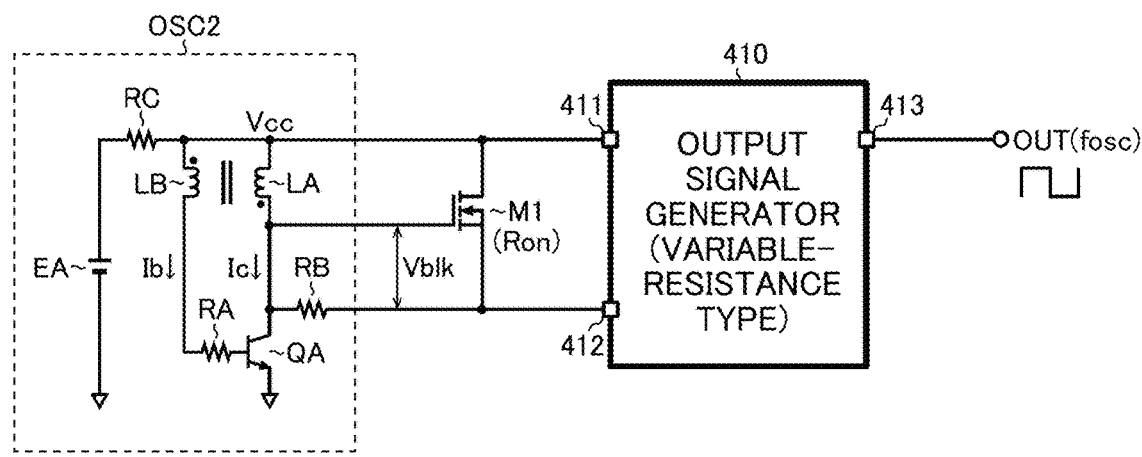
FIG. 45 is a diagram showing an oscillation circuit according to a fifteenth embodiment.

FIG. 45 is a diagram showing an oscillation circuit according to a fifteenth embodiment. The oscillation circuit 401 according to this embodiment, white being based on the ninth embodiment (FIG. 32) above, is characterized in that it employs, instead of the sine-wave oscillator OSC1, a blocking oscillator OSC2 (relaxed self-exited oscillator). Thus, such components as find their counterparts in the ninth embodiment are identified by the same reference signs as in FIG. 32, and no overlapping description will be repeated. The following description focuses on features peculiar to this embodiment.

The blocking oscillator OSC2 is a circuit that applies an oscillation voltage Vblk with a spike waveform between the gate and the source of the transistor M1 and that thereby periodically changes the On-resistance value Ron between the drain and the source of the transistor M1. The blocking oscillator OSC2 includes an npn bipolar transistor QA, resistors RA to RC, coils LA and LB magnetically coupled together, and a DC voltage source EA.

The positive terminal of the DC voltage source EA is connected to the first terminal of the resistor RC. The negative terminal of the DC voltage source EA is connected to a ground terminal. The second terminal of the resistor RC, the first terminal (winding-end terminal) of the coil LA, and the first terminal (winding-start terminal) of the coil LB are all connected to both the node 411 and the drain of the transistor M1. The collector of the transistor QA, the first terminal of the resistor RB, and the second terminal (winding-start terminal) of the coil LA are all connected to the gate of the transistor M1. The emitter of the transistor QA is connected to the ground terminal. The second terminal of the resistor RB is connected to the node 412 and to the source of the transistor M1. The second terminal (winding-end terminal) of the coil LB is connected to the first terminal of the resistor RA. The second terminal of the resistor RA is connected to the base of the transistor QB.

In the blocking oscillator OSC2 configured as described above, when a sufficient base current Ib flows through the transistor QA via the coil LB and the resistor RA, the transistor QA turns on, and thus the oscillation voltage Vblk decreases to almost 0 V (more precisely, to the collector-emitter saturated voltage Vce of the transistor QA). Here, in the coil LA, the collector current Ic of the transistor QA starts to flow so that electrical energy is stored in the coil LA.

Then, when the collector current Ic ceases to increase due to the amplification characteristics (Ic=hFE×Ib) of the transistor QA, no change occurs any longer in the magnetic flux between the coils LA and LB, and thus the induced electromotive force of the coil LB disappears. As a result, no base current Ib is fed to the transistor QA any longer so that the transistor QA turns off. At this moment, the oscillation voltage Vblk extracted from across the resistor RB rises instantaneously to a predetermined maximum voltage value (=2×hFE×Vcc×(RB/RA)) due to the electromotive action of the coil LA, and then, the oscillation voltage Vblk decreases with the decreasing of the electrical energy stored in the coil LA.

Then, when a sufficient base current Ib starts to flow through the transistor QA again via the coil LB and the resistor RA, the transistor QA turns on again. Thereafter, operation similar to that described above is repeated, so that the oscillation voltage Vblk with a spike waveform is periodically generated.

Instead of the coils LA and LB, a coil with a center tap may be connected between the collector of the transistor QA and the first terminal of the resistor RA, with the center tap connected to the second terminal of the resistor RC.

The On-duty Don of the output signal OUT can be a fixed value or a variable value. In this respect, a similar description applies here as with the ninth embodiment (FIG. 32) above.

Incidentally, with the sine-wave oscillator OSC1 in FIG. 35, input variation (offset variation) of the oscillation voltage Vsin or variation in the ambient temperature may make it difficult to sufficiently change the ON-resistance value Ron, and this may adversely affects spectrum spreading of the oscillation frequency fosc.

By contrast, with the blocking oscillator OSC2 according to this embodiment, it is possible to solve the problem mentioned above, and thus to stably disperse the oscillation frequency fosc.

IC Integration

In any of the ninth to fifteenth embodiments described above, the various constituent elements (the output signal generators 410 and 420, the transistor M1, the resistors 401 and 402, and the sine-wave oscillator OSC1 and the blocking oscillator OSC2) constituting the oscillation circuit 401 can all be integrated into an IC. However, the resistors 401 and 402 may be left out as discrete components that are externally fitted to the IC so that a circuit designer can adjust the center value of the oscillation frequency fosc as necessary.

Other Modified Examples

Thus, the various technical features disclosed herein may be implemented in any other manner than in the ninth to fifteenth embodiments described above, and allow for many modifications without departing from the spirit of the present invention. For example, any bipolar transistor may be replaced with a MOS field-effect transistor and vice versa; the logic level of any of the various signals may be reversed. Although the above description deals only with MOS transistors, it is possible to use transistors of any other type, such as bipolar transistors and IGBTs to configure similar circuits. That is, it should be understood that the ninth to fifteenth embodiments disclosed herein are in every aspect illustrative and not restrictive, and that the technical scope of the third invention is not limited to the ninth to fifteenth embodiments described above but encompasses any modifications in the sense and scope equivalent to those of the claims.

In a switching power supply or the like, a ripple injection circuit, a switching control circuit, and an oscillation circuit according to the present invention can be used in any combination as necessary.

INDUSTRIAL APPLICABILITY

A ripple injection circuit according to one aspect of what is disclosed herein is applicable to, for example, a switching power supply.

A switching control circuit according to one aspect of what is disclosed herein is applicable to, for example, a switching power supply.

An oscillation circuit according to one aspect of what is disclosed herein is applicable, for example, as a means for generating a driving clock signal of a DC/DC converter.

LIST OF REFERENCE SIGNS 1 feedback voltage generation circuit
2 comparison circuit
Cr capacitor
L1 inductor
Q1 switching device
R1, R2 voltage division resistor
Rr, Rcom resistor
UP1 voltage generation circuit
11 to 15 step-up switching power supply circuit C101 input capacitor
CNT101 to CNT106 switching control circuit
Q101 switching device
REC101 rectifier
T101 transformer
800 AC adapter
900 electronic device
401 oscillation circuit
410, 420 output signal generator
411 to 414, 421 to 423 node
M1, M2 N-channel MOS field-effect transistor
OSC1 sine-wave oscillator
OSC2 blocking oscillator
R401, R402 resistor
R11 to R13, R21 to R24, Ra to Rd, RA to RC resistor
Rg gate resistance
C1, Ca to Cb capacitor
AMP1, AMP2, AMPa operational amplifier
QA npn bipolar transistor
LA, LB coil
EA DC voltage source

The invention claimed is:

1. A ripple voltage injection circuit comprising:
a first integration circuit configured to integrate a switching voltage generated by turning on and off a switching device to generate a first ripple voltage including a first ripple component; and
a second integration circuit configured to integrate a comparison result signal, which is a result of comparing a feedback voltage with a reference voltage, to generate a second ripple voltage including a second ripple component, wherein:
the first and second ripple components are added to the feedback voltage,
the first integration circuit includes a first resistor to which the switching voltage is fed and a first capacitor, the first resistor having a first resistance,
the second integration circuit includes a second resistor to which the comparison result signal is fed and a second capacitor, the second resistor having a second resistance,
the first resistance of the first resistor and the second resistance of the second resistor are set such that a first value is higher than a second value, wherein:
the first value is obtained by dividing a high level of the comparison result signal by the second resistance of the second resistor,
the second value is obtained by dividing an output voltage by the first resistance of the first resistor, and
the output voltage is obtained by smoothing the switching voltage.

2. The ripple voltage injection circuit according to claim 1, wherein the first and second capacitors have the same capacitance.

3. The ripple voltage injection circuit according to claim 1, wherein
the feedback voltage is generated by a feedback voltage generation circuit including a first voltage division resistor to which the output voltage is applied and a second voltage division resistor connected in series between the first voltage division resistor and a ground voltage, the second voltage division resistor having a resistance, and
the first resistance of the first resistor is set such that the first resistance of the first resistor is higher than the resistance of the second voltage division resistor, and the first resistance of the first resistor is higher than the second resistance of the second resistor.

4. The ripple voltage injection circuit according to claim 1, wherein
the feedback voltage is generated by a feedback voltage generation circuit including a first voltage division resistor to which the output voltage is applied and a second voltage division resistor connected in series between the first voltage division resistor and a ground voltage, the first voltage division resistor having a resistance, and
when the resistance of the first voltage division resistor is represented by R and a minimum frequency of a frequency component included in the reference voltage is represented by f, a capacity C of the capacitor or of the first capacitor is set to fulfill $R > (1/2 \pi f C)$.

5. A step-up switching power supply circuit comprising:
the ripple voltage injection circuit according to claim 1;
a voltage generation circuit configured to smooth, with a capacitor, a voltage generated in an inductor by turning on and off the switching device connected to one end of the inductor to generate the output voltage higher than an input voltage fed to another end of the inductor;
a feedback voltage generation circuit configured to divide the output voltage to generate the feedback voltage; and
a comparison circuit configured to output the comparison result signal;
wherein the switching device is turned on and off based on the comparison result signal.

6. The step-up switching power supply circuit according to claim 5, wherein a signal which varies with time and of which a minimum value is greater than zero is used as the reference voltage.

7. The step-up switching power supply circuit according to claim 5, wherein an output terminal of the comparison circuit is directly connected to a control terminal of the switching device.

8. The step-up switching power supply circuit according to claim 7, wherein when an input capacity of the switching device is represented by $C_{ISS}$, a switching frequency of the switching device is represented by $f_{SW}$, a maximum output current of the comparison circuit is represented by $I_{GmAx}$, and a high level of the comparison result signal is represented by $V_{GH}$, the input capacity $C_{ISS}$ of the switching device is set so as to fulfill $2C_{ISS}V_{GH}/I_{GMAX} < 1/f_{SW}$.

9. An electronic device comprising:
the step-up switching power supply circuit according to claim 5; and
a load circuit to which an output of the step-up switching power supply circuit is connected.

* * * * *